United States Patent [19]
Inoue et al.

[11] Patent Number: 6,167,513
[45] Date of Patent: Dec. 26, 2000

[54] MOBILE COMPUTING SCHEME USING ENCRYPTION AND AUTHENTICATION PROCESSING BASED ON MOBILE COMPUTER LOCATION AND NETWORK OPERATING POLICY

[75] Inventors: Atsushi Inoue; Masahiro Ishiyama; Atsushi Fukumoto; Yoshiyuki Tsuda; Atsushi Shimbo; Toshio Okamoto, all of Tokyo, Japan

[73] Assignee: Kabushiki Kaisha Toshiba, Kawasaki, Japan

[21] Appl. No.: 08/962,332

[22] Filed: Oct. 31, 1997

[30] Foreign Application Priority Data

Nov. 1, 1996 [JP] Japan .................................. 08-291452

[51] Int. Cl.⁷ ..................................................... H04K 1/00
[52] U.S. Cl. ......................... 713/150; 713/168; 713/169; 380/287; 380/255; 709/200; 709/218; 709/223; 709/230; 709/169
[58] Field of Search ................................. 380/23, 25, 49, 380/287, 255; 709/200, 218, 223, 230, 232; 713/150, 153, 168, 169

[56] References Cited

U.S. PATENT DOCUMENTS

| | | | |
|---|---|---|---|
| 4,352,952 | 10/1982 | Boone et al. | 178/22.09 |
| 4,750,109 | 6/1988 | Kita | 364/200 |
| 4,893,307 | 1/1990 | McKay et al. | 370/94.1 |
| 5,159,592 | 10/1992 | Perkins | 370/85.7 |
| 5,228,083 | 7/1993 | Lozowick et al. | 380/9 |
| 5,884,025 | 3/1999 | Bachr et al. | 395/187.01 |

*Primary Examiner*—Tod R. Swann
*Assistant Examiner*—Paul E. Callahan
*Attorney, Agent, or Firm*—Foley & Lardner

[57] ABSTRACT

A mobile computing scheme capable of carrying out a proper packet transfer according to a current location of the mobile computer by accounting for the network operating policy. A mobile computer carries out a prescribed communication processing according to recognition results as to whether the mobile computer is located inside or outside the home network at which a mobile computer management device of the mobile computer is provided, and whether or not there exists a packet processing device which has a packet transmitted by at least one of the mobile computer and a correspondent computer as an encryption and authentication processing target. Also, a packet processing device carries out a prescribed transfer processing according to recognition results as to whether at least one of a source computer and a destination computer of a packet to be transferred is a moving mobile computer which is moving outside its home network, and whether or not there exists a packet processing device which has a packet transmitted by at least one of the source computer and the destination computer as an encryption and authentication processing target.

45 Claims, 32 Drawing Sheets

FIG. 4A

| IPv4 HEADER | INNER PROTOCOLS (IP / TCP / VDP) |

FIG. 4B

| IPv4 HEADER | INNER PROTOCOLS (IP / TCP / VDP) |

FIG. 4C

| IPv4 HEADER | KEY INFORMATION HEADER | AUTHENTI-CATION HEADER | ENCRYPTION HEADER | INNER PROTOCOLS (IP / TCP / VDP) |

FIG. 4D

| IPv4 HEADER | KEY INFORMATION HEADER | AUTHENTI-CATION HEADER | IPv4 HEADER | KEY INFOR-MATION HEADER | AUTHENTI-CATION HEADER | ENCRYPTION HEADER | INNER PROTOCOLS (IP / TCP / VDP) |

← LINK AUTHENTICATION INFORMATION →
← END-TO-END AUTHENTICATION / ENCRYPTION INFORMATION →

IP HEADER (KEY)
   SOURCE = CARE-OF ADDRESS OF MN
   DESTINATION = GLOBAL ADDRESS OF GW0

INNER IP HEADER (REGISTRATION REQUEST)
   SOURCE = PRIVATE ADDRESS OF MN
   DESTINATION = PRIVATE ADDRESS OF HA

IP HEADER
   SOURCE = GLOBAL ADDRESS OF GW1
   DESTINATION = CARE-OF ADDRESS OF MN

IP HEADER
   SOURCE = CARE-OF ADDRESS OF MN
   DESTINATION = GLOBAL ADDRESS OF GW1

IP HEADER1
  SOURCE = GLOBAL ADDRESS OF GW0
  DESTINATION = GLOBAL ADDRESS OF GW1
IP HEADER2
  SOURCE = GLOBAL ADDRESS OF GW0
  DESTINATION = CARE-OF ADDRESS OF MN
INNER IP HEADER (REGISTRATION RESPONSE)
  SOURCE = PRIVATE ADDRESS OF HA
  DESTINATION = PRIVATE ADDRESS OF MN

IP HEADER
   SOURCE = GLOBAL ADDRESS OF GW0
   DESTINATION = CARE-OF ADDRESS OF MN

INNER IP HEADER (REGISTRATION RESPONSE)
   SOURCE = PRIVATE ADDRESS OF HA
   DESTINATION = PRIVATE ADDRESS OF MN

FIG. 19

| LOCATION OF CH / LOCATION OF MN | INSIDE GW PROTECTED REGION | OUTSIDE GW PROTECTED REGION |
|---|---|---|
| INSIDE GW PROTECTED REGION | [1] IP VIA GW<br>CH ADDRESS: PRIVATE<br>MN ADDRESS: PRIVATE | [3] USUAL IP<br>CH ADDRESS: GLOBAL<br>MN ADDRESS: PRIVATE<br>→CONVERTED INTO GLOBAL BY PROXY GW |
| OUTSIDE GW PROTECTED REGION | [2] IP VIA GW*<br>CH ADDRESS: PRIVATE<br>MN ADDRESS: PRIVATE | [4] USUAL IP<br>CH ADDRESS: GLOBAL<br>MN ADDRESS: PRIVATE<br>USUAL IP COMMUNICATION USING CARE-OF ADDRESS BY MN (OR IP VIA PROXY OF HOME DOMAIN & VPN UP TO HOME DOMAIN) |

*: CASE WHERE GW FUNCTION ASSOCIATED WITH MN OPERATES

| LOCATION OF CH / LOCATION OF MN | HOME NETWORK OF MN | 1ST OTHER SECTION NETWORK |
|---|---|---|
| HOME NETWORK | (1) | (2) |
| 1ST OTHER SECTION NETWORK | (3)* | (4)* |
| 2ND OTHER SECTION NETWORK |  | (5)* |
| EXTERNAL | (6)* | (7)* |

*: CASE WHERE GW FUNCTION ASSOCIATED WITH MN OPERATES

| IP HEADER1 | KEY1 | AH | IP HEADER 2 | KEY2 | AH | ESP | INNER IP HEADER | DATA |

IP HEADER1
  SOURCE = CARE-OF ADDRESS OF MN
  DESTINATION = GLOBAL ADDRESS OF GW1(GW_MN)
IP HEADER2
  SOURCE = CARE-OF ADDRESS OF MN
  DESTINATION = GLOBAL ADDRESS OF GW0(GW_CH)
INNER IP HEADER (REGISTRATION REQUEST)
  SOURCE = PRIVATE ADDRESS OF MN
  DESTINATION = PRIVATE ADDRESS OF CH

1ST OTHER SECTION NETWORK 1b

HOME NETWORK 1a

→ IP FORMAT
--→ ENCRYPTION / END-TO-END AUTHENTICATION FORMAT
⋯→ ENCRYPTION / LINK AUTHENTICATION FORMAT
-·-→ MOBILE IP FORMAT

IP HEADER (TCP / IP)
  SOURCE = ADDRESS OF MN
  DESTINATION = ADDRESS OF CH

FIG. 28
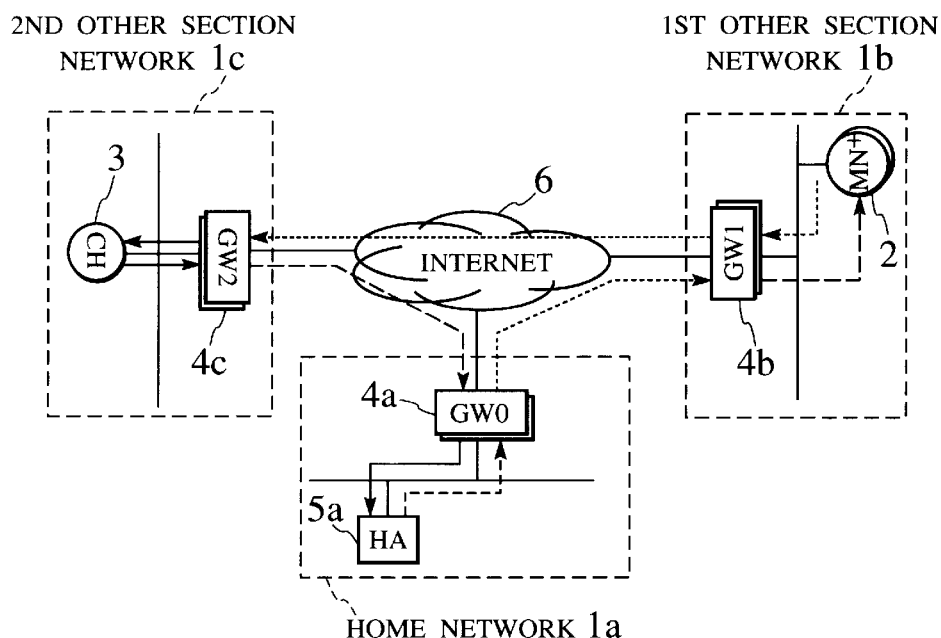
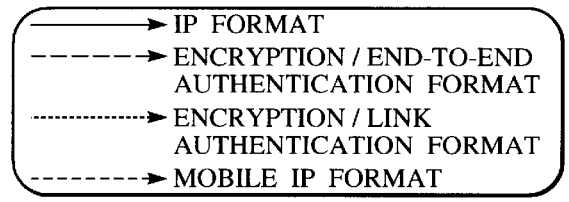
FIG. 29
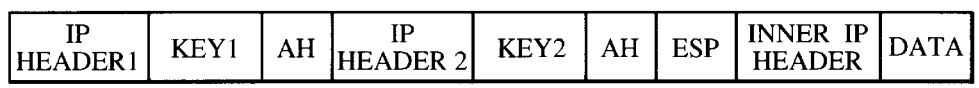
IP HEADER1
  SOURCE = CARE-OF ADDRESS OF MN
  DESTINATION = GLOBAL ADDRESS OF GW1(GW_MN)
IP HEADER2
  SOURCE = CARE-OF ADDRESS OF MN
  DESTINATION = GLOBAL ADDRESS OF GW2(GW_CH)
INNER IP HEADER (REGISTRATION REQUEST)
  SOURCE = PRIVATE ADDRESS OF MN
  DESTINATION = PRIVATE ADDRESS OF CH FIG. 30
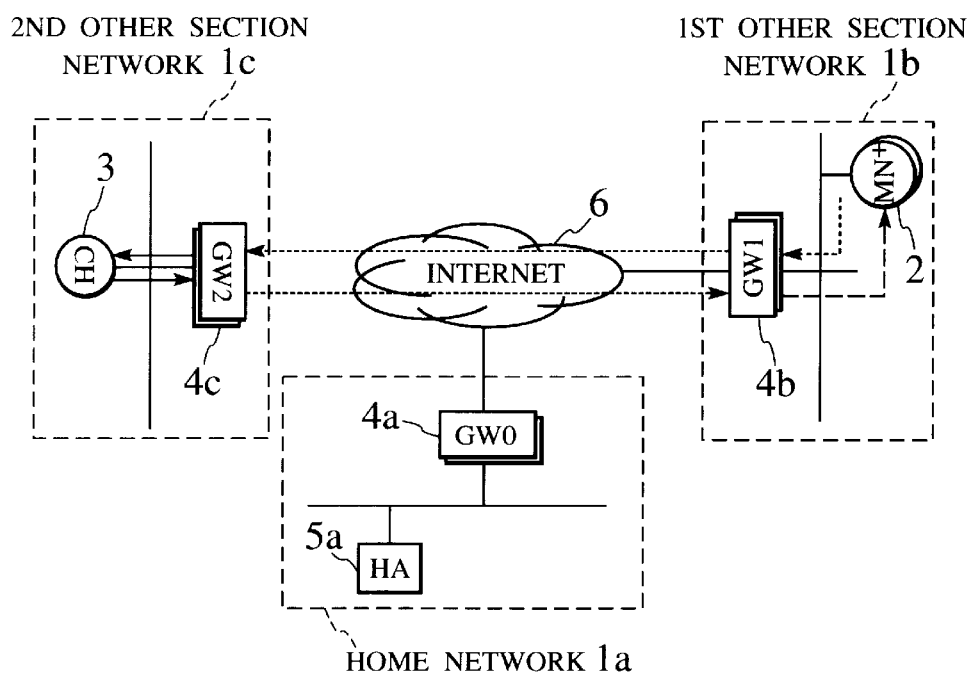
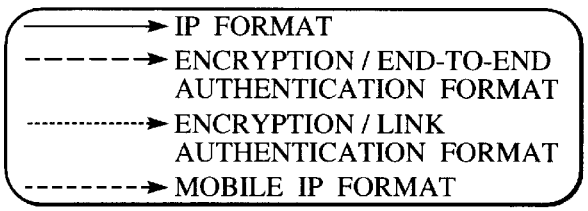

IP HEADER
  SOURCE = CARE-OF ADDRESS (GLOBAL ADDRESS) OF MN
  DESTINATION = GLOBAL ADDRESS OF GW0 (GW_CH)

INNER IP HEADER
  SOURCE = PRIVATE ADDRESS OF MN
  DESTINATION = PRIVATE ADDRESS OF CH

HOME NETWORK 1a

→ IP FORMAT
--→ ENCRYPTION / END-TO-END AUTHENTICATION FORMAT
·····→ ENCRYPTION / LINK AUTHENTICATION FORMAT
–·–→ MOBILE IP FORMAT

IP HEADER
  SOURCE = CARE-OF ADDRESS (GLOBAL ADDRESS) OF MN
  DESTINATION = GLOBAL ADDRESS OF GW1 (GW_CH)

INNER IP HEADER
  SOURCE = PRIVATE ADDRESS OF MN
  DESTINATION = PRIVATE ADDRESS OF CH

FIG. 36
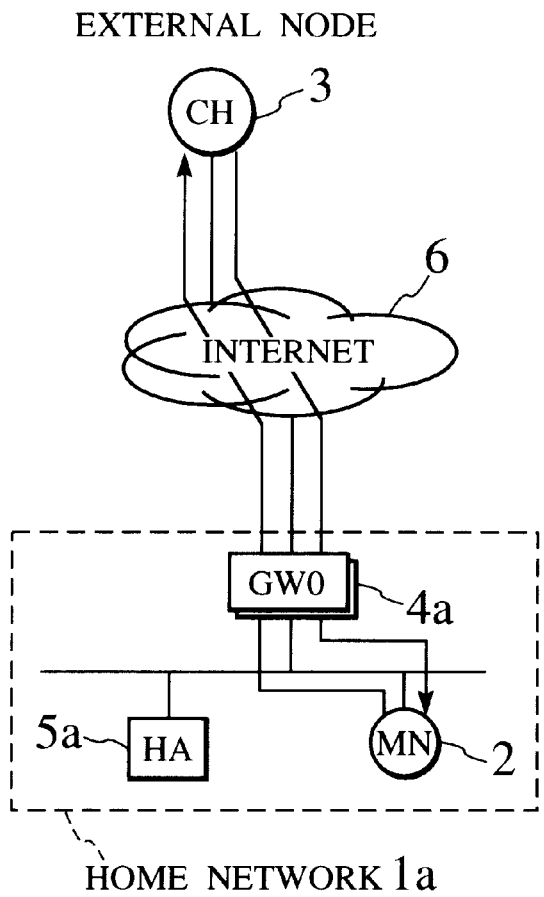
EXTERNAL NODE
HOME NETWORK 1a
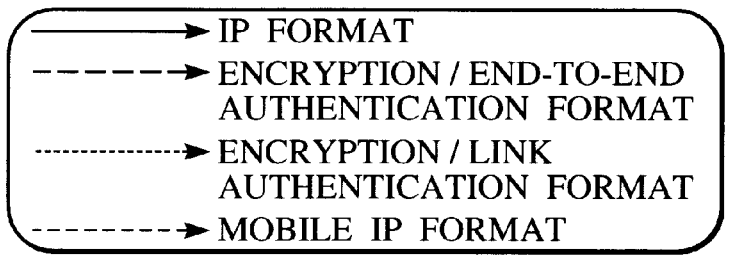
→ IP FORMAT
--→ ENCRYPTION / END-TO-END AUTHENTICATION FORMAT
····→ ENCRYPTION / LINK AUTHENTICATION FORMAT
- - -→ MOBILE IP FORMAT FIG. 37
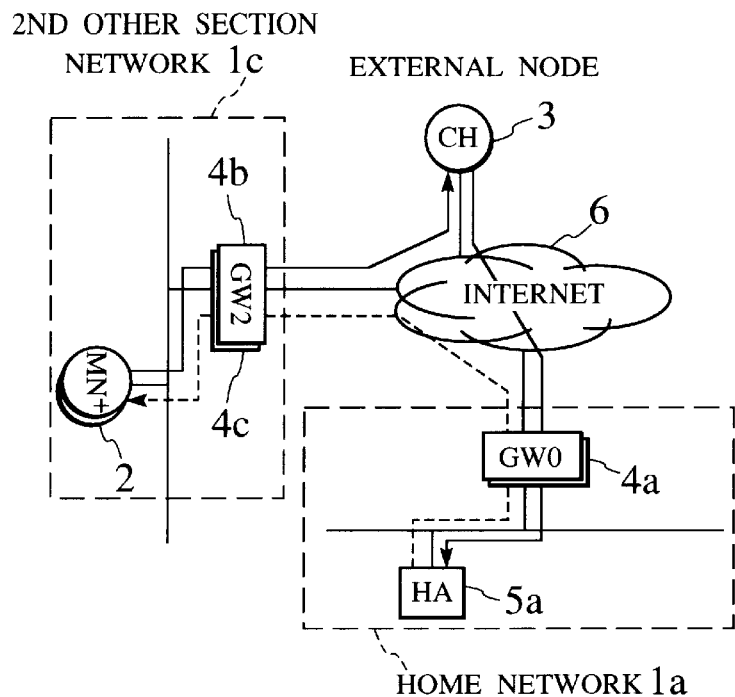
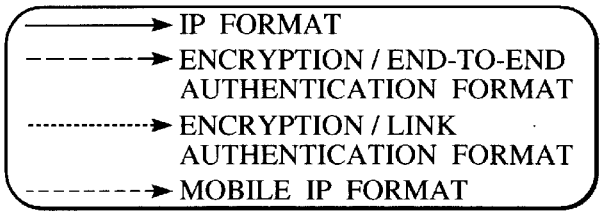
FIG. 38
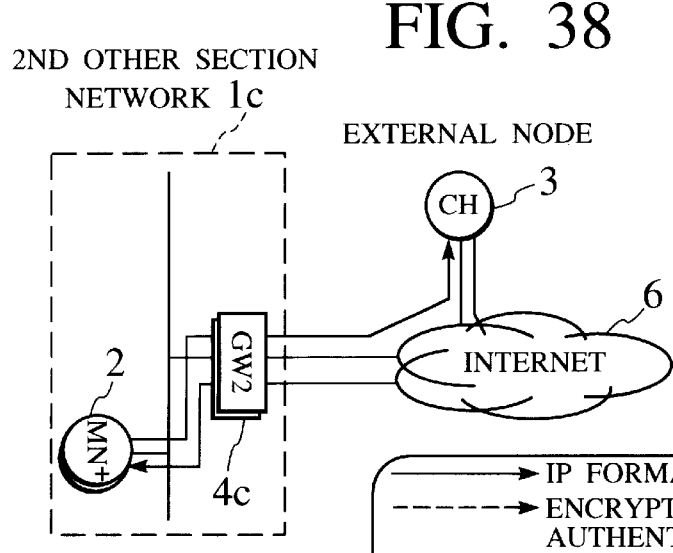
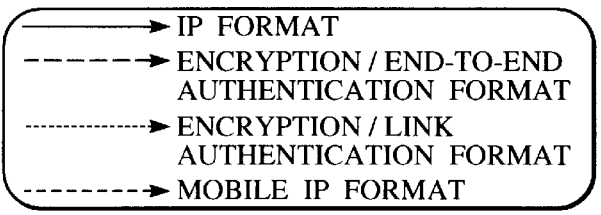

MOBILE COMPUTING SCHEME USING ENCRYPTION AND AUTHENTICATION PROCESSING BASED ON MOBILE COMPUTER LOCATION AND NETWORK OPERATING POLICY

BACKGROUND OF THE INVENTION

1. Field of the Invention

The present invention relates to a mobile computer, a packet processing device and a communication control method for realizing a mobile computing scheme using the encryption and authentication processing.

2. Description of the Background Art

In conjunction with availability of a computer system in smaller size and lower cost and a more enriched network environment, the use of computer system has been rapidly expanded into variety of fields, and there is also a transition from a centralized system to a distributed system. In this regard, in recent years, because of the advance and spread of the computer network technology in addition to the progress and improved performance of the computer system itself, it has become possible to realize not only a sharing of resources such as files and printers within an office but also communications (electronic mail, electronic news, file transfer etc.) with outside of an office or organization, and these communications are now widely used.

In particular, in recent years, the use of the world's largest computer network called Internet has become very popular, and there are new computer businesses for connecting to the Internet and utilizing open information and services, or for providing information and services to external users who make accesses through the Internet. In addition, new technological developments are made in relation to the use of the Internet.

Also, in conjunction with the spread of such networks, there are technological developments regarding the mobile computing. In the mobile computing, a user carries along a portable computer terminal and makes communications while moving over networks. In some cases, the user may change a location on a network while continuing the communication, so that there is a need for a scheme that manages a changing address of a mobile computer on a network during such a communication in order to route the communication content correctly.

Also, when the networks are wide spread and free connections among networks are realized so that huge amount of data and services can be exchanged, there arises a need to account for the problem of security.

For example, there is a problem as to how to prevent the leakage of the secret information of the organization to the external network, and there is also a problem as to how to protect resources and information connected to the domestic network. The Internet was developed originally for the academic purpose so that the primary concern was the free data and service exchanges by the network connections and the above described problem of security has not been accounted for.

However, in recent years, many corporations and organizations are connecting to the Internet so that there is a need for a mechanism to guard the own network in view of the above described problem of security.

To this end, there is a known scheme for use at a time of exchanging a data packet on the Internet, in which the content of the data packet is to be encrypted and an authentication code is to be attached before the transmission of the data packet to the external, and the authentication code is to be verified and the data packet is to be decrypted at a received site.

For example, the IETF (which is the standardizing organization for the Internet) specifies the encryption and authentication code attaching scheme for IP packets as the IP security standard (see, IETF RFC 1825–1829). According to this scheme, even when an outside user picks up the data packet on the external network, the leakage of data content can be prevented because the data content is encrypted, and therefore the secure communication can be realized.

A mutual cipher communication is possible between networks which are protected (guarded) by gateway computers that support such a cipher communication, and when the above described mobile computer itself supports a function of the packet encryption and decryption, a cipher communication between any gateways or a gateway and a mobile computer can be supported.

For example, in an exemplary case shown in FIG. 1, a mobile computer 2 that originally belongs to a home network 1a moves to another network 1b and carries out a cipher communication with another computer (CH: Correspondent Host) 3 in a network 1c, through gateways (data packet encryption and authentication devices) 4a and 4c that support the encryption/decryption function.

In general, in a case of realizing the mobile computing, a router (home agent) for managing information about a visiting site of the mobile computer is provided, and the transmission of data destined to the mobile computer is realized by sending it to the home agent of the mobile computer, and carrying out the data routing control with respect to the mobile computer by encapsulating an IP packet destined to an original address of the mobile computer within a packet destined to a current location address of the mobile computer. In FIG. 1, this role is played by a home agent (HA) 5.

This is a scheme called mobile IP which is currently in a process of being standardized by the mobile-IP working group of the IETF (see, IETF RFC 2002–2006).

When this mobile IP scheme is used in combination with the above described data packet encryption of the IP security standard, a packet transfer route in FIG. 1 will be as follows: correspondent host (CH) 3→gateway 4c (where the packet is encrypted)→gateway 4a (where the packet is decrypted) →home agent (HA) 5→gateway 4a (where the packet is encrypted again)→mobile computer 2 (where the packet is decrypted again).

In such a case of using the mobile IP and the packet encryption by the IP security in combination, there is a need for a control to change the operation of each constituent element according to cases differentiated by current locations of the mobile computer and its correspondent.

For example, suppose that a system has a configuration as shown in FIG. 2, where MN stands for a mobile computer, MN+ stands for a mobile computer which supports the packet encryption and authentication processing function itself, CH stands for its correspondent host, GW stands for a packet encryption device (gateway), and HA stands for a home agent. Here, the home domain network of the mobile computer MN will be referred to as a home network. Also, "inside the GW protected region" indicates networks protected by gateways, while "outside the GW protected region" indicates other outside regions.

In this case, the situation can be largely classified into four cases [1] to [4] depending on whether each of MN and CH is inside or outside of the GW protected region, as shown in FIG. 19 which will be described in detail below. Here, it is assumed that CH is a stationary (non-mobile) computer which does not carry out the encryption and authentication processing.

Moreover, the cases [1] and [2] of communications via GW in FIG. 19 can be further classified into seven cases (1) to (7), as shown in FIG. 20 which will also be described in detail below.

In each of these cases, the processing at each node and the IP security processing at each gateway can be different, so that in a case of using the mobile IP and the IP security in combination, it is important to note the above described classification of cases [1] and [2] or (1) to (7) according to the location information for the mobile computer and the correspondent host.

Also, depending on a location of the correspondent host, there can be cases in which the packet encryption cannot be used, such as a case where the correspondent host is located in a network which has no packet encryption device, for example. The cases [3] and [4] of the above classification are such cases. In such a case, the mobile computer is going to use only the mobile protocol.

Also, the mobile IP defines the optimization of a packet route destined to the mobile computer via the home agent when each network constituent element has a correct location information as a cache, and it is also necessary to judge the applicability of this route optimization by recognizing the current locations of the mobile computer and the correspondent host if the packet encryption is used in combination.

For example, the route optimization as indicated in FIG. 2 is possible when it can be recognized as the case (5) (a case where CH and MN are located at different sections) of the above classification.

Now, in the mobile IP, when the mobile computer moves to a new visiting site, it is necessary to send a registration message regarding the current location to the home agent. In this case, when the mobile computer moved to a network which is familiar to the home network of the mobile computer so that a gateway of that network freely allows the transmission of the registration message to outside the network, it is possible for the mobile computer to carry out the operation exactly as specified by the mobile IP.

However, in a general network which treats the mobile computer as visiting (or intruding) inside the network from outside the network, it is considered dangerous to freely allow the transmission of the registration message issued by the mobile computer to outside the network, from a viewpoint of the security. In such a case, it becomes necessary for the mobile computer to recognize that it is currently located in a network which treats it as an intruder, and carries out the transmission of the registration message to the home agent after obtaining a permission for external access by carrying out a processing for establishing the own identification with respect to the gateway. Also, even in the actual data transmission after the completion of the registration message transmission, it is necessary to carry out the communication while maintaining the own identification with respect to the gateway.

In the conventional mobile IP scheme, the routing control and the mobile computer location registration have been specified under the assumption that each network node is assigned with a unique IP address and capable of exchanging control packets freely, so that at a time of the actual operation in a case of supporting a mobile computer capable of carrying out communications while moving among inter-connected networks, there has been no operation specification on the network operating policy regarding a kind of organization to which the visited network of the mobile computer belongs.

For this reason, in a case of using the mobile IP and the packet encryption by the IP security in combination, it has been impossible to realize a control to change the operation of each of the mobile computer and the packet encryption device for carrying out the IP packet encryption according to cases differentiated by current locations of the mobile computer and its correspondent, and it has also been difficult to realize the route optimization of the mobile IP.

Also, because the mobile IP specification does not account for the network operating policy, when the mobile computer moves to a network of an external organization and transmits a registration message of the mobile IP destined to the home network, if a gateway of that external network freely allows the transmission of any packet destined outside the network, it is possible to carry out the operation exactly as specified by the mobile IP, but this scheme itself is not preferable from a viewpoint of the security in general. Consequently, especially when the mobile computer has moved to a network which does not freely allow the external access to an internal computer in view of the security, there are cases where even a registration message for a new location which is sent immediately after the move cannot reach the home agent on the home network of the mobile computer so that the trouble is caused in the operations of the mobile IP scheme regarding the mobile computer.

SUMMARY OF THE INVENTION

It is therefore an object of the present invention to provide a mobile computer for carrying out cipher communications while moving among inter-connected networks and a communication control method which are capable of carrying out a proper packet transfer according to a current location of the mobile computer by accounting for the network operating policy.

It is another object of the present invention to provide a packet processing device and a communication control method in a communication network which supports the cipher communication and the mobile computer for carrying out communications while moving among inter-connected networks, which are capable of carrying out a proper packet transfer according to current locations of computers carrying out packet communications by accounting for the network operating policy.

According to one aspect of the present invention there is provided a mobile computer for carrying out communications while moving within a communication system in which a plurality of networks are inter-connected, said plurality of networks including one network at which a packet processing device is provided, said packet processing device having a function for applying an encryption and authentication processing to a packet transmitted by a computer inside said one network toward another computer outside said one network, the mobile computer comprising: a first recognition unit for recognizing whether said mobile computer is located inside a home network or outside the home network, the home network being one of said plurality of networks at which a mobile computer management device is provided, the mobile computer management device having a function for managing a mobile location information of said mobile computer and transferring a packet destined to said mobile computer to a current location of said mobile computer; a second recognition unit for recognizing whether or not there exists a packet processing device which has a packet transmitted by at least one of said mobile computer and a correspondent computer of said mobile computer as an encryption and authentication processing target; and a communication unit for carrying out a prescribed communication processing including an encryption and authentication processing of a packet to be transmitted from said mobile computer, according to recognition results obtained by the first recognition unit and the second recognition unit.

According to another aspect of the present invention there is provided a packet processing device to be provided in one network of a communication system in which a plurality of networks are inter-connected, said plurality of networks including a home network at which a mobile computer management device of a mobile computer for carrying out communications while moving within the communication system is provided, the mobile computer management device having a function for managing a mobile location information of said mobile computer and transferring a packet destined to said mobile computer to a current location of said mobile computer, said packet processing device having a function for applying an encryption and authentication processing to a packet transmitted by a computer inside said one network toward another computer outside said one network and comprising: a first recognition unit for recognizing whether at least one of a source computer and a destination computer of a packet to be transferred is a moving mobile computer which is moving outside its home network; a second recognition unit for recognizing whether or not there exists a packet processing device which has a packet transmitted by at least one of said source computer and said destination computer as an encryption and authentication processing target; and a transfer unit for carrying out a prescribed transfer processing including an encryption and authentication processing of a packet to be transferred between said source computer and said destination computer, according to recognition results obtained by the first recognition unit and the second recognition unit.

According to another aspect of the present invention there is provided a communication control method at a mobile computer for carrying out communications while moving within a communication system in which a plurality of networks are inter-connected, said plurality of networks including one network at which a packet processing device is provided, said packet processing device having a function for applying an encryption and authentication processing to a packet transmitted by a computer inside said one network toward another computer outside said one network, the method comprising the steps of: (a) recognizing whether said mobile computer is located inside a home network or outside the home network, the home network being one of said plurality of networks at which a mobile computer management device is provided, the mobile computer management device having a function for managing a mobile location information of said mobile computer and transferring a packet destined to said mobile computer to a current location of said mobile computer; (b) recognizing whether or not there exists a packet processing device which has a packet transmitted by at least one of said mobile computer and a correspondent computer of said mobile computer as an encryption and authentication processing target; and (c) carrying out a prescribed communication processing including an encryption and authentication processing of a packet to be transmitted from said mobile computer, according to recognition results obtained by the step (a) and the step (b).

According to another aspect of the present invention there is provided a communication control method at a packet processing device to be provided in one network of a communication system in which a plurality of networks are inter-connected, said plurality of networks including a home network at which a mobile computer management device of a mobile computer for carrying out communications while moving within the communication system is provided, the mobile computer management device having a function for managing a mobile location information of said mobile computer and transferring a packet destined to said mobile computer to a current location of said mobile computer, said packet processing device having a function for applying an encryption and authentication processing to a packet transmitted by a computer inside said one network toward another computer outside said one network, the method comprising comprising the steps of: (a) recognizing whether at least one of a source computer and a destination computer of a packet to be transferred is a moving mobile computer which is moving outside its home network; (b) recognizing whether or not there exists a packet processing device which has a packet transmitted by at least one of said source computer and said destination computer as an encryption and authentication processing target; and (c) carrying out a prescribed transfer processing including an encryption and authentication processing of a packet to be transferred between said source computer and said destination computer, according to recognition results obtained by the step (a) and the step (b).

According to another aspect of the present invention there is provided an article of manufacture, comprising: a computer usable medium having computer readable program code means embodied therein for causing a computer to function as a mobile computer for carrying out communications while moving within a communication system in which a plurality of networks are inter-connected, said plurality of networks including one network at which a packet processing device is provided, said packet processing device having a function for applying an encryption and authentication processing to a packet transmitted by a computer inside said one network toward another computer outside said one network, the computer readable program code means including: first computer readable program code means for causing said computer to recognize whether said mobile computer is located inside a home network or outside the home network, the home network being one of said plurality of networks at which a mobile computer management device is provided, the mobile computer management device having a function for managing a mobile location information of said mobile computer and transferring a packet destined to said mobile computer to a current location of said mobile computer; second computer readable program code means for causing said computer to recognize whether or not there exists a packet processing device which has a packet transmitted by at least one of said mobile computer and a correspondent computer of said mobile computer as an encryption and authentication processing target; and third computer readable program code means for causing said computer to carry out a prescribed communication processing including an encryption and authentication processing of a packet to be transmitted from said mobile computer, according to recognition results obtained by the first computer readable program code means and the second computer readable program code means.

According to another aspect of the present invention there is provided an article of manufacture, comprising: a computer usable medium having computer readable program code means embodied therein for causing a computer to function as a packet processing device to be provided in one network of a communication system in which a plurality of networks are inter-connected, said plurality of networks including a home network at which a mobile computer management device of a mobile computer for carrying out communications while moving within the communication system is provided, the mobile computer management device having a function for managing a mobile location information of said mobile computer and transferring a packet destined to said mobile computer to a current location of said mobile computer, said packet processing device having a function for applying an encryption and authentication processing to a packet transmitted by a computer inside said one network toward another computer outside said one network, the computer readable program code means including: first computer readable program code means for causing said computer to recognize whether at least one of a source computer and a destination computer of a packet to be transferred is a moving mobile computer which is moving outside its home network; second computer readable program code means for causing said computer to recognize whether or not there exists a packet processing device which has a packet transmitted by at least one of said source computer and said destination computer as an encryption and authentication processing target; and third computer readable program code means for causing said computer to carry out a prescribed transfer processing including an encryption and authentication processing of a packet to be transferred between said source computer and said destination computer, according to recognition results obtained by the first computer readable program code means and the second computer readable program code means.

Other features and advantages of the present invention will become apparent from the following description taken in conjunction with the accompanying drawings.

BRIEF DESCRIPTION OF THE DRAWINGS

FIGS. 4A, 4B, 4C and 4D are diagrams showing four exemplary packet formats to be used in one embodiment of the present invention.

FIG. 19 is a table summarizing a classification of communication cases according to one embodiment of the present invention.

FIG. 28 is a schematic diagram showing a manner of communication between a mobile computer and a correspondent host in a communication case (5) of FIG. 20 according to one embodiment of the present invention.

FIG. 29 is a diagram showing one exemplary format of a packet transmitted by a mobile computer in the communication case shown in FIG. 28.

FIG. 30 is a schematic diagram showing a manner of communication between a mobile computer and a correspondent host in a communication case (5) of FIG. 20 at a time of route optimization.

FIG. 36 is a schematic diagram showing one manner of communication between a mobile computer and a correspondent host in a communication case [3] of FIG. 19 according to one embodiment of the present invention.

FIG. 37 is a schematic diagram showing another manner of communication between a mobile computer and a correspondent host in a communication case [3] of FIG. 19 according to one embodiment of the present invention.

FIG. 38 is a schematic diagram showing one manner of communication between a mobile computer and a correspondent host in a communication case [4] of FIG. 19 according to one embodiment of the present invention.

DETAILED DESCRIPTION OF THE PREFERRED EMBODIMENTS

Referring now to FIG. 3 to FIG. 45, one embodiment of the mobile computing scheme according to the present invention will be described in detail.

In the following, a computer which is capable of carrying out communications while moving inside the communication system will be referred to as a mobile computer, and a computer which carries out communications at a fixed location in the communication system without moving will be referred to as a stationary computer.

Also, for a given mobile computer, a network in which this mobile computer has a home position will be referred to as a home network, and a network having a gateway other than the home network will be referred to as an other section network.

The mobile computer located inside the home network (at its original location or another location within the home network which is connected with the original location through routers without passing through any gateway) will be handled similarly as a stationary computer. Thus, stationary nodes include a stationary computer as well as a mobile computer which is located inside the home network.

Also, "inside the GW protected region" indicates networks (such as a home network and other section networks in FIG. 3) protected by gateways, while "outside the GW protected region" indicates other outside regions. Computers outside the GW protected region will be referred to as external nodes.

Figure 1:
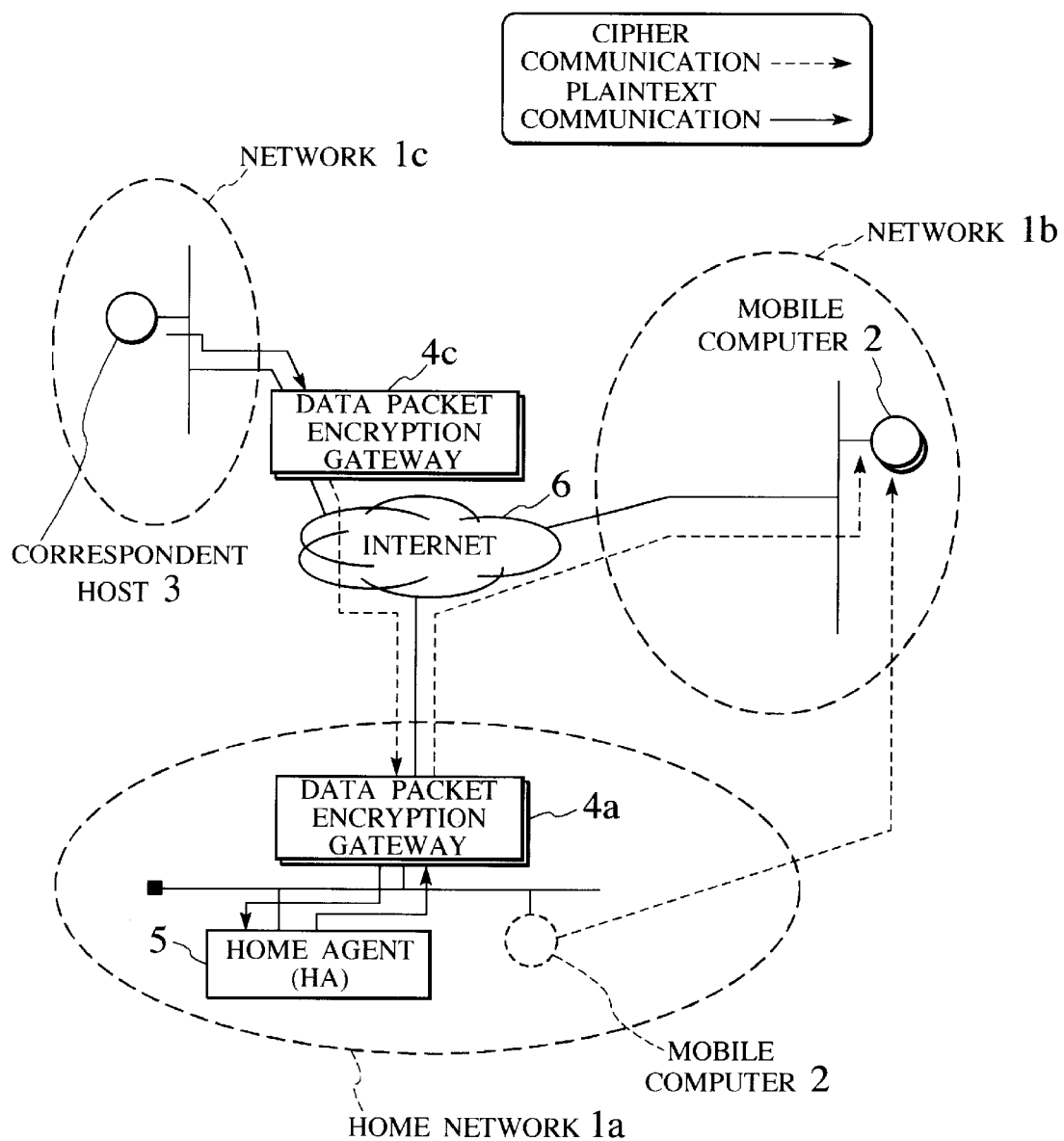
FIG. 1 is a diagram showing one exemplary conventional communication system supporting a mobile computing.
Figure 2:
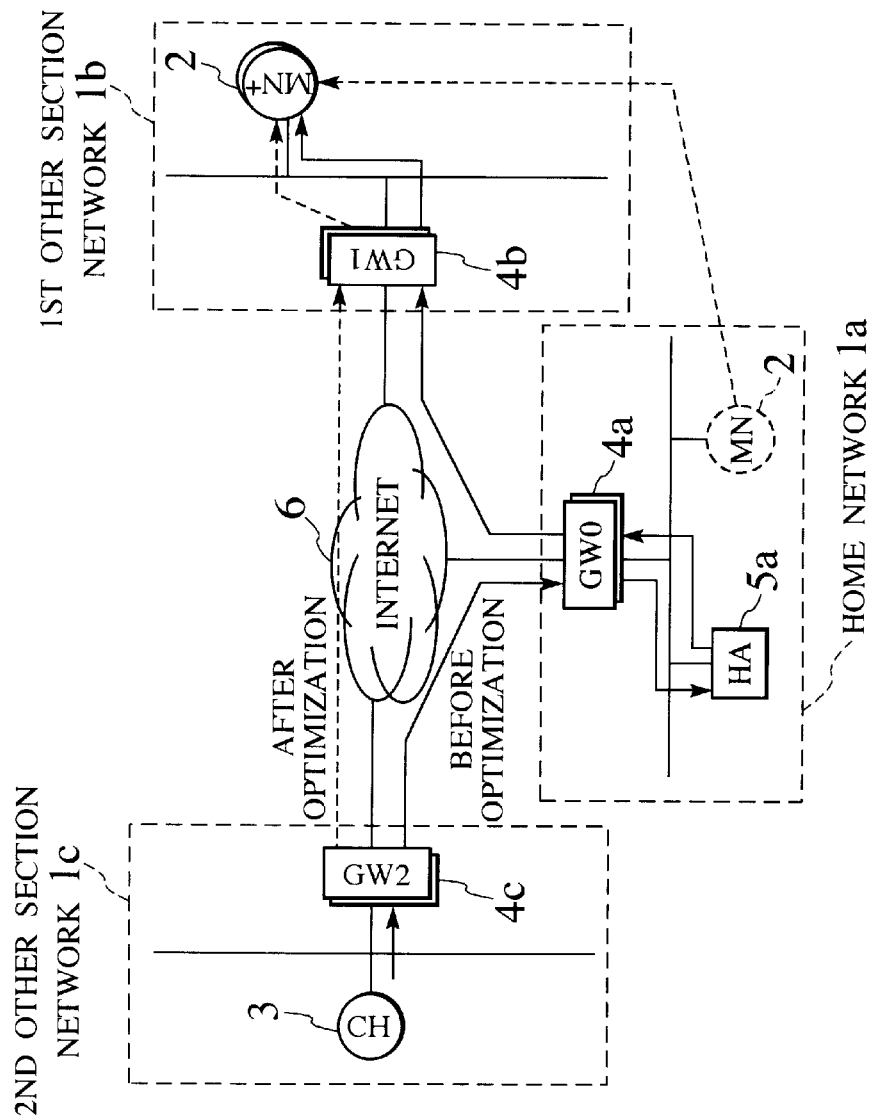
FIG. 2 is a diagram showing another exemplary conventional communication system supporting a mobile computing using a route optimization.
Figure 3:
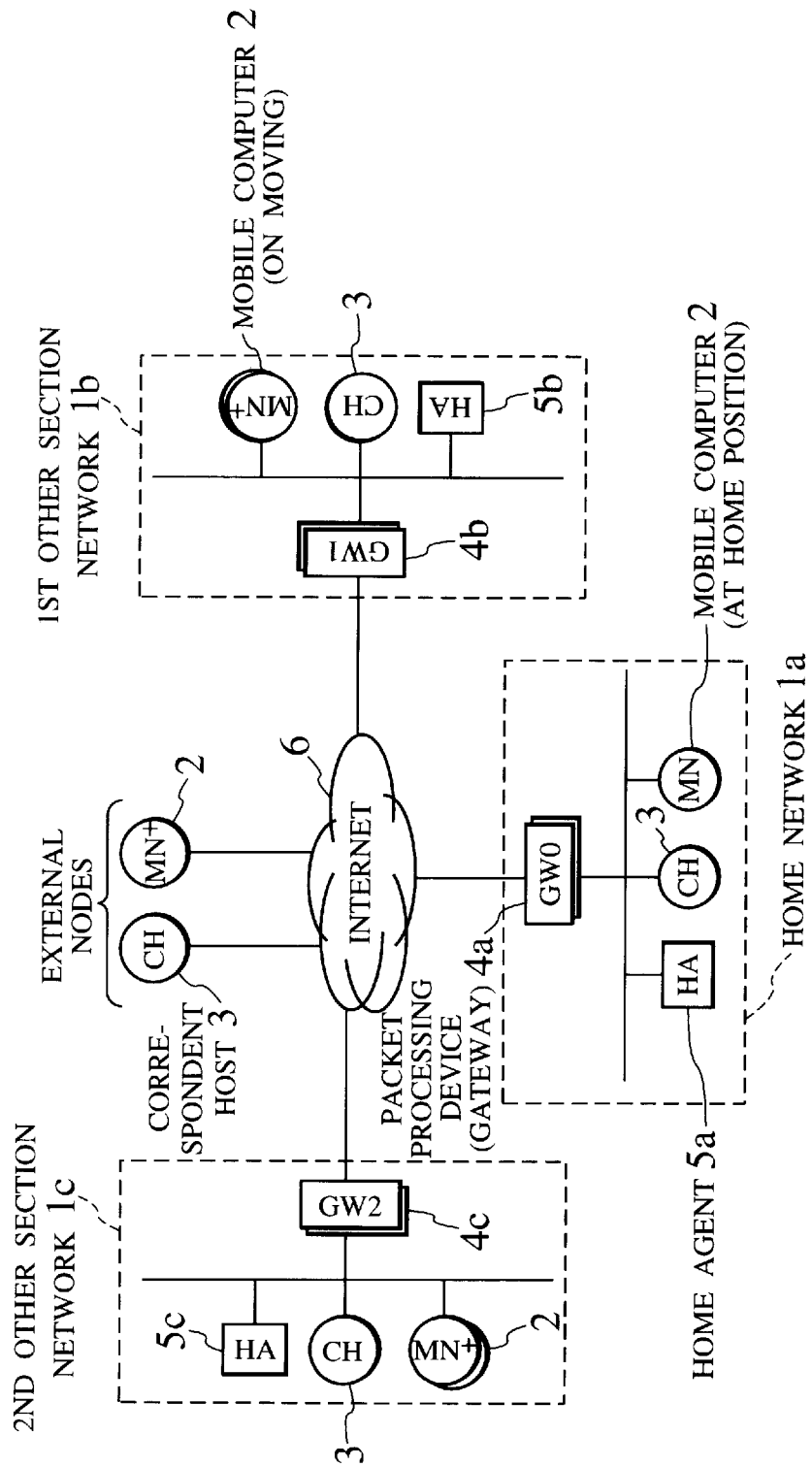
FIG. 3 is a block diagram showing a communication system using a packet processing device and a mobile computer according to one embodiment of the present invention.

FIG. 3 shows an exemplary basic configuration of a communication system according to the present invention. This communication system of FIG. 3 is assumed to be supporting communications by mobile computers according to the mobile IP and the IP security as in a case of FIG. 1 and FIG. 2 described above. Note that the mobile IP protocol has a mode which assumes an existence of a router called foreign agent which carries out the packet delivery for the mobile computer at the visited network, and a co-located care-of address mode in which no foreign agent is to be provided (a computer on the visited site plays the role of the foreign agent as well). In this embodiment, a case of adopting the co-located care-of address mode will be described as an example.

Note also that the packet communications among computers can be classified into three cases including a communication between stationary computers, a communication between a stationary computer and a mobile computer, and a communication between mobile computers. Since the mobile computer located inside the home network is a stationary node, the packet communications among computers can also be classified into three cases including a communication between stationary nodes, a communication between a stationary node and a mobile computer moving outside the home network, and a communication between mobile computers moving outside the home network.

The similar control procedure applies to a communication between stationary computers, a communication between a stationary computer and a mobile computer located inside the home network, and a communication between mobile computers located inside the home network. Also, a communication between mobile computers moving outside the home network is effectively a communication via a home agent (which is a stationary node) before the route optimization, so that it can be reduced to a communication between a stationary computer and a mobile computer moving outside the home network.

Consequently, in this embodiment, a packet transfer between the mobile computer (MN) 2 and the correspondent host (CH) 3 will be described mainly for a case in which the correspondent host (CH) 3 is a stationary node, although a case in which the correspondent host (CH) 3 is a mobile computer and a case of a communication between the stationary computers will also be described below.

Note also that this embodiment will be mainly described for a case of a packet communication between a mobile computer (MN) 2 that has a home position within the network 1a of FIG. 3 and its correspondent host (CH) 3, so that a network 1a is referred to as a home network and the other networks 1b and 1c are referred to as other section networks in FIG. 3.

Now, in FIG. 3, a home network 1a of a mobile computer (MN) 2, a first other section network 1b and a second other section network 1c are inter-connected through the Internet 6, where each of the mobile computer 2 and a correspondent host (CH) 3 of the mobile computer 2 can be connected within these networks, or connected to the Internet 6 as an external node. The networks 1a, 1b and 1c are assumed to be provided with packet processing devices (that is, packet encryption gateways which are also referred to as gateways (GW) hereafter) 4a, 4b and 4c, respectively. The gateways 4a, 4b and 4c also carry out the filtering according to the prescribed security policies, but a case where the packet satisfies the passing condition at each gateway will be described in this embodiment (because if a packet does not satisfy the passing condition, all that happen is that a packet simply cannot pass that gateway).

In FIG. 3, a home agent (HA) 5a for managing an information on a current location at a visited site of the mobile computer is provided in the home network 1a, in order to support the mobile IP protocol. A number of mobile computers to be managed is arbitrary. Also, as described above, the transferred IP packet destined to the moving mobile computer 2 is sent to the home agent 5a of the mobile computer 2, and the data routing control with respect to the mobile computer 2 is carried out by encapsulating an IP packet destined to an original address (an address in a home network 1a) of the mobile computer 2 within a packet destined to a current location address of the mobile computer 2. Note that the first and second other section networks 1b and 1c are also provided with the respective home agents 5b and 5c according to the need. Also, a third other section network 1d to be described below is also provided with the home agent 5d having the similar function.

Each of the gateways 4a, 4b and 4c is assumed to have a packet encryption and authentication processing function. Also, the mobile computer 2 is assumed to have a packet encryption and authentication processing function at least while it is moving (In the figures, the mobile computer 2 that has the packet encryption and authentication processing function is indicated as MN$^+$).

Note here that the encryption/decryption of communication data in the packet encryption and authentication processing can be realized by a scheme disclosed in IEFT RFC 1825, 1827, for example. Also, the attaching/checking of authentication data (such as a hash function value generated from a transferred packet content and a generation key) in the packet encryption and authentication processing can be realized by a scheme disclosed in IEFT RFC 1825, 1826, for example.

Note also that, in this embodiment, a stationary computer (especially a stationary computer which is an external node) is assumed to be not having the packet encryption and authentication processing function, although a case where the stationary computer which is an external node having the packet encryption and authentication processing function will be described below.

In this embodiment, in order to support the encryption/mobile computing, various packet formats will be used according to locations of computers for carrying out the packet communication, locations of gateways, etc.

FIGS. 4A to 4D show exemplary packet formats to be processed by the gateway and the mobile computer.

FIG. 4A shows a usual IP packet format.

An IP header registers a home address of a source and a home address of a destination for computers carrying out the communication. In this embodiment, an address of a computer that is a source and an address of the mobile computer that is a destination are to be registered in the IP header.

FIG. 4B shows a mobile IP format, which is a packet format to be routed by the home agent into a form destined to the mobile computer.

A top IP header registers an address of a home agent as a source and a care-of address of a current location of the mobile computer as a destination, while a next IP header registers an address of a computer that is a source and a home address (private address) of the mobile computer that is a destination.

FIG. 4C shows an encryption/end-to-end authentication format, which is a format for carrying out the packet encryption and authentication between end gateways or between an end gateway and the mobile computer.

In an IP header of an end-to-end authentication/encryption information, a source address and a destination address of end nodes that carry out the encryption/authentication are registered.

The KEY information (key information header) is a header information containing an information for obtaining a key to be used in the authentication processing and a key to be used in the decryption processing by the receiving side. For example, when the above keys are to be generated from a packet processing key, a packet processing key encrypted by a master key shared shared between the source node and the destination node of the IP header is registered here. Besides that, an information for specifying the authentication algorithm, the data encryption algorithm, and he key encryption algorithm is also registered here according to the need.

The AH information (authentication header) is a header information containing the authentication data generated by using a prescribed key (such as an authentication key generated from the above described packet processing key).

The ESP information (encryption header) is a header information containing an information for specifying an algorithm for decrypting the encrypted inner data (the inner IP header and its data portion here) by using a prescribed key (such as an encryption key generated by using the above described packet processing key).

The inner protocols section is an encapsulated packet which comprises an inner IP header containing a source address and a destination address of computers carrying out the communication and its data portion. For example, this section corresponds to the packet of FIG. 4A or FIG. 4B described above.

FIG. 4D shows an encryption/link authentication format, which is to be used in a case which requires the authentication between gateways on intermediate routes or between a gateway on an intermediate route and the mobile computer.

Here, the end-to-end authentication/encryption information section and the inner protocols section are the same as in the packet of FIG. 4C.

In an IP header of a link authentication/encryption information, a source address and a destination address of nodes that carry out the authentication are registered.

The KEY information (key information header) is a header information containing an information for obtaining a key to be used in the authentication processing by the receiving side. For example, similarly as in the above, when the above key is to be generated from a packet processing key, a packet processing key encrypted by a master key shared shared between the source node and the destination node of the IP header is registered here. Besides that, an information for specifying the authentication algorithm and the key encryption algorithm is also registered here according to the need.

The AH information (authentication header) is a header information containing the authentication data generated by using a prescribed key (such as an authentication key generated from the above described packet processing key).

Note that, in the encryption/end-to-end authentication format of FIG. 4C and the encryption/link authentication format of FIG. 4D, it is preferable to register an address information of a source computer and an address information of a destination computer in one plaintext header.

As the authentication data to be used by the gateway and the mobile computer, the one way hash function value (such as that of the Keyed MD5 scheme) generated from a transferred packet content and a generation key can be used, for example.

The master key to be shared between two data packet encryption gateways or between the data packet encryption gateway and the mobile computer can be generated by the exchange of a secret key or the derivation using a public key and a secret key (such as the Diffie-Hellman method), for example.

The authentication between ends is carried out between gateways which have the stationary nodes as their encryption and authentication targets, and between a gateway of the home network of the mobile computer and the mobile computer moving outside the home network.

The authentication between links of gateways is carried out between a gateway of the home network of the mobile computer and a gateway at the visited network of the mobile computer in the communication by the mobile computer moving to another network having a gateway and a node inside the home network of the mobile computer, and between the mobile computer and a gateway at the visited network of the mobile computer in a case where a gateway at the visited network does not pass a packet transmitted by the mobile computer to outside that network without the authentication.

Each gateway transfers a packet entered in any of the above described formats in the same format or a converted format. At this point, in a case where this gateway itself is the destination of the end-to-end authentication or the link authentication, a packet is passed only when the authentication check was successful. Also, in a case where this gateway is the source of the end-to-end authentication or the link authentication, a packet is transmitted by attaching a prescribed header information or by replacing a header information to a prescribed header information. Note that, at a time of the packet transfer, the decryption/re-encryption of the internal data is carried out according to the need.

Also, each computer transmits a packet in any of the above described formats other than the mobile IP format, and receives a packet in any of the above described formats. In a case where this computer is the destination of the end-to-end authentication, the decryption of the internal data is carried out and the internal data is accepted (given to an upper level module, for example) only when the authentication check was successful. Also, for a packet in the mobile IP format, the decapsulation is carried out.

A packet in the mobile IP format is transferred basically by the home agent alone, although there is also a special case of the route optimization where a gateway transfers a packet in this format as will be described below.

In this embodiment, each of the gateways 4a, 4b and 4c has an encryption and authentication processing target computer recognition function for recognizing a computer which is currently an encryption and authentication processing target at that gateway. This function can be realized, for example, by providing a server device for managing a database of information indicating which gateway has which computers as its encryption and authentication processing targets (more specifically, a correspondence between a network address of each gateway and network addresses of a group of computers which are its management targets, for example), somewhere (which may be distributed) in the communication system, and operating each gateway to search through that database. Else, this function can also be realized by maintaining information indicating network addresses of a group of computers which are the management targets of each gateway, at each gateway.

Also, each mobile computer can search the gateway which currently has that mobile computer as the encryption and authentication processing target, by referring to the above described database or inquiring to the gateway, using a location recognition unit to be described below.

Also, in this embodiment, each of the gateways 4a, 4b and 4c has a management target computer recognition function for recognizing a source computer which is the management target of that gateway, apart from the above described encryption and authentication processing target computer recognition function. This function can be realized, for example, by providing a server device for managing a database of information indicating which gateway has which computers as its management targets (more specifically, a correspondence between a network address of each gateway and network addresses of a group of computers which are its management targets, for example), somewhere (which may be distributed) in the communication system, and operating each gateway to search through that database. Else, this function can also be realized by maintaining information indicating network addresses of a group of computers which are the management targets of each gateway, at each gateway.

At each of the gateways 4a, 4b and 4c, in a case where a packet transmitted from a computer inside its network is a packet transmitted from a computer managed by that gateway (such as a computer having a home position inside its network), this packet is passed to outside its network without the authentication check (after applying the necessary processing), and in a case where this packet is a packet transmitted from a computer not managed by that gateway (such as a computer temporarily moved inside its network), this packet is passed to outside its network after applying the necessary processing when the proper authentication data is contained in that packet but the passing of this packet to outside its network is refused when the proper authentication data is not contained in that packet (as in a case where the authentication data is contained in this packet but judged to be improper by the authentication check or a case where the authentication itself is not contained in this packet).

Also, at each of the gateways 4a, 4b and 4c, when a key information necessary in generating the authentication data is requested from a mobile computer for which the packet transfer is refused, the requested key information is returned when it is checked that a user information regarding a user of the mobile computer extracted from the request message satisfies a prescribed condition.

Note that, depending on the security policies adopted by the networks, there can be a case where a packet transmitted by a computer moved from outside is passed to outside the network without the authentication check by a gateway. For example, only prescribed mobile computers such as those moved from familiar networks are registered as the management targets of a gateway, a packet transmitted from a computer inside the network may be passed to outside the network without the authentication check by that gateway, regardless of whether this packet is transmitted from a computer managed by that gateway or not.

In a case where some network adopts the security policy according to which all packets from inside the network are to be passed to outside the network without the authentication check, the management target computer recognition unit is unnecessary at a gateway of that network.

Now, the processing to be carried out when the mobile computer 2 moved to the other section network 1b will be described.

First, the detection of the current location and the acquisition of the care-of address to be used at the visited network by the mobile computer 2 itself will be described.

The mobile computer 2 has the location recognition unit for recognizing that this mobile computer 2 is located outside the network (home network) 1a at which the home agent 5a for managing this mobile computer 2 is provided.

Figure 5:
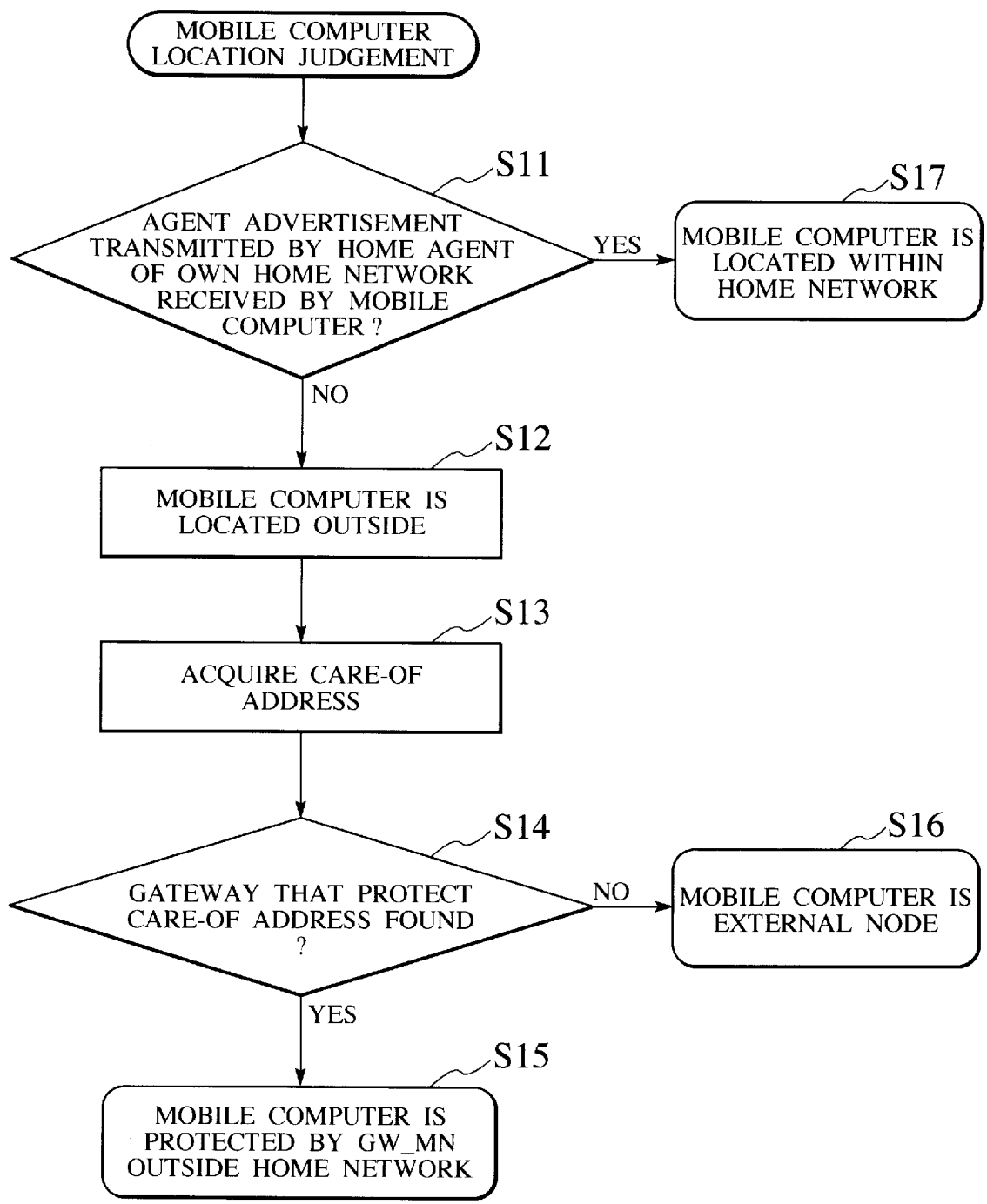
FIG. 5 is a flow chart for a mobile computer location judgement processing according to one embodiment of the present invention.

FIG. 5 shows an exemplary processing procedure for detecting a current location of the mobile computer 2 by this location recognition unit.

Here, as specified by the mobile IP, each home agent is assumed to be regularly transmitting the agent advertisement message by broadcasting within the subnet in which it is operated. Also, each gateway is assumed to be disclosing a list of addresses of computers which are inspection targets of each gateway, so that it is possible to search a gateway that is responsible for checking transmission packets of a given computer.

At the mobile computer 2 side, first, whether this mobile computer 2 is located inside the home network 1a or outside the home network 1a is judged. Here, whether it is located inside the home network 1a or not is detected by trying to receive the agent advertisement message transmitted by the home agent 5a that manages this mobile computer 2 (step S11). When the agent advertisement message by the home agent 5a of the home network 1a to which this mobile computer 2 belongs is received, it is judged that this mobile computer 2 is located inside the home network 1a (step S17). When the agent advertisement message by the other home agent or when the agent advertisement message cannot be received, it is judged that this mobile computer 2 is located outside the home network 1a (step S12).

When this mobile computer 2 is judged to be located outside the home network 1a, this mobile computer 2 acquires the care-of address of the mobile IP to be used in the visited network, at the visited network (1b here) by means of the protocol such as DHCP and PPP (step S13).

Also, the mobile computer 2 searches a gateway (GW_MN) that protects this care-of address (for which this care-of address is the encryption and authentication processing target) (step S14).

When such a gateway (GW_MN) is found, it is judged that the mobile computer 2 is protected by this gateway GW_MN outside the home network (step S15). In addition, when the gateway (GW_MN) found by the search coincides with the gateway of the home network (when the mobile computer 2 moved to another subnet within the home network 1a, for example), this mobile computer 2 is judged to be located inside a home domain [MN-home]. Otherwise, this mobile computer 2 is judged to be located outside a home domain [MN-foreign].

When it is judged to be located inside the home domain, the registration request is transmitted in the usual IP packet format, without executing the following location registration processing sequence.

Note that, when there is no gateway that protects the care-of address, the mobile computer 2 is judged as an external node (step S16).

Note also that, when the care-of address is acquired, a correspondence between the mobile computer 2 and a gateway which has this mobile computer 2 as the encryption and authentication processing target is registered into a prescribed database and the like.

Next, a processing for the mobile computer to notify the mobile registration message to the home agent will be described.

In the mobile IP scheme, when the mobile computer moves to a new visiting site, it is necessary for this mobile computer to send a registration message containing an information on a current location to the home agent which manages this mobile computer. In this case, when the mobile computer moved to a network which is familiar to the home network of the mobile computer so that a gateway provided there freely allows the transmission of the registration message or the data packets from this mobile computer to outside the network, it is possible for the mobile computer to carry out the operation exactly as specified by the mobile IP.

On the other hand, in a general network which treats the mobile computer as visiting (or intruding) inside the network from outside the network, it is judged to be dangerous to freely allow the transmission of the message issued by the mobile computer to outside the network, from a viewpoint of the security, so that the gateway provided there once refuses to pass the registration message or the data packets transmitted by a mobile computer other than the management target computers of that gateway. In such a case, it becomes necessary for the mobile computer to recognize that it is currently located in a network which treats it as an intruder, and carries out the transmission of the registration message to the home agent after obtaining a permission for external access by carrying out a processing for establishing the own identification with respect to the gateway.

In the IETF, a scheme for attaching authentication code to an IP packet is specified as the IP security standard (IETF RFC 1826, 1828), and in this embodiment, this scheme is utilized in such a manner that authentication data for authentication between the mobile computer and the gateway of the visited network is attached to a data packet as a processing for establishing the identification of the mobile computer, and a packet is passed to outside the network by the gateway after the authentication code of the received packet is checked. In this manner, even when a user not belonging to the organization comes in and tries to request the transmission of a data packet to outside the network, it is possible to permit the external access only to the mobile computer which established the identification by exchanging the authentication key in the prescribed method.

Now, when the care-of address is acquired, the mobile computer 2 transmits the registration message containing an information on a current location to the home agent 5a of the home network 1a.

First, in a case where the mobile computer 2 is located in the home domain [MN-home], it suffices to check the IP address of the home agent (HA) and the IP address of the mobile computer (MN), send the registration request in the usual IP packet format with the mobile computer as a source and the home agent as a destination, and receive a response in the IP packet format from the home agent.

Note that the IP addresses of the home agent and the mobile computer are assumed to be the private addresses in the home network here.

Next, a case where the mobile computer 2 has moved outside the home domain [MN-foreign] will be described.

Figure 6:
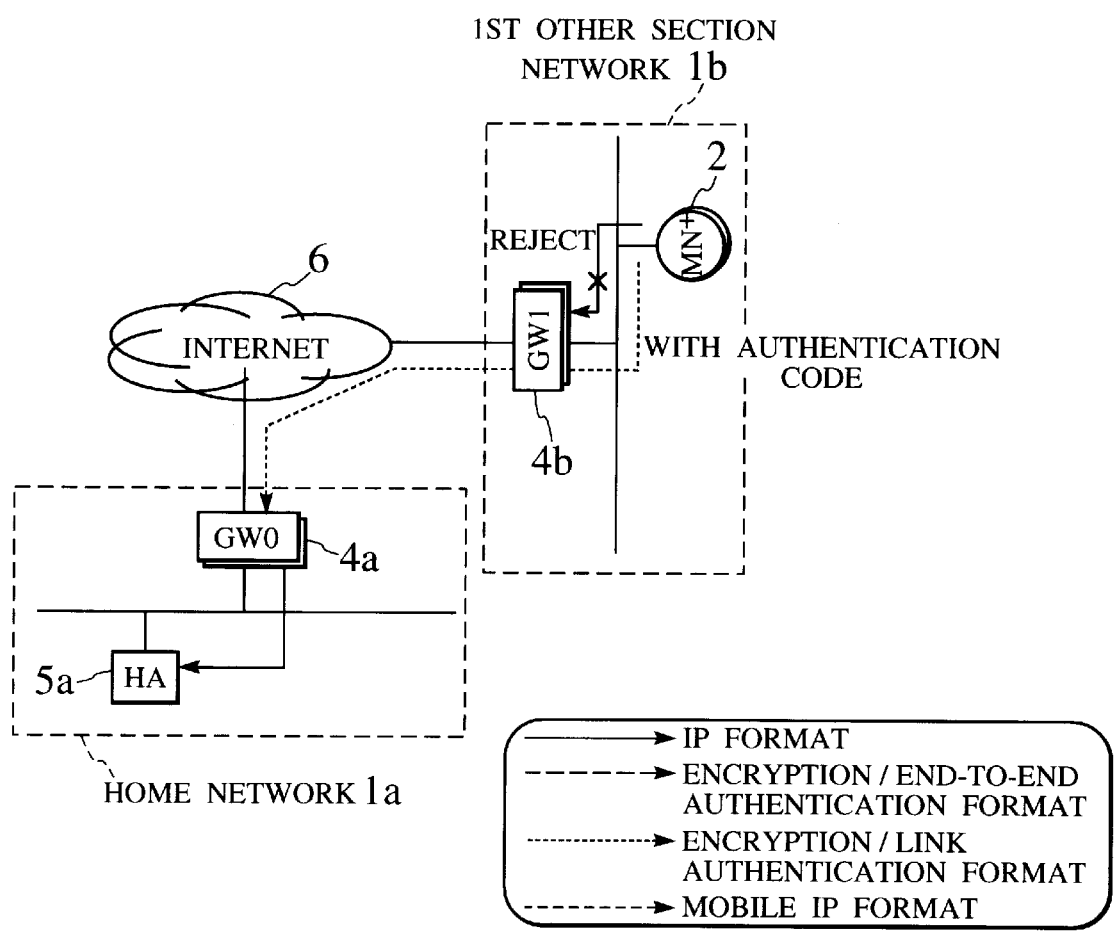
FIG. 6 is a diagram for explaining a registration message transmission procedure according to one embodiment of the present invention.

For example, in a case where the mobile computer 2 has moved to the first other section network 1b as shown in FIG. 6, the mobile computer 2 first checks the global address of the gateway (GW0) of the home network, the public key of the gateway (GW0) of the home network, the care-of address and the private address of the mobile computer (MN), and the private address of the home agent (HA), and sends a first registration message.

Figure 7:
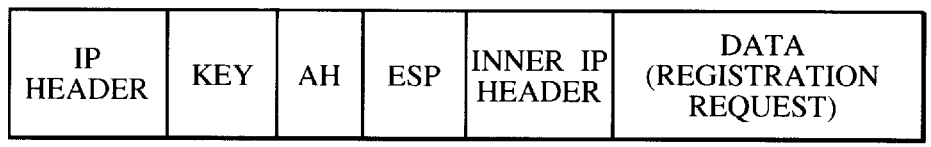
FIG. 7 is a diagram showing one exemplary format of a first registration request message according to one embodiment of the present invention.

FIG. 7 shows one example of this first registration message, which corresponds to a packet in the encryption/end-to-end authentication format of FIG. 4C described above.

The IP header of the end-to-end authentication/encryption information has the care-of address of the mobile computer (MN) 2 as a source and the global address of the gateway (GW0) 4a as a destination.

The inner IP header (registration request) has the private address of the mobile computer (MN) 2 as a source and the private address of the home agent (HA) 5a as a destination.

In response to this first registration message, if the mobile computer 2 has moved to a network familiar to the home network 1a so that the gateway there freely allows the transmission of the registration message to outside, the gateway 4b passes the registration message without the authentication check so that only a permission response will be returned. However, in a case where the gateway 4b is a gateway that refuses to pass a packet destined to outside upon receiving a packet not destined to this gateway from a computer which is not a management target of this gateway, the passing of this registration message will be refused so that a passing refuse message will be returned from the gateway 4b to the mobile computer 2.

Figure 8:
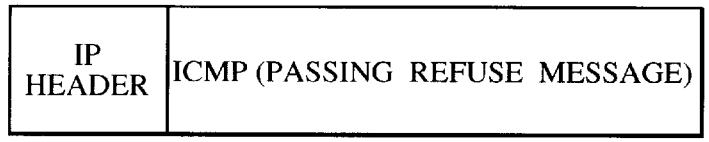
FIG. 8 is a diagram showing one exemplary format of a passing refuse message according to one embodiment of the present invention.

FIG. 8 shows one example of this passing refuse message which is realized in an extended format of an ICMP message of the TCP/IP communication, and which corresponds to the usual IP packet format of FIG. 4A described above.

The IP header has the global address of the gateway (GW1) 4b as a source and the care-of address of the mobile computer (MN) 2 as a destination.

In this case, the mobile computer 2 transmits a key request message with respect to the gateway 4b by using the global address of the gateway 4b contained in this passing refuse message, so as to make a query for the public key by a prescribed protocol.

Figure 9:
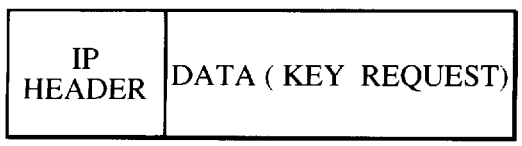
FIG. 9 is a diagram showing one exemplary format of a key request message according to one embodiment of the present invention.

FIG. 9 shows one example of this key request message, which corresponds to the usual IP packet format of FIG. 4A described above.

The IP header has the care-of address of the mobile computer (MN) 2 as a source and the global address of the gateway (GW1) 4b as a destination.

In response to this key request message, the judgement by the gateway 4b as to whether or not to give the public key information is depending on the system management policy at the site of the gateway 4b. For example, rules such as the following can be registered at the gateway 4b.

The key information is given if it is a user belonging to the company, upon checking the user ID information attached to the key request message in a prescribed format.

The key information is given if it is a user not belonging to the company but belonging to a prescribed organization.

Otherwise, the information is given if it is a user registered in advance.

A method of user registration with respect to the gateway 4b can be set up arbitrarily according to the system properties.

When the public key of the gateway 4b is obtained in response to the key request message, the mobile computer 2 transmits a second registration request by attaching the authentication data generated by using this key. Note that if a computer which is not a management target of the gateway 4b cannot obtain the key information, this computer cannot make its packet passed to outside by the gateway 4b.

Figure 10:
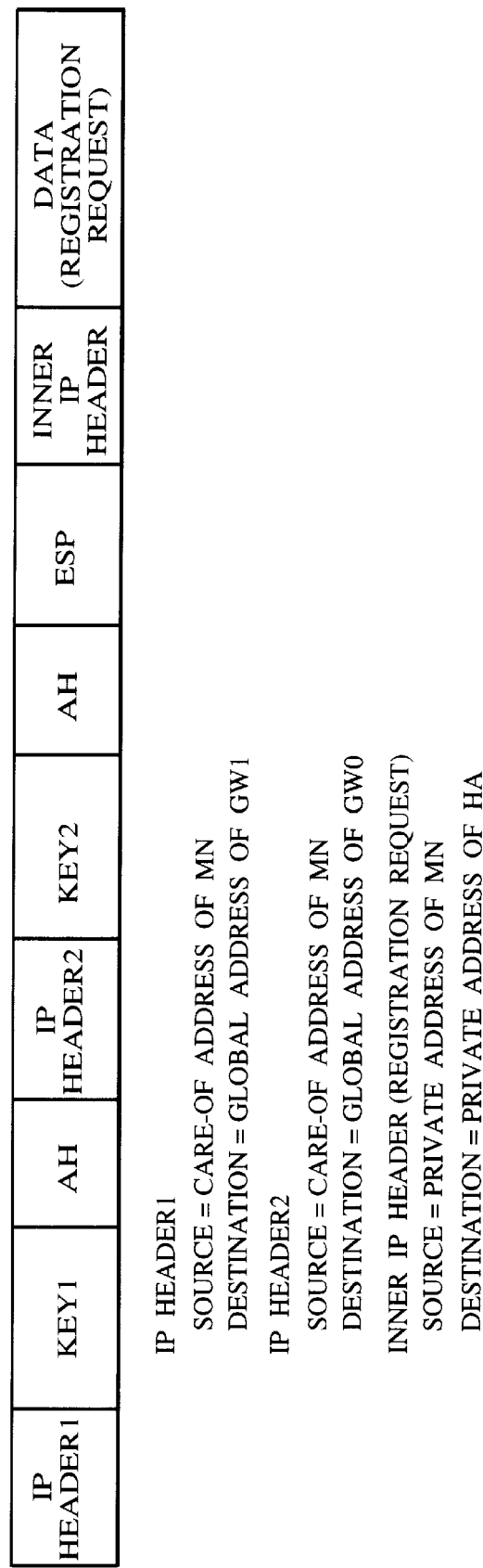
FIG. 10 is a diagram showing one exemplary format of a second registration request message according to one embodiment of the present invention.

FIG. 10 shows one example of this second registration message, which corresponds to a packet in the encryption/link authentication format of FIG. 4D described above.

The IP header1 of the link authentication information has the care-of address of the mobile computer (MN) 2 as a source and the global address of the gateway (GW1) 4b as a destination.

The IP header2 of the end-to-end authentication/encryption information has the care-of address of the mobile computer (MN) 2 as a source and the global address of the gateway (GW0) 4a as a destination.

The inner IP header (registration request) has the private address of the mobile computer (MN) 2 as a source and the private address of the home agent (HA) 5a as a destination.

This second registration message is destined to the gateway 4b and attached with the AH information (the AH information in the link authentication information of FIG. 4D) containing the authentication data with respect to the gateway 4b, so that the gateway 4b carries out the authentication check processing, and when this is successful, this second registration message will be passed.

As this point, the gateway 4b transfers this registration message as a packet in the encryption/link authentication format of FIG. 4D destined to the next hop gateway 4a. Then, this registration message arrives at the home agent 5a via the Internet 6 and the gateway 4a.

Also, at the network 1b, for example, a setting is made in the management table of the gateway 4b so that a packet transferred from the Internet 6 side which is destined to this mobile computer 2 will be transferred to the home agent 5a. By means of this setting, a packet destined to the mobile computer 2 that is transferred from the Internet 6 to the home network 1a of the mobile computer 2 will be given to the home agent 5a once, and further transferred to a visiting site of the mobile computer 2 from there. At this point, the home agent 5a carries out the processing for encapsulating an IP packet destined to the original address (address in the home network 1a) of the mobile computer 2 within a packet in the mobile IP format destined to a current location address of the mobile computer 2, as described above. Else, the home agent 5a may carry out the proxy ARP (Address Resolution Protocol) for the mobile computer (MN) so as to obtain the packet.

Now, when the registration message is received, the home agent 5a transmits the registration response message in the IP format having the home agent 5a as a source and the mobile computer 2 as a destination, with respect to the mobile computer 2.

Figure 11:
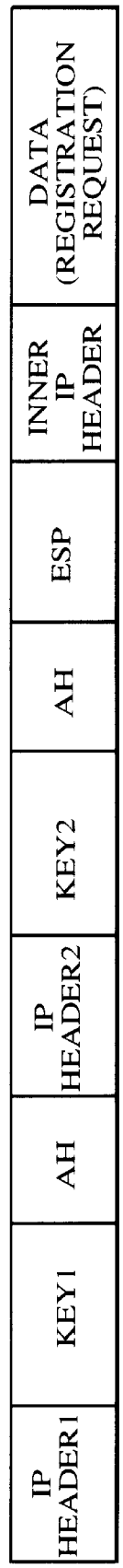
FIG. 11 is a diagram showing one exemplary format of a registration response message to be transferred between gateways according to one embodiment of the present invention.

When the registration response message is received from the home agent 5a, the gateway 4a transfers this packet by encapsulating it within a packet in the encryption/link authentication format destined to the next hop gateway 4b as shown in FIG. 11.

In FIG. 11, the IP header1 of the link authentication information has the global address of the gateway (GW0) 4a as a source and the global address of the gateway (GW1) 4b as a destination.

The IP header2 of the end-to-end authentication/ encryption information has the global address of the gateway (GW0) 4a as a source and the care-of address of the mobile computer (MN) 2 as a destination.

The inner IP header (registration response) has the private address of the home agent (HA) as a source and the private address of the mobile computer (MN) as a destination.

Figure 12:
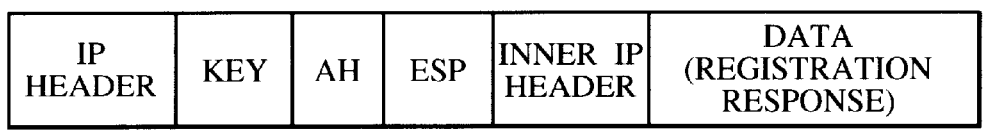
FIG. 12 is a diagram showing one exemplary format of a registration response message to be received by a mobile computer according to one embodiment of the present invention.

When this packet reaches to the gateway 4b, the gateway 4b transfers it as a packet in the encryption/end-to-end authentication format (by removing the IP header1, KEY1 and AH) destined to the mobile computer as shown in FIG. 12.

When the above described registration processing is completed (that is, a case in which the permission response is received by the exchange of the key information and the authentication data after a message indicating the refusal of the transfer is received once with respect to the registration message), the mobile computer 2 thereafter transfers the packet by attaching the authentication data between the mobile computer 2 and the gateway 4b, even in a case of carrying out the data communication with the corespondent host computer 3 located outside the visited network 1b. In this embodiment, this packet is transmitted in the encryption/link authentication format. By checking whether this authentication data is attached or not, it is possible for the gateway 4b to properly judge whether it is a properly recognized visiting node or not, and therefore it becomes possible to carry out the message control for the mobile computer which is proper from a viewpoint of the security.

Note that, when the permission response is received without receiving the transfer refusal with respect to the registration message, a packet is transmitted to the correspondent host computer 3 as usual. In this embodiment, this packet is transmitted in the encryption/end-to-end authentication format.

Note also that, when the mobile computer moves as an external node, the registration message from the mobile computer to the home agent is transmitted in the encryption/ end-to-end authentication format, transferred to the gateway without the passing refusal unlike the above described case and converted into the IP format there, and then reaches to the home agent. Also, the response message in the usual IP format from the home agent to the mobile computer is converted into the encryption/end-to-end authentication format at the gateway, and reaches to the mobile computer. Thereafter, even in a case of carrying out the data communication with the correspondent host computer 3, the mobile computer 2 transmits the packet in the encryption/end-to-end authentication format.

Here, when the mobile computer moved outside the home network, a set of the address of the mobile computer in the home network and the acquired care-of address is registered in a prescribed database, by the mobile computer, or the home agent, or the gateway of the home network, so that the gateway will carry out the necessary control in the subsequent packet transfer. This database is managed by a server device provided somewhere in the communication system, or managed distributedly by the gateways, and set to be capable of being searched by each gateway.

In the following, the operation of each node and a packet format to be used in various cases of packet communication between computers in various positional relationships will be described in detail.

First, the basic protocol relating to packet formats for the packet transmission and reception by computers and gateways will be described.

Here, a stationary node includes a stationary computer which is not a mobile computer, a mobile computer which is located inside the home network, and a home agent. Also, each network is assumed to be protected by a gateway.

The following P0-1 to P0-3 are cases where a gateway is not involved in the packet transfer.

Figures 20, 21:
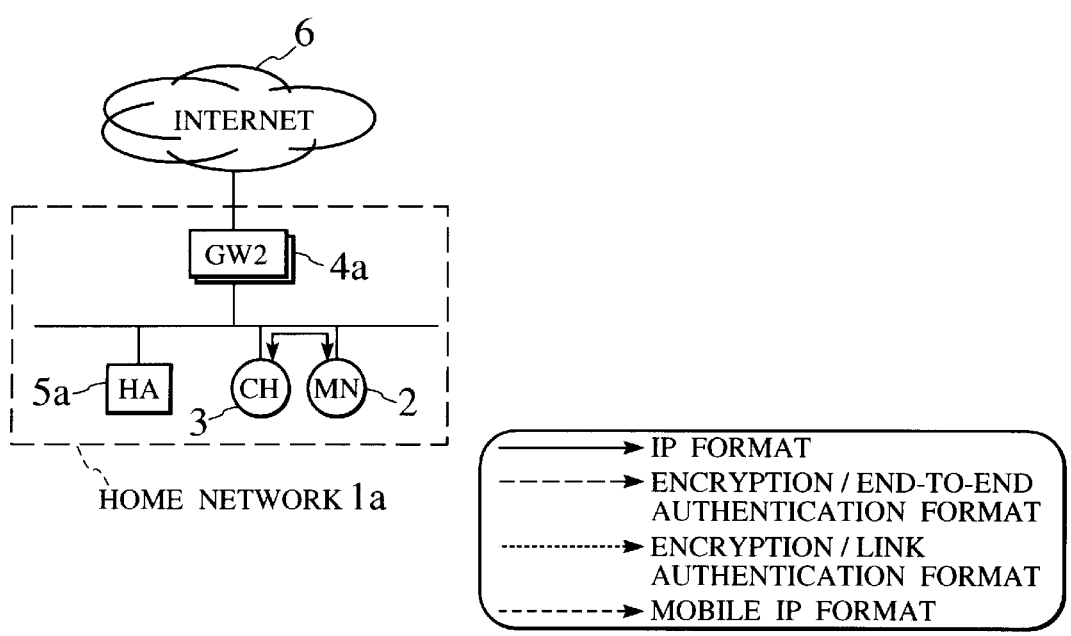
FIG. 20 is a table summarizing a sub-classification of communication cases [1] and [2] of FIG. 19 according to one embodiment of the present invention.
FIG. 21 is a schematic diagram showing a manner of communication between a mobile computer and a correspondent host in a communication case (1) of FIG. 20 according to one embodiment of the present invention.
Figures 23, 24:
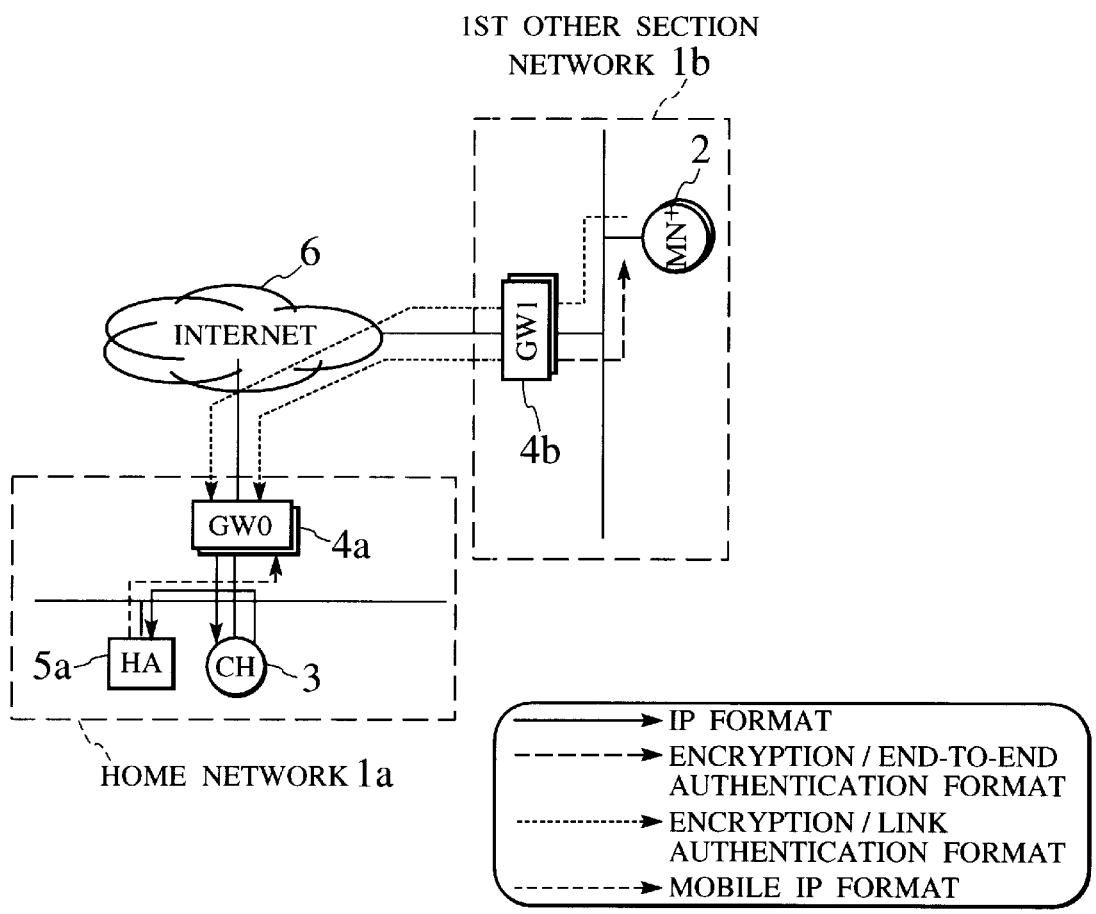
FIG. 23 is a schematic diagram showing a manner of communication between a mobile computer and a correspondent host in a communication case (3) of FIG. 20 according to one embodiment of the present invention.
FIG. 24 is a diagram showing one exemplary format of a packet transmitted by a mobile computer in the communication case shown in FIG. 23.
Figure 25:
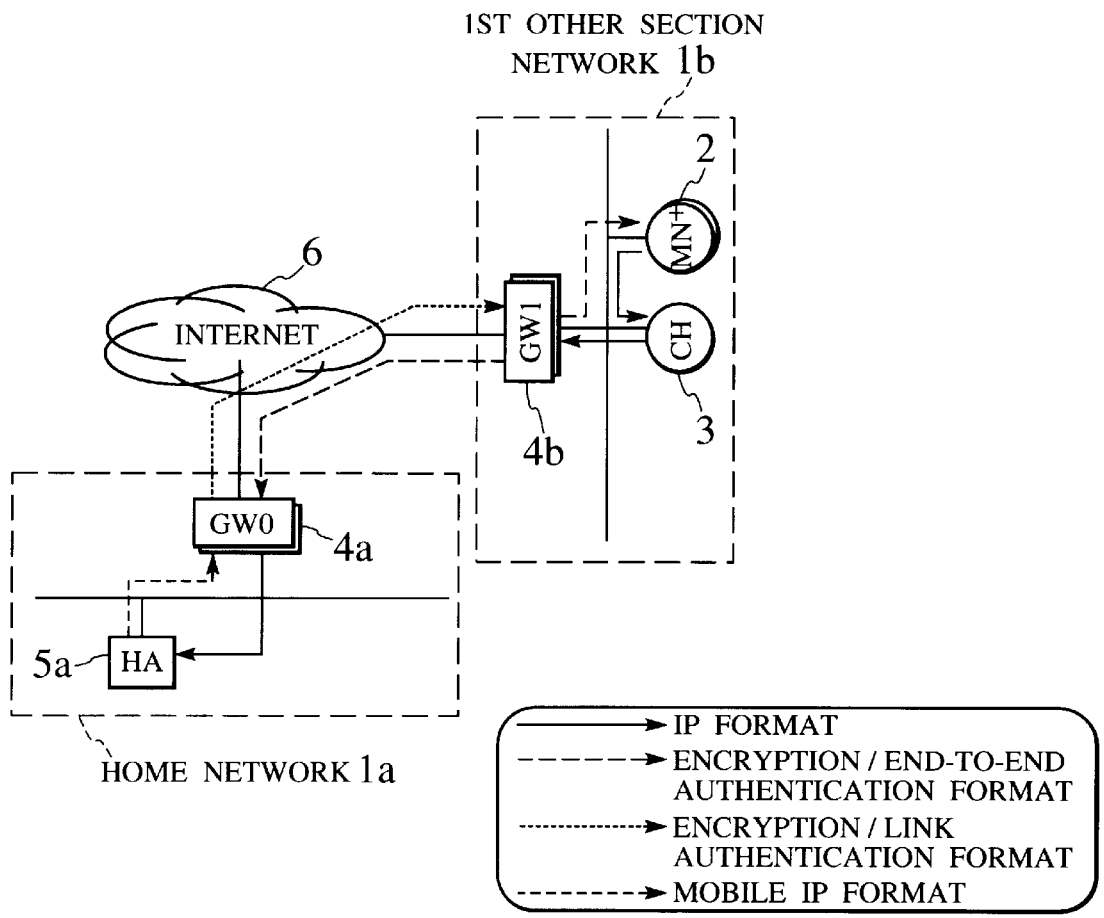
FIG. 25 is a schematic diagram showing a manner of communication between a mobile computer and a correspondent host in a communication case (4) of FIG. 20 according to one embodiment of the present invention.
Figure 26:
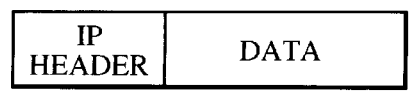
FIG. 26 is a diagram showing one exemplary format of a packet transmitted by a mobile computer in the communication case shown in FIG. 25.

(P0-1) For a stationary node located inside the network at which a source node is also located, a packet in the usual IP format is directly transferred form the source node (see the correspondent host CH and the mobile computer MN in FIG. 21, the correspondent host CH→the home agent HA in FIG. 23, and the mobile computer MN→the correspondent host CH in FIG. 25).

(P0-2) Between stationary computers which are the external nodes, a packet is directly transmitted in the usual IP packet format.

(P0-3) Between mobile computers which are moving as the external nodes, a packet is directly transmitted in the encryption/end-to-end authentication format after the route optimization.

The following P2-1 to P2-3 are case where two communicating nodes are located at different networks and two gateways are involved in the packet transfer.

Figure 13:
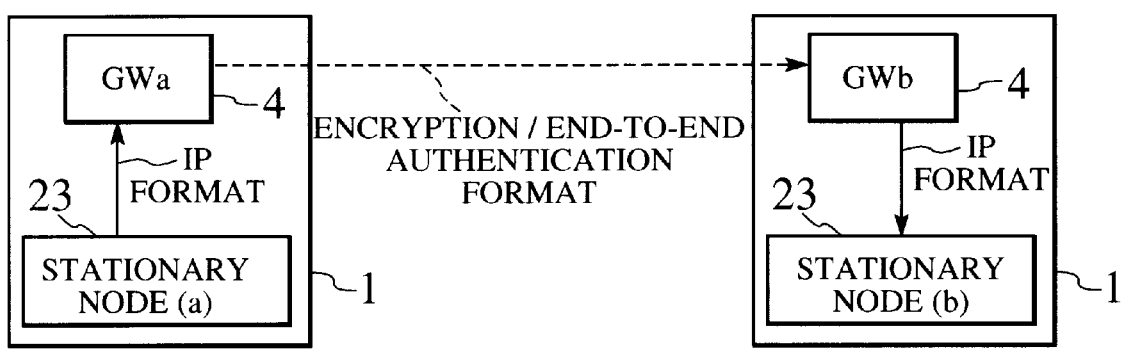
FIG. 13 is a schematic diagram showing an exemplary communication mode (P2-1) between nodes according to one embodiment of the present invention.

(P2-1) A case of packet transfer from a first stationary node (a) to a second stationary node (b) (stationary node (a)→GWa→Internet→GWb→stationary node (b)): in this case, as shown in FIG. 13, the stationary node (a) transmits a packet in the usual IP format, the gateway GWa transfers the packet by converting it into the encryption/end-to-end authentication format, and the gateway GWb transfers the packet by converting it into the IP format. The end-to-end authentication is carried out between the gateways GWa and GWb.

(P2-2) A case of packet transfer from a mobile computer moving in the other section network to a stationary node (mobile computer→GWa→Internet→GWb→stationary node): this case includes the following two cases.

Figure 14:
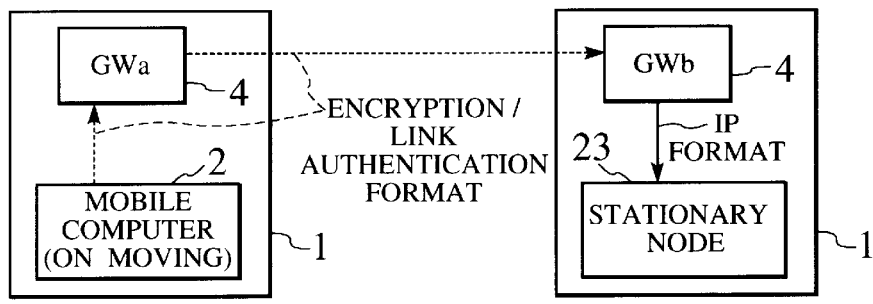
FIG. 14 is a schematic diagram showing an exemplary communication mode (P2-2) between nodes according to one embodiment of the present invention in one case.

(i) In a case where the mobile computer is located in the other section network that does not allow to pass a packet transmitted by the mobile computer to outside without checking the authentication, as shown in FIG. 14, the mobile computer transmits the packet in the encryption/link authentication format, the gateway GWa transfers the packet in the encryption/link authentication format, and the gateway GWb transfers the packet by converting it into the IP format. The end-to-end authentication is carried out between the mobile computer and the gateway GWb. The link authentication is carried out between the mobile computer and the gateway GWa as well as between the gateways GWa and GWb.

Figure 15:
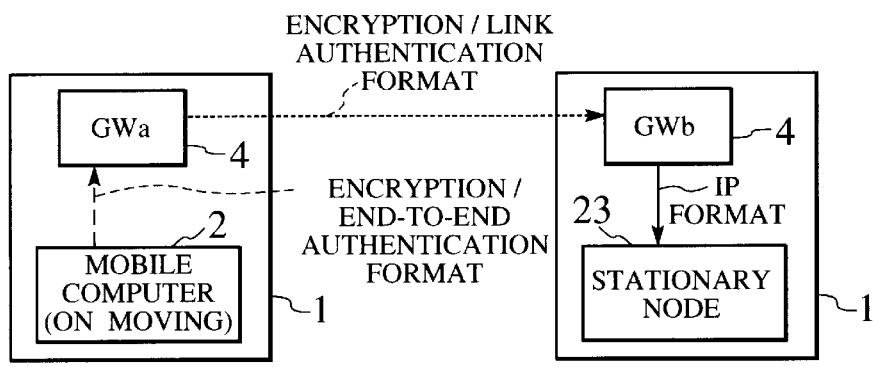
FIG. 15 is a schematic diagram showing an exemplary communication mode (P2-2) between nodes according to one embodiment of the present invention in another case.

(ii) In a case where the mobile computer is located in the other section network that allows to pass a packet transmitted by the mobile computer to outside without checking the authentication, as shown in FIG. 15, the mobile computer transmits the packet in the encryption/end-to-end authentication format, the gateway GWa transfers the packet by converting it into the encryption/link authentication format, and the gateway GWb transfers the packet by converting it into the IP format. The end-to-end authentication is carried out between the mobile computer and the gateway GWb. The link authentication is carried out between the gateways GWa and GWb.

(P2-3) A case of packet transfer from a stationary node to a mobile computer moving in the other section network (stationary node→GWa→Internet→GWb→mobile computer): in this case, the home agent transmits a packet in the mobile IP format and a registration response message in the usual IP format. Also, after the route optimization, a stationary computer which is not a mobile computer or a mobile computer which is located inside the home network transmits a packet in the IP format.

In either case, the gateway GWa transfers the packet by converting it into the encryption/link authentication format, and the gateway GWb transfers the packet by converting it into the encryption/end-to-end authentication format. The end-to-end authentication is carried out between the gateway GWa and the mobile computer. The link authentication is carried out between the gateways GWa and GWb.

Figure 16:
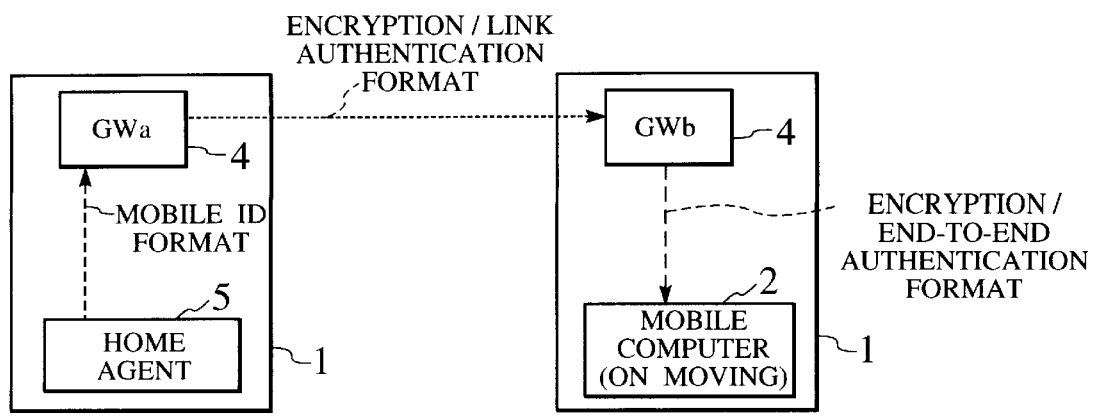
FIG. 16 is a schematic diagram showing an exemplary communication mode (P2-3) between nodes according to one embodiment of the present invention.

FIG. 16 shows a packet transfer by the home agent in this case. Here, the operation is identical for a case where the mobile computer is located in the other section network that does not allow to pass a packet transmitted by the mobile computer to outside without checking the authentication, and for a case where the mobile computer is located in the other section network that allows to pass a packet transmitted by the mobile computer to outside without checking the authentication, The following P1-1 to P1-4 are cases where one gateway is involved in the packet transfer.

Figure 17:
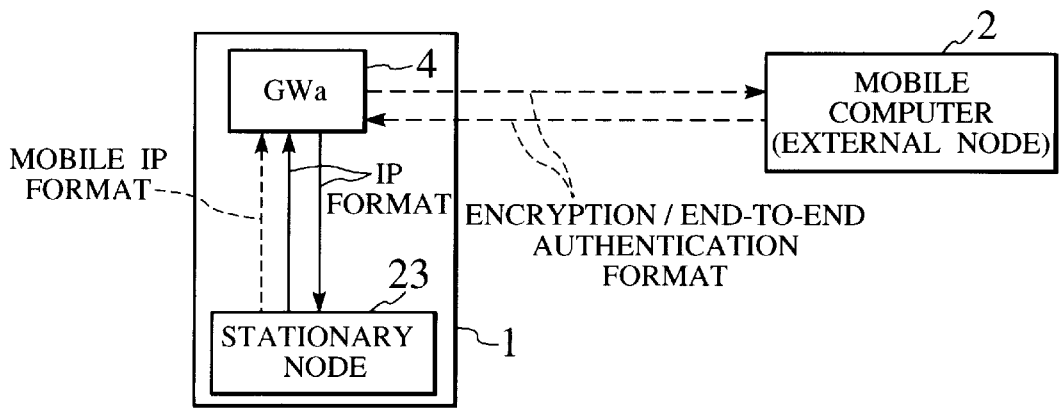
FIG. 17 is a schematic diagram showing exemplary communication modes (P1-1) and (P1-2) between nodes according to one embodiment of the present invention.

(P1-1) A case of communication from a mobile computer moving as an external node to a stationary node located inside GW protected region (mobile computer→GW→stationary node): in this case, as shown in FIG. 17, the mobile computer transmits a packet in the encryption/end-to-end authentication format, and the gateway GW transfers the packet by converting it into the usual IP format. The end-to-end authentication is carried out between the mobile computer and the gateway GW.

(P1-2) A case of communication from a stationary node located inside GW protected region to a mobile computer moving as an external node (stationary node→GW→mobile computer): in this case, as shown in FIG. 17, the home agent transmits a packet in the mobile IP format and a registration response message in the usual IP format. Also, after the route optimization, a stationary computer which is not a mobile computer or a mobile computer which is located inside the home network transmits a packet in the IP format.

In either case, the gateway GW transfers the packet by converting it into the encryption/end-to-end authentication format. The end-to-end authentication is carried out between the gateway GW and the mobile computer.

(P1-3) A case of communication from an external node in a form of a stationary computer to a stationary node inside GW protected region: in this case, it is assumed that the cipher communication is not to be carried out, so that a packet is transferred in the usual IP format between the external node and the gateway GW as well as between the gateway GW and the stationary node.

Note that, in a case of supporting an optional case in which the cipher communication is made available if the external node in a form of a stationary computer has the encryption and authentication function, the operation is similar to those of P1-1 and P1-2 described above.

(P1-4) A case of packet transfer to a mobile computer moving in the other section network from a stationary node located inside the same network, after the route optimization (stationary node→GW→mobile computer): in this case, the stationary node transmits a packet in the usual IP format, and the gateway GW transfers the packet to the mobile computer by converting it into the mobile IP format.

The following Pz-1 to Pz-3 are cases depending on the security policy.

(Pz-1) A case of communication from a mobile computer moving as an external node to an external node in a form of a stationary computer: in this case, as described below, the communication is realized via the home network as the proxy. Consequently, the encryption/end-to-end authentication format is used for a packet communication between the mobile computer and the gateway, while the usual IP format is used for a packet communication between the stationary computer and the gateway.

(Pz-2) A case of communication from a mobile computer moving in the other section network to an external node in a form of a stationary computer: in this case, it is assumed that the cipher communication is not to be carried out.

(Pz-3) A case of using the route optimization in the above described Pz-2: in this case, the mobile computer and the stationary computer do not carry out the cipher communication, and directly communicates via the gateway.

Note that, in the above described Pz-2 and Pz-3, the authentication may be carried out (by using the encryption/end-to-end authentication format, for example) between the mobile computer and the gateway in order to make the gateway to pass only a packet from the mobile computer to the stationary computer.

The above described protocol can be summarized in terms of source computers, as follows.

A stationary computer always transmits a packet in the usual IP format.

A home agent uses the mobile IP format in a case of packet transfer to a mobile computer, but a registration response message is transmitted in the IP format.

A mobile computer operates differently, according to a result of recognition of its own current location, as follows.

(S1) When the mobile computer is located at the home network, a packet in the usual IP format is transmitted.

(S2) When it is recognized that a destination computer is located inside the network at which the mobile computer is currently located, a packet in the usual IP format is transmitted.

(S3) When a gateway of the visited network allows to pass a packet transmitted by the mobile computer to outside after checking the authentication, if a destination computer is located outside that visited network, a packet in the encryption/link authentication format is transmitted.

(S4) When a gateway at the visited network allows to pass a packet transmitted by the mobile computer to outside without checking the authentication, if a destination computer is located outside that visited network, a packet in the encryption/end-to-end authentication format is transmitted.

(S5) When the mobile computer is currently moving as an external node, a packet in the encryption/end-to-end authentication format is transmitted.

(S6) In S4 and S5, when the correspondent computer is an external node in a form of a stationary computer, there are cases in which the packet format is to be selected according to whether the correspondent computer is an external node in a form of a stationary computer or not, in some procedures of the above described Pz-2 and Pz-3. Namely, in the above described Pz-2 and Pz-3, when the authentication between the mobile computer and the gateway is not to be carried out, the usual IP format is used (as an exceptional processing). On the other hand, when the authentication between the mobile computer and the gateway is to be carried out, the encryption/end-to-end authentication format is used. In the latter case, in S4 and S5, the packet format is uniform regardless of whether the correspondent computer is an external node in a form of a stationary computer or not.

The mobile computer can recognize whether its own current location is inside the home network or outside the home network, or else it is an external node, by means of a location recognition unit explained in relation to FIG. 5. When it is not an external node, the mobile computer can also ascertain a gateway that currently has this mobile computer as an encryption and authentication processing target.

Also, the mobile computer has a correspondent host location recognition unit for recognizing a current location of a correspondent host. This function can be realized, for example, by searching through the above described database that registers information on encryption and authentication processing target computers of each gateway.

Note that, in a case where the correspondent host is a mobile computer moving outside the home network, the gateway of the home network of that mobile computer can be recognized by carrying out the search according to an address of that mobile computer in the home network.

Figure 18:
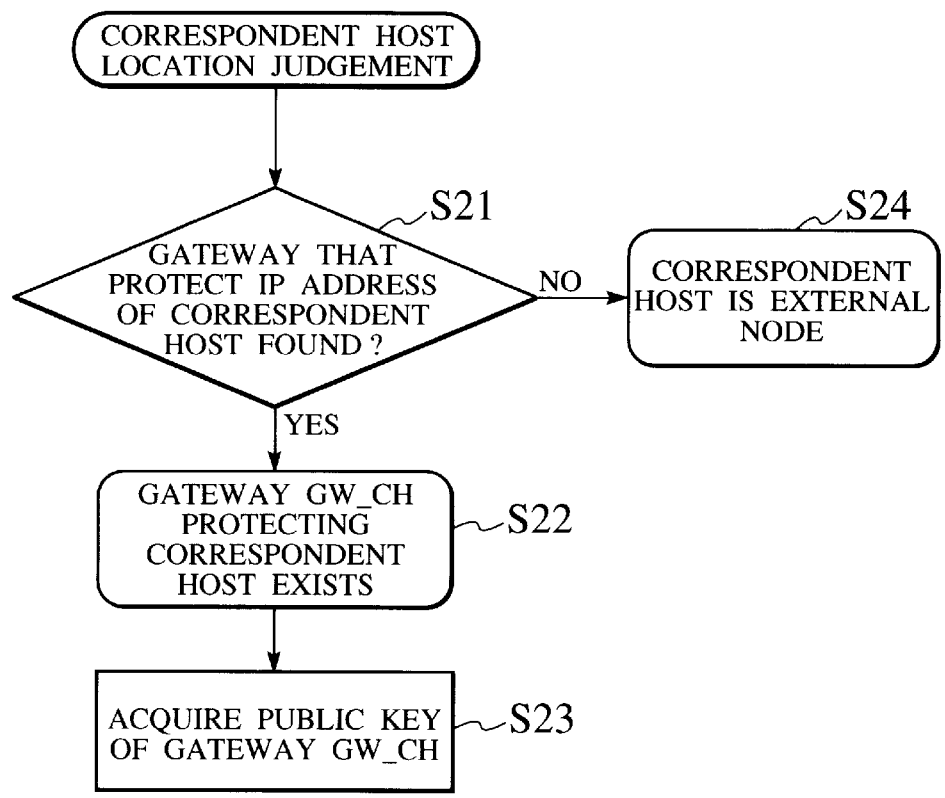
FIG. 18 is a flow chart for a correspondent host location judgement processing according to one embodiment of the present invention.

FIG. 18 shows an exemplary processing procedure for detecting a location of a correspondent host by the mobile computer.

First, a gateway (GW_CH) having an address corresponding to the IP address of the correspondent host as its protection region is searched (step S21). If such a gateway cannot be found by the search, it is recognized that the correspondent host is located outside GW protected region, that is, the correspondent host is an external node (step S24).

When the correspondent host is located inside GW protected region (and that gateway is different from a gateway that currently has this mobile computer as an encryption processing target) (step S22), an encryption/authentication public key of the gateway of the home network of the correspondent host is acquired as it becomes necessary in the subsequent data communication (step S23). For example, the query is made with respect to the gateway of the home network of the this mobile computer or a management server provided separately so as to obtain this public key. Note that when this key is already in possession, this procedure is unnecessary.

Note that, in the above described (S3) and (S4), whether the gateway of the visited network allows to pass a packet transmitted by the mobile computer to outside after checking the authentication or without checking the authentication can be ascertained from a result obtained by the above described procedure regarding the registration message. Namely, a case of having the passing refusal with respect to the registration message transmitted in the encryption/end-to-end authentication format corresponds to (S3), and a case of having the passing permission with respect to the registration message transmitted in the encryption/end-to-end authentication format corresponds to (S4).

Next, each gateway transfers a packet in some format either as it is, or in the same format with different content, or else in the different format, according to various conditions.

Each gateway can obtain the necessary information by obtaining an information on a source computer and a destination computer from the header information of the input packet, and searching through a prescribed database and the like according to the obtained information.

Each gateway has a mobile computer recognition unit for recognizing whether a computer related to the packet transfer is a mobile computer moving outside the home network or not, and a gateway recognition unit for recognizing a gateway which has a computer related to the packet transfer as an encryption processing target. Also, as described above, each gateway has an encryption and authentication processing target computer recognition unit for recognizing computers which are currently encryption and authentication processing targets of this gateway.

The mobile computer recognition unit can be realized by searching through the above described database that registers information on the mobile computer moving outside the home network.

The gateway recognition unit can be realized similarly as the correspondent host location recognition unit of the mobile computer described above, by searching through the above described database registers information on encryption and authentication processing target computers of each gateway.

Also, the gateway may be provided with a route optimization control unit for judging whether the route optimization is possible or not according to the recognition results of the mobile computer recognition unit and the gateway recognition unit, and carrying out the control for optimizing the route according to the recognition results when it is recognized that the route optimization is possible and this gateway can contribute to that route optimization, either upon receiving a request for the route optimization from a computer or voluntarily.

In this route optimization control unit, the processing content with respect to a packet before the optimization is changed to the processing content with respect to a packet after the optimization.

Now, the management of the information on locations of the mobile computer moving outside the home network and the stationary computer (the information on the gateway that protect each computer) which is to be used by the gateway and the computer for the purpose of the packet processing will be described.

The location information of each computer can be provided in such a manner that each computer itself issues this information and notifies it to the other nodes.

In this case, as a method for notifying the location information, the following two methods are available, for example.

(1) A Method for Managing the Location Information in a Database

Each computer reports its current location information (an address information of a gateway that has this computer as an encryption processing target) to a central database, and thereafter a node that requires this information can carry out its processing by making the query to that database. The database can be provided at arbitrary location within the system, but it is convenient to provide the database within a mobile computer location information management device within the home network of the mobile computer, for example, in view of the fact that the information is to be updated when the mobile computer moved outside the home network.

(2) A method for Notifying the Location Information to a Constituent Element on the Route at a Time of the Data Transfer When each computer transfers the first data, its own location information is entered into a part of that data packet, and a node on the route takes out this information and stores it into a location information cache of that node. This method cannot realize the centralized management of the location information, but the location information can be conveyed in conjunction with the data transfer and there is no need for a separate access, so that it is advantageous from a viewpoint of the efficiency.

Now, the gateway judges which protocol is to be applied to a communication between computers and also how an input packet is to be processed and transferred, according to the recognition results of the mobile computer recognition unit and the gateway recognition unit described above, and carries out the prescribed processing such as the following, for example.

(G1) In a case where both computers for carrying out the packet transfer are stationary nodes and the existence of the gateway is confirmed for both computers, the gateway encapsulates an input packet in the usual IP format into the encryption/end-to-end authentication format, or decapsulates an input packet in the encryption/end-to-end authentication format into the usual IP format. The end-to-end authentication is carried out between the gateways.

(G2) In a case where at least one of the computers is a mobile computer moving outside the home network, and it is recognized that either computer is not a stationary node without a gateway that has that computer as the encryption and authentication processing target, the following processing is carried out.

(i) An input packet in the usual IP format is encapsulated into the encryption/end-to-end authentication format, and an input packet in the encryption/end-to-end authentication format is decapsulated into the usual IP format (except at the gateway involved in the route optimization). The end-to-end authentication is carried out between the gateways.

Here, however, the following two are the exceptional processing (in which the processing is carried out by recognizing an input packet as a control message according to the header information, for example).

For a packet (such as a registration response message) in the IP format originating from the home agent and destined to the mobile computer not having a gateway that has that mobile computer as the encryption and authentication processing target which is moving outside the home network, the end-to-end authentication is carried out between the gateway and the mobile computer.

Also, as for a packet (such as a registration acknowledgement message) in the IP format originating from the home agent and destined to the mobile computer having a gateway that has that mobile computer as the encryption and authentication processing target which is moving outside the home network, this packet is transferred by encapsulating it into the encryption/link authentication format. The end-to-end authentication is carried out between the gateway and the mobile computer, and the link authentication is carried out between the gateways.

(ii) An input packet in the encryption/end-to-end authentication format or the encryption/link authentication format originating from the mobile computer moving outside the home network (which is the encryption and authentication processing target of this gateway) is transferred to a next hop as a packet in the encryption/link authentication format.

(iii) An input packet in the encryption/link authentication format for which a next hop is a mobile computer moved from outside (which is the encryption and authentication processing target of this gateway) is transferred as a packet in the encryption/end-to-end authentication format.

(iv) An input packet in the encryption/end-to-end authentication format or the encryption/link authentication format for which a next hop is a stationary node (for which this gateway is a receiving side of the end-to-end authentication) is decapsulated and transferred as a packet in the IP format.

(v) An input packet in the mobile IP format is transferred by converting it into the encryption/link authentication format when the destination computer is a mobile computer moving outside the home network and there exists a gateway that has this mobile computer as the encryption and authentication processing target, or by converting it into the encryption/end-to-end authentication format when the destination computer is a mobile computer moving outside the home network and there is no gateway that has this mobile computer as the encryption and authentication processing target.

(vi) A gateway involved in the route optimization carries out the processing according to each case as the exceptional processing, at a timing of the route optimization request.

(G3) In a case where one computer is a stationary computer and another computer is a mobile computer moving outside the home network, and either computer is not having a gateway that has that computer as the encryption and authentication processing target, an input packet in the usual IP format which has the stationary computer as a source or a destination is transferred as a packet in the usual IP format, and an input packet in the IP format or the mobile Ip format which as the mobile computer as a destination is transferred by converting it into the encryption/end-to-end authentication format, while an input packet in the encryption/end-to-end authentication format is transferred by converting it into the usual IP format.

(G4) In a case where one computer is a stationary computer and there is no gateway that has this stationary computer as the encryption and authentication processing target, and there exists a gateway that has another computer as the encryption and authentication processing target, an input packet is transferred in the same format by which it is inputted.

Note however that, in a case where the gateway at the visited site of another mobile computer adopts the security policy that does not allow to pass a packet without checking the authentication even when one computer is a stationary computer and there is no gateway that has this stationary computer as the encryption and authentication processing target, the mobile computer transmits a packet by attaching the authentication code to be used between the mobile computer and this gateway (by using the encryption/end-to-end authentication format, for example), and this gateway transfers the packet in the IP format when the authentication check was successful. Otherwise, an input packet is transferred in the same format by which it is inputted.

In the following, an exemplary case of a packet communication between the mobile computer (MN) 2 which has the home position within the network 1a of FIG. 3 and the correspondent host (CH) 3 which is a stationary node will be described in further detail.

First, in the communication system of FIG. 3, various combinations of locations of the mobile computer 2 and the correspondent host 3 and corresponding communication processing contents can be largely classified into the following four cases [case 1] to [case 4] as shown in FIG. 19.

[case 1] is a case in which the mobile computer MN is inside GW protected region and the correspondent host CH is inside GW protected region.

[case 2] is a case in which the mobile computer MN is outside GW protected region and the correspondent host CH is inside GW protected region.

[case 3] is a case in which the mobile computer MN is inside GW protected region and the correspondent host CH is outside GW protected region.

[case 4] is a case in which the mobile computer MN is outside GW protected region and the correspondent host CH is outside GW protected region.

Moreover, the above described [case 1] and [case 2] which are cases of communication via the gateway GW can be sub-classified into the following seven cases (case 1) to (case 7) as shown in FIG. 20. [case 1] is sub-classified into (case 1) to (case 5) and [case 2] is sub-classified into (case 6) and (case 7).

(case 1) is a case in which the mobile computer MN is located inside the home network and the correspondent host CH is located inside the home network of the mobile computer MN.

(case 2) is a case in which the mobile computer MN is located inside the home network and the correspondent host CH is located inside the other section network.

(case 3) is a case in which the mobile computer MN is located inside the other section network and the correspondent host CH is located inside the home network of the mobile computer MN.

(case 4) is a case in which the mobile computer MN is located inside the other section network and the correspondent host CH is located inside the same other section network.

(case 5) is a case in which the mobile computer MN is located inside one other section network and the correspondent host CH is located inside another other section network.

(case 6) is a case in which the mobile computer MN is an external node and the correspondent host CH is located inside the home network of the mobile computer MN.

(case 7) is a case in which the mobile computer MN is an external node and the correspondent host CH is located inside the other section network.

For these cases, the processing at each node and the IP security processing at each gateway may be different. As described above, depending on a location of the correspondent host 3, there can be cases in which the cipher communication cannot be used. This is a case when the correspondent host 3 is located in a network which has no packet processing device for carrying out the packet encryption and authentication processing, for example. This corresponds to the above described [case 3] and [case 4]. In such a case, the mobile computer uses only the mobile IP protocol, and the packet encryption is not to be carried out. Else, only the usual IP communication may be carried out without carrying out the mobility processing either.

Also, the mobile IP defines the optimization of a packet route destined to the mobile computer via the home agent when each network constituent element has a correct location information as a cache, and it is also necessary to judge the applicability of this route optimization by recognizing the current locations of the mobile computer and the correspondent host if the packet encryption is used in combination.

In a case of using the mobile IP and the IP security in combination as in the above, it is very important to control the processing of each network constituent element by detecting the location information of the mobile computer and the correspondent host and recognizing the above described (case 1) to (case 7) and cases in which the correspondent host is located outside GW protected region such as the above described [case 3] and [case 4].

Now, each of the above described (case 1) to (case 7), [case 3] and [case 4] will be described in detail.

(case 1) a case in which both the mobile computer MN and the correspondent host CH are located in the home network 1a:

In this case, the mobile computer is a stationary node, so that this case corresponds to the above described P0-1.

Also, the format of a packet to be transmitted by the mobile computer corresponds to the above described S1 and S2 (and can be decided according to either judgement).

As indicated in FIG. 21, the mobile computer MN and the correspondent host CH directly communication in the usual IP packet format in this case.

Note that the gateway is not involved so that no processing is carried out by the gateway in this case.

(case 2) a case in which the mobile computer MN is located in the home network 1a and the correspondent host CH is located in the other section network:

In this case, the mobile computer is a stationary node, so that this case corresponds to the above described P2-1.

Also, the format of a packet to be transmitted by the mobile computer corresponds to the above described S1.

Figure 22:
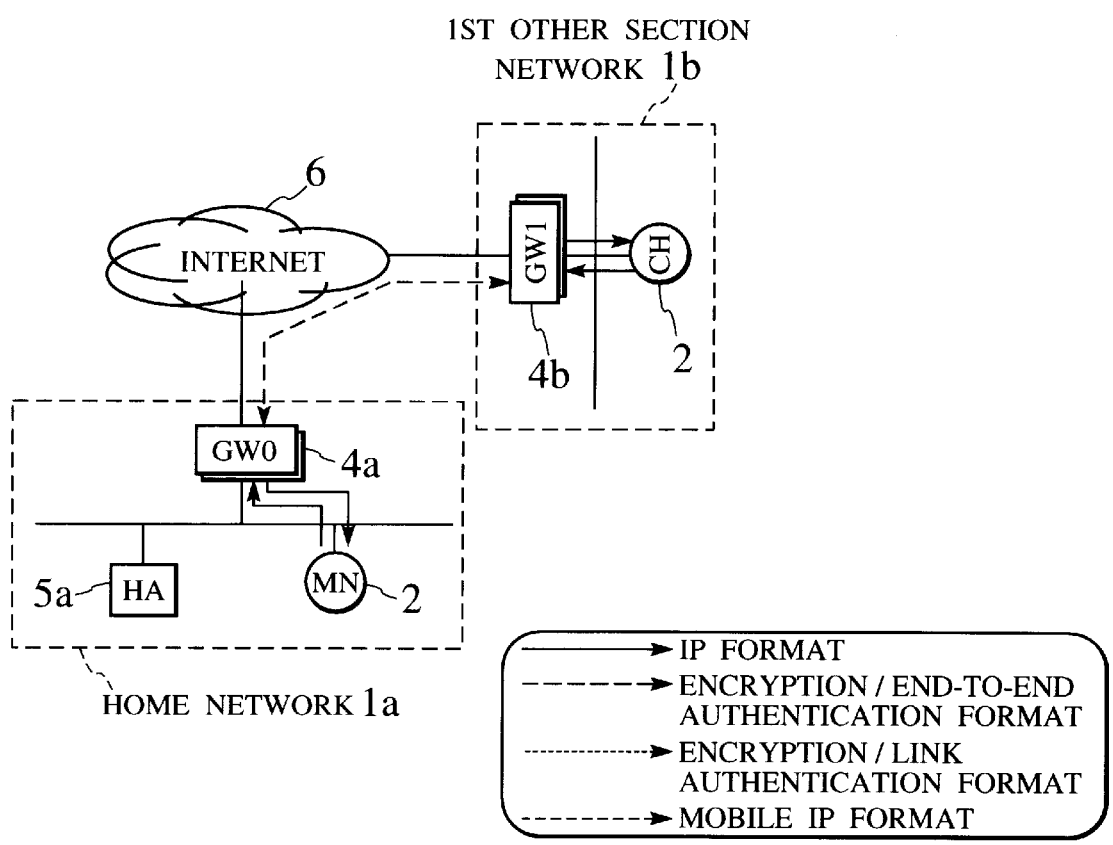
FIG. 22 is a schematic diagram showing a manner of communication between a mobile computer and a correspondent host in a communication case (2) of FIG. 20 according to one embodiment of the present invention.

As indicated in FIG. 22, the mobile computer MN transmits a packet in the usual IP format.

At the gateway, an input packet in the IP format is encapsulated into the encryption/end-to-end authentication format, and an input packet in the encryption/end-to-end authentication format is decapsulated into the IP format.

(case 3) a case in which the mobile computer MN is located in the other section network and the correspondent host CH is located in the home network:

In this case, the mobile computer MN→the correspondent host CH corresponds to the above described P2-2, the correspondent host CH→the home agent HA corresponds to the above described P0-1, and the home agent HA→the mobile computer MN corresponds to the above described P2-3.

Also, the format of a packet to be transmitted by the mobile computer corresponds to either one of the above described S3 and S4.

A case of P2-3 (i) is shown in FIG. 23. As indicated in FIG. 23, the mobile computer MN transmits a packet in the encryption/link authentication format shown in FIG. 24.

At the gateway, the following packet processing is carried out.

An input packet in the encryption/link authentication format originating from the mobile computer MN is transferred to a next hop as a packet in the encryption/link authentication format.

An input packet in the encryption/link authentication format for which a next hop is the mobile computer MN is transferred as a packet in the encryption/end-to-end authentication format.

An input packet in the encryption/link authentication format other than that is decapsulated and transferred as a packet in the IP format.

An input packet in the mobile IP format is transferred by converting it into the encryption/link authentication format.

(case 4) a case in which both the mobile computer MN and the correspondent host CH are located in the same other section network:

In this case, the mobile computer MN→the correspondent host CH corresponds to the above described P0-1, the correspondent host CH→the home agent HA corresponds to the above described P2-1, and the home agent HA→the mobile computer MN corresponds to the above described P2-3.

Also, the format of a packet to be transmitted by the mobile computer corresponds to the above described S2.

A case of P2-3 (i) is shown in FIG. 25. As indicated in FIG. 25, the mobile computer MN transmits a packet in the usual IP format shown in FIG. 26.

At the gateway, the following packet processing is carried out.

An input packet in the IP format is transferred as a packet in the encryption/end-to-end authentication format.

An input packet in the encryption/end-to-end authentication format is decapsulated and transferred as a packet in the IP format.

An input packet in the mobile IP format is transferred as a packet in the encryption/link authentication format.

An input packet in the encryption/link authentication format for which a next hop is the mobile computer MN is transferred as a packet in the encryption/end-to-end authentication format.

Figure 27:
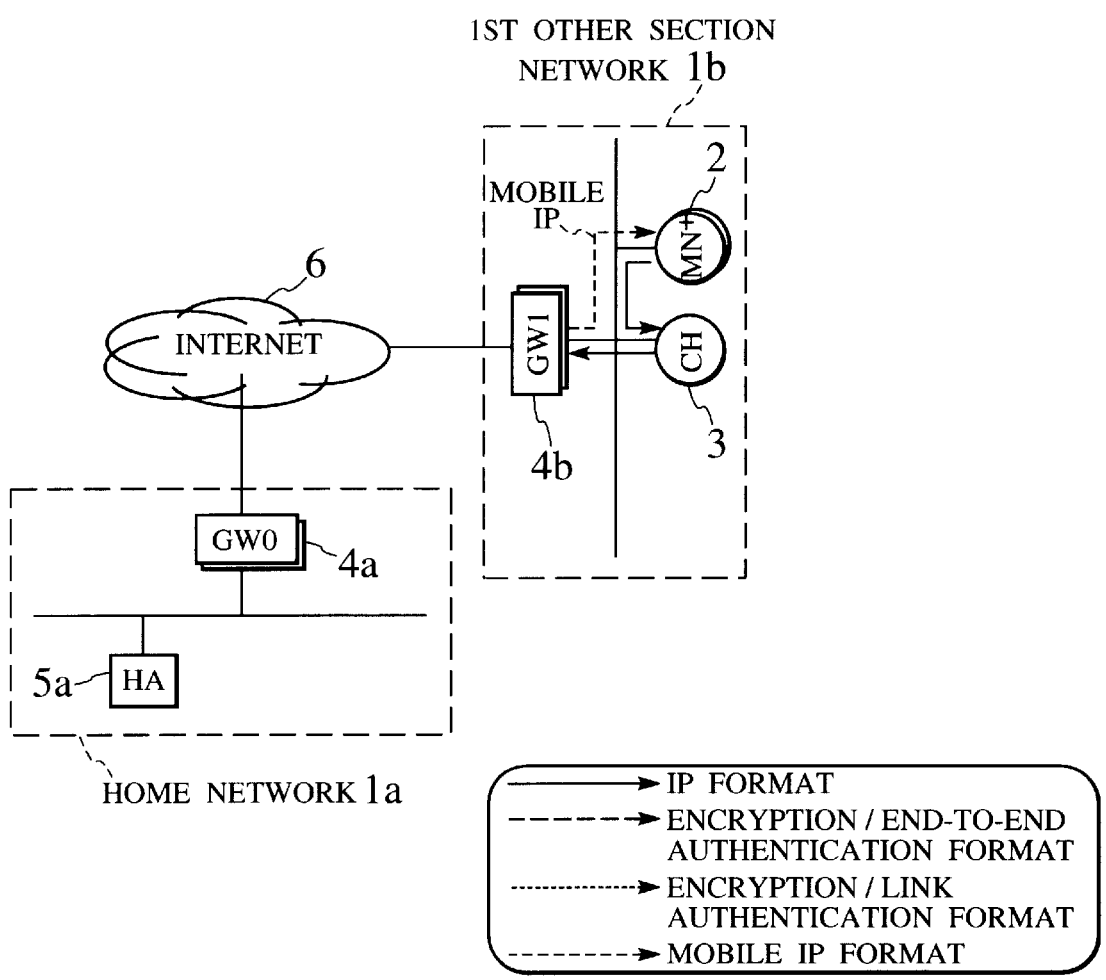
FIG. 27 is a schematic diagram showing a manner of communication between a mobile computer and a correspondent host in a communication case (4) of FIG. 20 at a time of route optimization.

Here, when the route optimization is requested, as shown in FIG. 27, the corresponding gateway is controlled such that a packet in the mobile IP format is transferred to the mobile computer MN when a packet in the IP format is received from the correspondent host CH (corresponding to the above described P1-4).

(case 5) a case in which the mobile computer MN is located in one other section network and the correspondent host CH is located in another other section network:

In this case, the mobile computer MN→the correspondent host CH corresponds to the above described P2-2, the correspondent host CH→the home agent HA corresponds to the above described P2-1, and the home agent HA→the mobile computer MN corresponds to the above described P2-3.

Also, the format of a packet to be transmitted by the mobile computer corresponds to the above described S3 or S4.

A case of P2-3 (i) is shown in FIG. 28. As indicated in FIG. 28, the mobile computer MN transmits a packet in the encryption/link authentication format shown in FIG. 29.

At the gateway, the following packet processing is carried out.

An input packet in the IP format is transferred as a packet in the encryption/end-to-end authentication format.

An input packet in the encryption/end-to-end authentication format is decapsulated and transferred as a packet in the IP format.

An input packet in the mobile IP format is transferred as a packet in the encryption/link authentication format.

An input packet in the encryption/link authentication format originating from the mobile computer MN is transferred as a packet in the encryption/link authentication format.

An input packet in the encryption/link authentication format for which a next hop is the mobile computer MN is transferred as a packet in the encryption/end-to-end authentication format.

An input packet in the encryption/link authentication format other than that is decapsulated and transferred as a packet in the IP format.

Here, when the route optimization is requested, the operation is as shown in FIG. 30. In this case, the correspondent host CH→the mobile computer MN corresponds to the above described P2-3.

In this case, each gateway is controlled to carry out the following packet processing.

An input packet in the encryption/link authentication format originating from the mobile computer MN is transferred as a packet in the encryption/link authentication format.

An input packet in the encryption/link authentication format for which a next hop is the mobile computer MN is transferred as a packet in the encryption/end-to-end authentication format.

An input packet in the encryption/link authentication format other than that is decapsulated and transferred as a packet in the IP format.

An input packet in the IP format from the correspondent host CH is transferred as a packet in the encryption/link authentication format.

(case 6) a case in which the mobile computer MN is an external node and the correspondent host CH is located in the home network:

In this case, the mobile computer MN→the correspondent host CH corresponds to the above described P1-1, the correspondent host CH→the home agent HA corresponds to the above described P0-1, and the home agent HA→the mobile computer MN corresponds to the above described P1-2.

Also, the format of a packet to be transmitted by the mobile computer corresponds to the above described S5.

Figure 31:
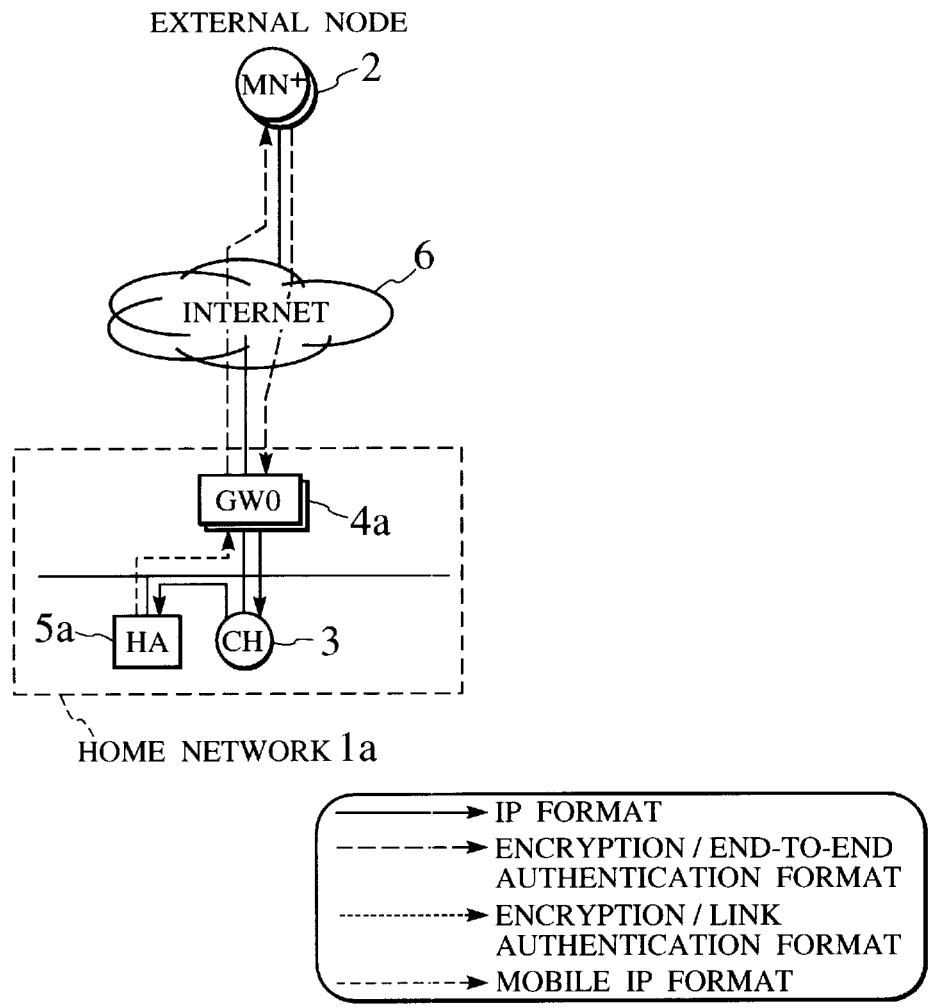
FIG. 31 is a schematic diagram showing a manner of communication between a mobile computer and a correspondent host in a communication case (6) of FIG. 20 according to one embodiment of the present invention.
Figure 32:
FIG. 32 is a diagram showing one exemplary format of a packet transmitted by a mobile computer in the communication case shown in FIG. 31.

This case is shown in FIG. 31. As indicated in FIG. 31, the mobile computer MN transmits a packet in the encryption/end-to-end authentication format shown in FIG. 32.

At the gateway, the following packet processing is carried out.

An input packet in the encryption/end-to-end authentication format is decapsulated and transferred as a packet in the IP format.

An input packet in the mobile IP format is transferred as a packet in the encryption/link authentication format.

(case 7) a case in which the mobile computer MN is an external node and the correspondent host CH is located in the other section network:

In this case, the mobile computer MN→the correspondent host CH corresponds to the above described P1-1, the correspondent host CH→the home agent HA corresponds to the above described P2-1, and the home agent HA→the mobile computer MN corresponds to the above described P1-2.

Also, the format of a packet to be transmitted by the mobile computer corresponds to the above described S5.

Figure 33:
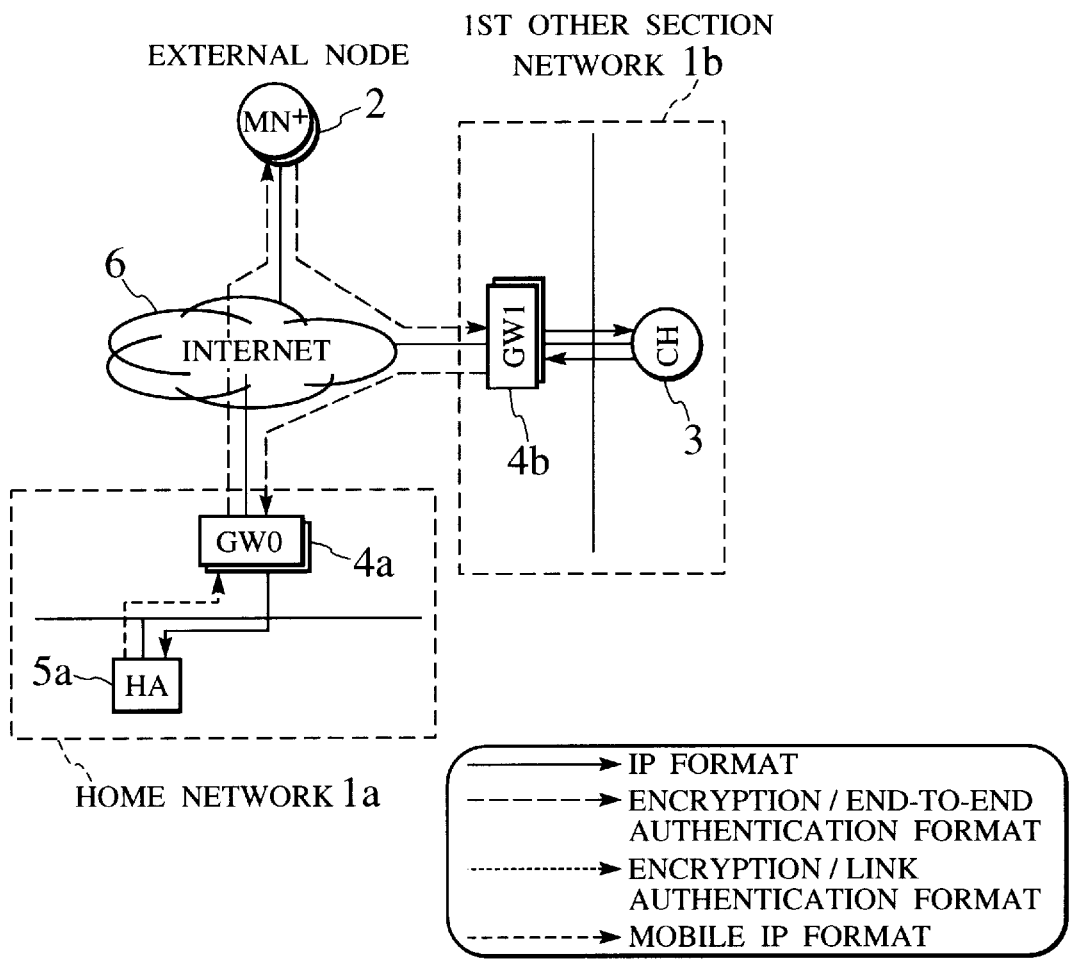
FIG. 33 is a schematic diagram showing a manner of communication between a mobile computer and a correspondent host in a communication case (7) of FIG. 20 according to one embodiment of the present invention.
Figure 34:
FIG. 34 is a diagram showing one exemplary format of a packet transmitted by a mobile computer in the communication case shown in FIG. 33.

This case is shown in FIG. 33. As indicated in FIG. 33, the mobile computer MN transmits a packet in the encryption/end-to-end authentication format shown in FIG. 34.

At the gateway, the following packet processing is carried out.

An input packet in the IP format is transferred as a packet in the encryption/end-to-end authentication format.

An input packet in the encryption/end-to-end authentication format is decapsulated and transferred as a packet in the IP format.

An input packet in the mobile IP format is transferred as a packet in the encryption/end-to-end authentication format.

Figure 35:
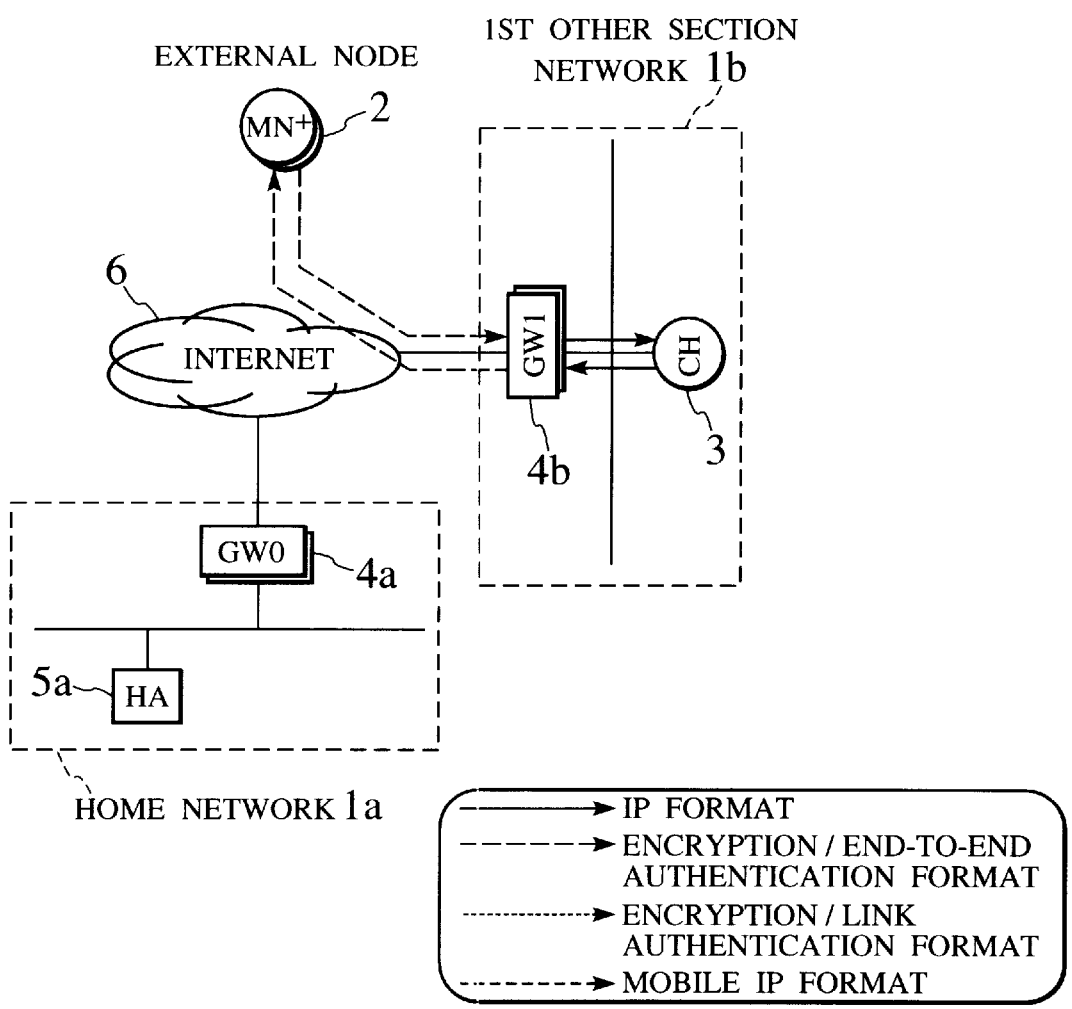
FIG. 35 is a schematic diagram showing a manner of communication between a mobile computer and a correspondent host in a communication case (7) of FIG. 20 at a time of route optimization.

Here, when the route optimization is requested, the operation is as shown in FIG. 35. In this case, the correspondent host CH→the mobile computer MN corresponds to the above described P1-2.

In this case, each gateway is controlled to carry out the following packet processing.

An input packet in the encryption/end-to-end authentication format is decapsulated and transferred as a packet in the IP format.

An input packet in the IP format from the correspondent host CH is transferred as a packet in the encryption/end-to-end authentication format to the mobile computer MN.

(case 8) a case in which the correspondent host CH is outside GW protected region and the mobile computer MN is located in the home network (the above described [case 3]):

In this case, as shown in FIG. 36, only the usual IP communication is carried out. Consequently, the encryption and authentication processing is not carried out at the gateway.

(case 9) a case in which the correspondent host CH is outside GW protected region and the mobile computer MN is located in the other section network (the above described [case 4]):

In this case, as shown in FIG. 37, only the usual mobile IP communication is carried out and the encryption is not to be carried out at the gateway.

Else, as shown in FIG. 38, the mobile computer MN may carry out the usual IP communication using the care-of address obtained at the visited site, and the mobile IP and the encryption are not to be carried out.

Note that, depending on the security policy of the other section network 1c, the authentication may be carried out only between the mobile computer 2 and the gateway 4c at a time of transferring a packet originating from the mobile computer 2 to outside at the gateway 4c, in FIG. 37 or FIG. 38.

Figure 39:
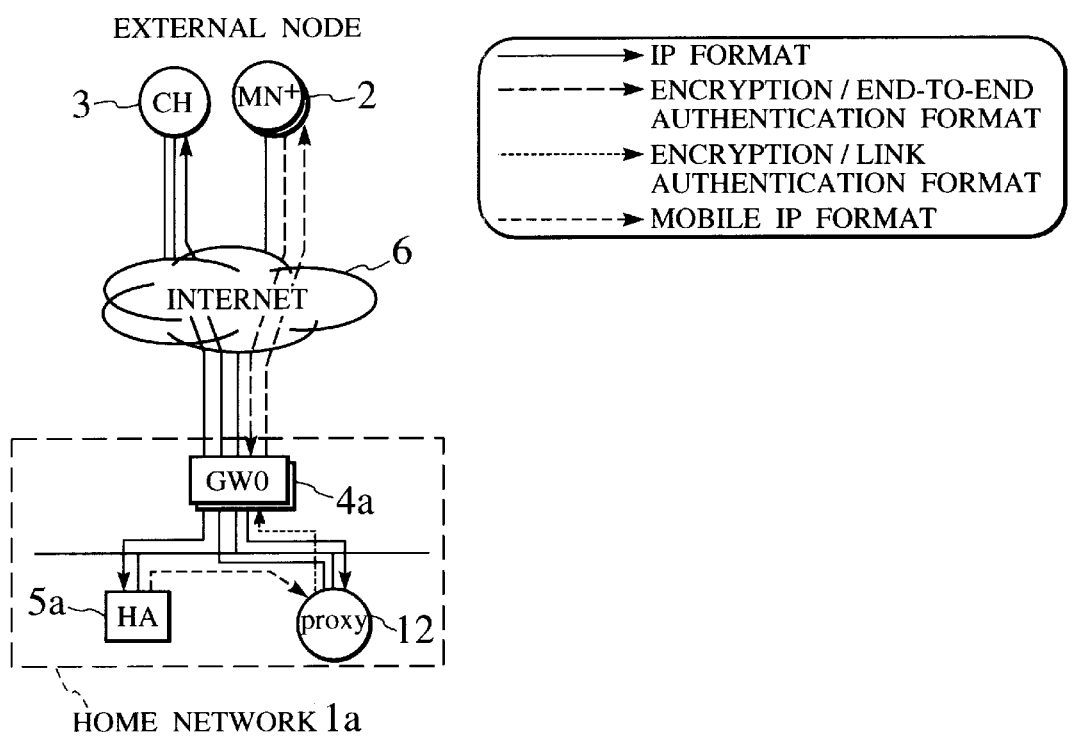
FIG. 39 is a schematic diagram showing another manner of communication between a mobile computer and a correspondent host in a communication case [4] of FIG. 19 according to one embodiment of the present invention.

(case 10) a case in which the correspondent host CH is outside GW protected region and the mobile computer MN is an external node (the above described [case 4]):

In this case, the operation is as shown in FIG. 39, where the following processing is carried out.

The mobile computer MN transmits a packet in the encryption/end-to-end authentication format toward the home domain once (with the private address as a source address).

This is converted into the global address at a proxy 12 of the home domain, and a packet in the IP format is transmitted to outside.

On its way back, a packet in the encryption/end-to-end authentication format reaches to the mobile computer MN via the proxy 12 and the home agent HA, from the gateway 4a.

In the above, an exemplary case of a packet communication between the mobile computer (MN) 2 which has the home position within the network 1a of FIG. 3 and the correspondent host (CH) 3 which is a stationary node has been described. In the following, a packet communication between computers moving outside the home network will be described in further detail.

A packet communication between computers moving outside the home network can be classified as follows.

<1> cases in which both computers are located inside GW protected region:

a case in which both computers have different home networks and are located in the same other section network (which is not the home network of either computer).

a case in which both computers have different home networks and are located in different other section networks (either one of which is not the home network of either computer).

a case in which both computers have different home networks and are located in different other section networks (one of which is the home network of one computer).

a case in which both computers have different home networks and each one is located in the other one's home network.

a case in which both computers have the same home network and are located in the same other section network.

a case in which both computers have the same home network and are located in different other section networks.

Note that, for each other section network in each of the above cases, there are a case in which a gateway at the visited network of the mobile computer allows to pass a packet transmitted by this mobile computer to outside without checking the authentication, and a case in which a gateway at the visited network of the mobile computer does not allow to pass a packet transmitted by this mobile computer to outside without checking the authentication.

<2> cases in which only one computer is located inside GW protected region (one computer is located in the other section network and another computer is an external node):

a case in which both computers have different home networks.

a case in which both computers have the same home network.

Note that, for each other section network in each of the above cases, there are a case in which a gateway at the visited network of the mobile computer allows to pass a packet transmitted by this mobile computer to outside without checking the authentication, and a case in which a gateway at the visited network of the mobile computer does not allow to pass a packet transmitted by this mobile computer to outside without checking the authentication.

<3> cases in which both computers are located outside GW protected region (both computers are external nodes):

a case in which both computers have different home networks.

a case in which both computers have the same home network.

Now, as already mentioned above, a packet communication between computers moving outside the home network is always carried out via the home agent HA of the correspondent host CH before the route optimization, so that the operation of each computer and gateway in that case can be reduced to the above described case of a communication between the mobile computer and the stationary computer.

In the following, only some of the cases classified above (those cases in which the gateway at the visited network of the mobile computer allows to pass a packet transmitted by this mobile computer to outside after checking the authentication) will be described in detail one by one, and the description of the other cases that can be easily guessed will be omitted.

Note that the mobile computer is assumed to be recognizing that it is located in the home network of the correspondent host when the advertisement message transmitted from the home agent of the correspondent host is received.

Figure 40:
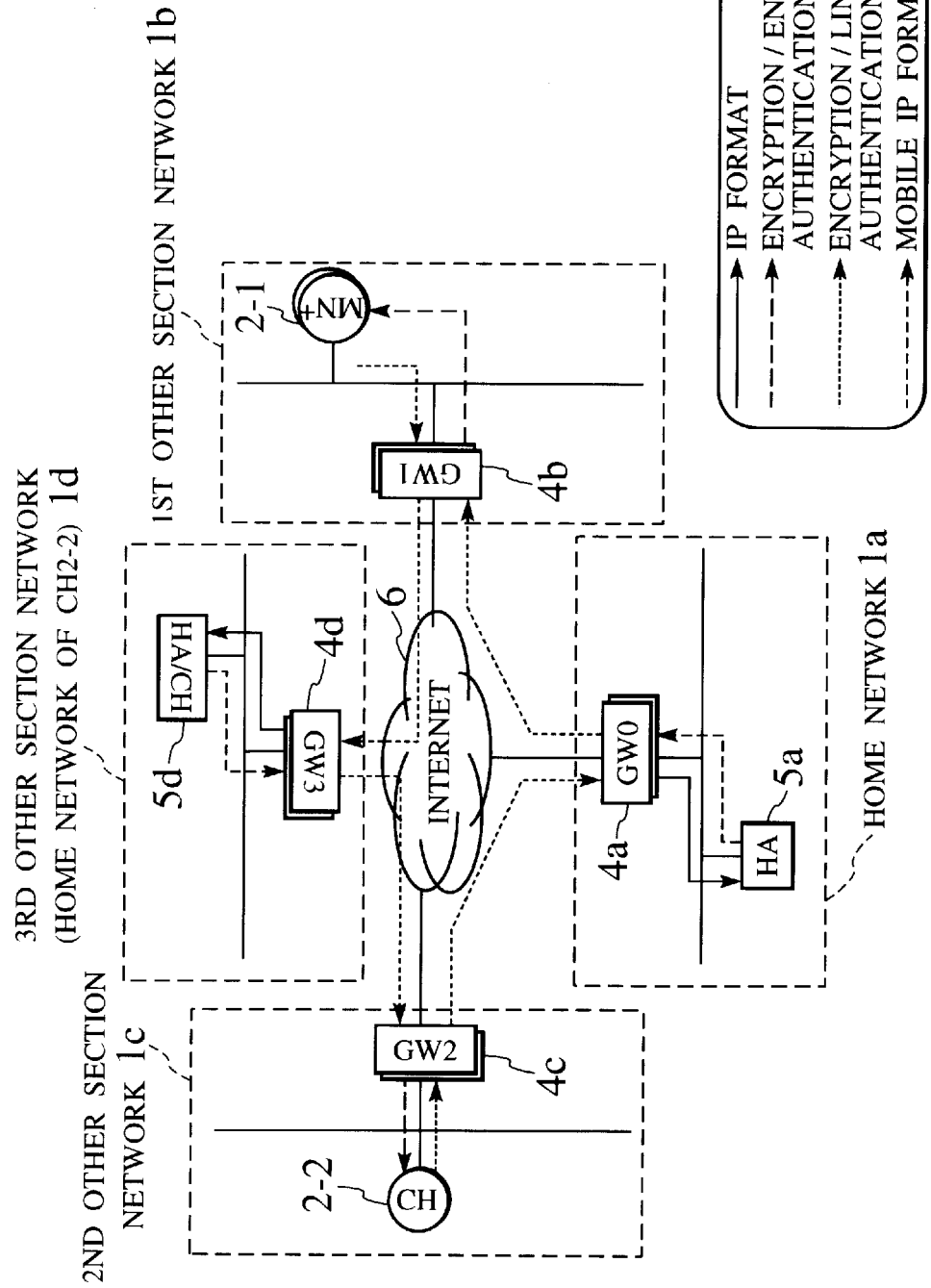
FIG. 40 is a schematic diagram showing a manner of communication between moving mobile computers in a communication case (C1) according to one embodiment of the present invention.
Figure 41:
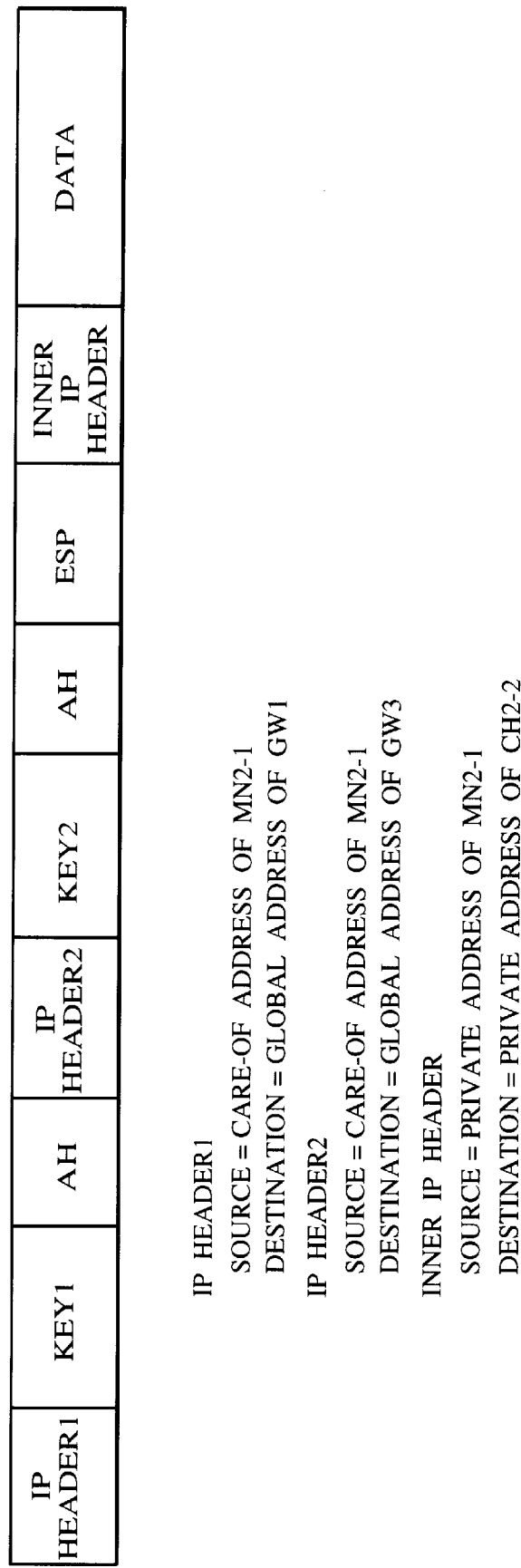
FIG. 41 is a diagram showing one exemplary format of a packet transmitted by each mobile computer in the communication case shown in FIG. 40.

(C1) a case in which the mobile computer MN is located in one other section network, and the correspondent host CH is located in another other section network, where locations of both are different from a location of the home agent HA of the correspondent host CH:

In this case, the operation is as shown in FIG. 40. As indicated in FIG. 40, each mobile computer transmits a packet in the encryption/link authentication format shown in FIG. 41.

For example, a packet from the computer 2-1 is transferred to the gateway 4d of the home network 1d of the correspondent host 2-2 because the correspondent host 2-2 is moving, and decrypted there once and then sent to the home agent 5d of the correspondent computer 2-2. The packet is then encapsulated into the mobile IP format at this home agent 5d, and transferred to the current location of the correspondent host 2-2.

Namely, in this case, the processing for the transfer route of the mobile computer 2-1→the home agent 4d of the correspondent host 2-2 is similar to the processing for the transfer route of the mobile computer MN→the correspondent host CH in the above described (case 5), and the processing for the transfer route of the home agent 4d of the correspondent host 2-2→the correspondent host 2-2 is similar to the processing for the transfer route of the home agent HA→the mobile computer MN in the above described (case 5), for example.

In other words, the former corresponds to the above described P2-2 case, and the latter corresponds to the above described P2-3 case.

Consequently, at the gateway, the following packet processing is carried out.

An input packet in the mobile IP format is transferred as a packet in the encryption/link authentication format.

An input packet in the encryption/link authentication format originating from the mobile computer MN is transferred as a packet in the encryption/link authentication format.

An input packet in the encryption/link authentication format for which a next hop is the mobile computer MN is transferred as a packet in the encryption/end-to-end authentication format.

An input packet in the encryption/link authentication format other than that is decapsulated and transferred as a packet in the IP format.

Figure 42:
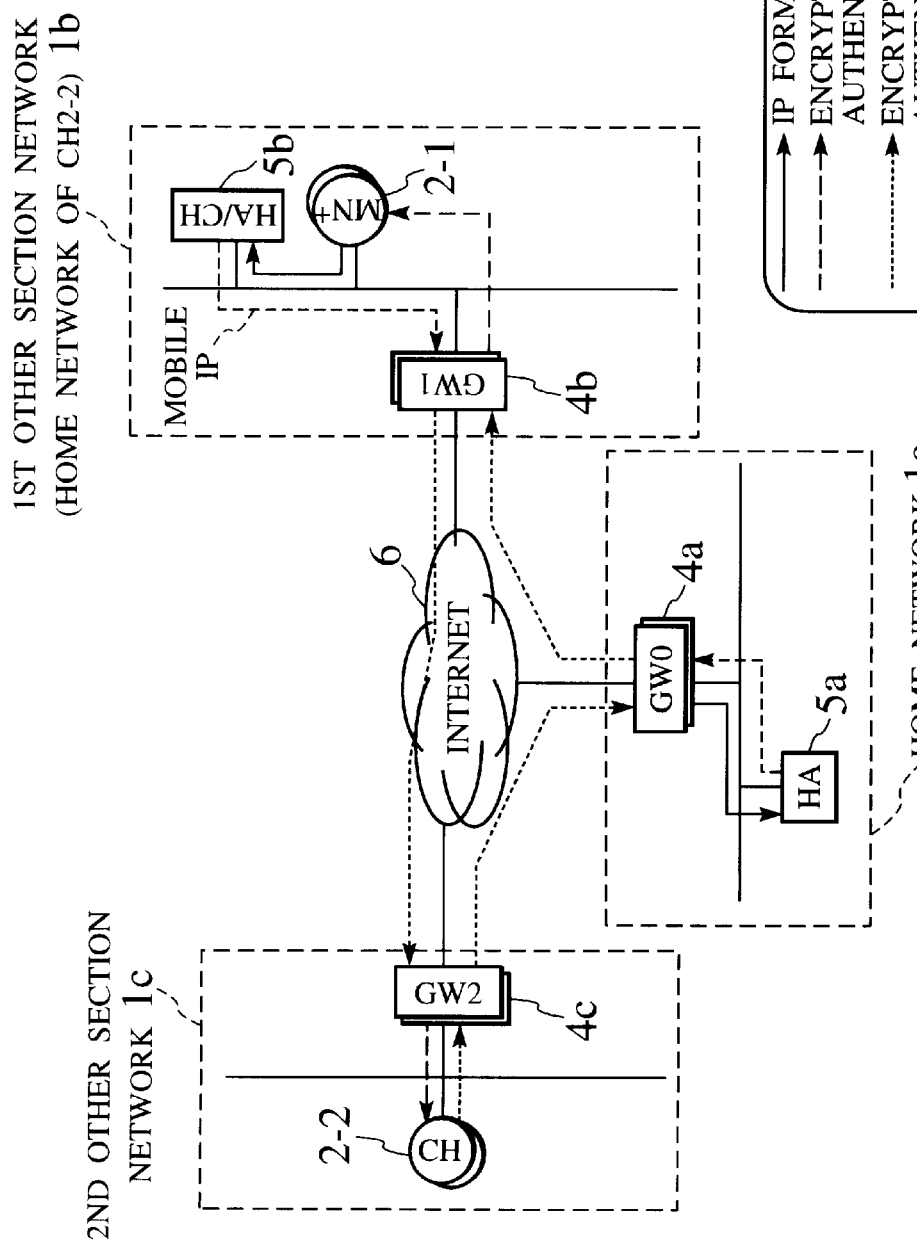
FIG. 42 is a schematic diagram showing one manner of communication between moving mobile computers in a communication case (C2) according to one embodiment of the present invention.

(C2) a case in which the mobile computer MN is located in one other section network at which the home agent HA of the correspondent host CH is located, and the correspondent host CH is located in another other section network (at which the home agent HA of either computer is located):

In this case, the operation is as shown in FIG. 42. When the computer 2-1 is set to be a source, this is similar to the above described (case 3) of FIG. 23 in which the correspondent host CH 3 is set to be a source. When the computer 2-2 is set to be a source, this is similar to the above described (C1) case.

At the gateway, the following packet processing is carried out.

An input packet in the mobile IP format is transferred as a packet in the encryption/link authentication format.

An input packet in the encryption/link authentication format originating from the mobile computer MN is transferred as a packet in the encryption/link authentication format.

An input packet in the encryption/link authentication format for which a next hop is the mobile computer MN is transferred as a packet in the encryption/end-to-end authentication format.

An input packet in the encryption/link authentication format other than that is decapsulated and transferred as a packet in the IP format.

Thus the processing at the gateway is identical to the above described (C1) case.

Note that, when both computers are located inside GW protected region as in any of the above cases <1>, the gateway is going to carry out a part of the six types of operations in the above described (case 5).

Figure 43:
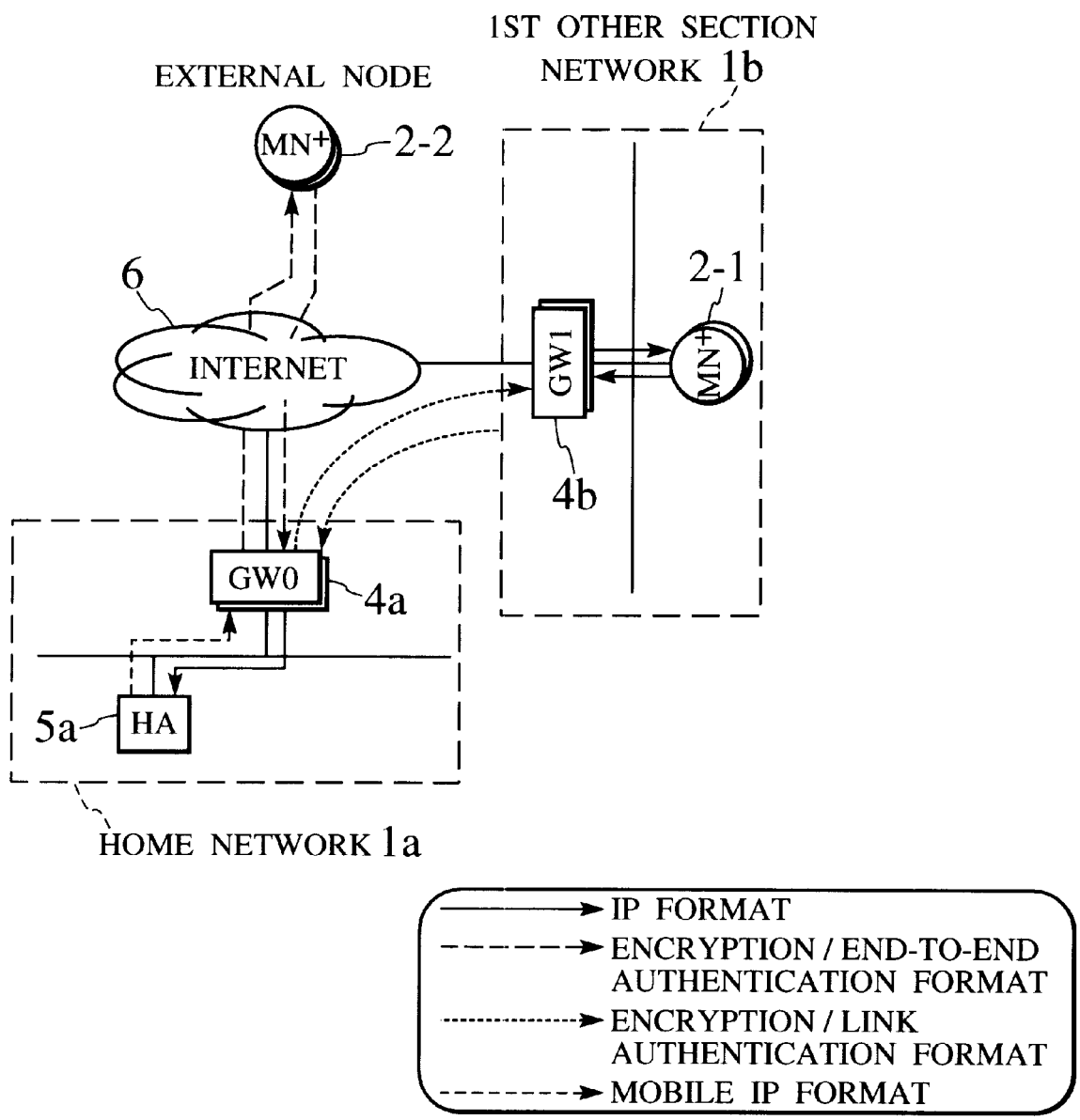
FIG. 43 is a schematic diagram showing another manner of communication between moving mobile computers in a communication case (C2) according to one embodiment of the present invention.

Also, when only one computer is located inside GW protected region (one computer is located in the other section network and another computer is an external node) as in the above cases <2> and when both computers have the same home network, as shown in FIG. 43, it is necessary for the gateway to carry out the processing according to the destination computer for a packet originating from the home agent and destined to the computer moving outside the home network, as in the above described (G2) case, but apart from that, the gateway is going to carry out a part of the operations in the above described (case 5) and (case 6).

Also, when both computers are located outside GW protected region (both computers are external nodes) as in the above cases <3>, the gateway is going to carry out the operations in the above described (case 6).

Figure 44:
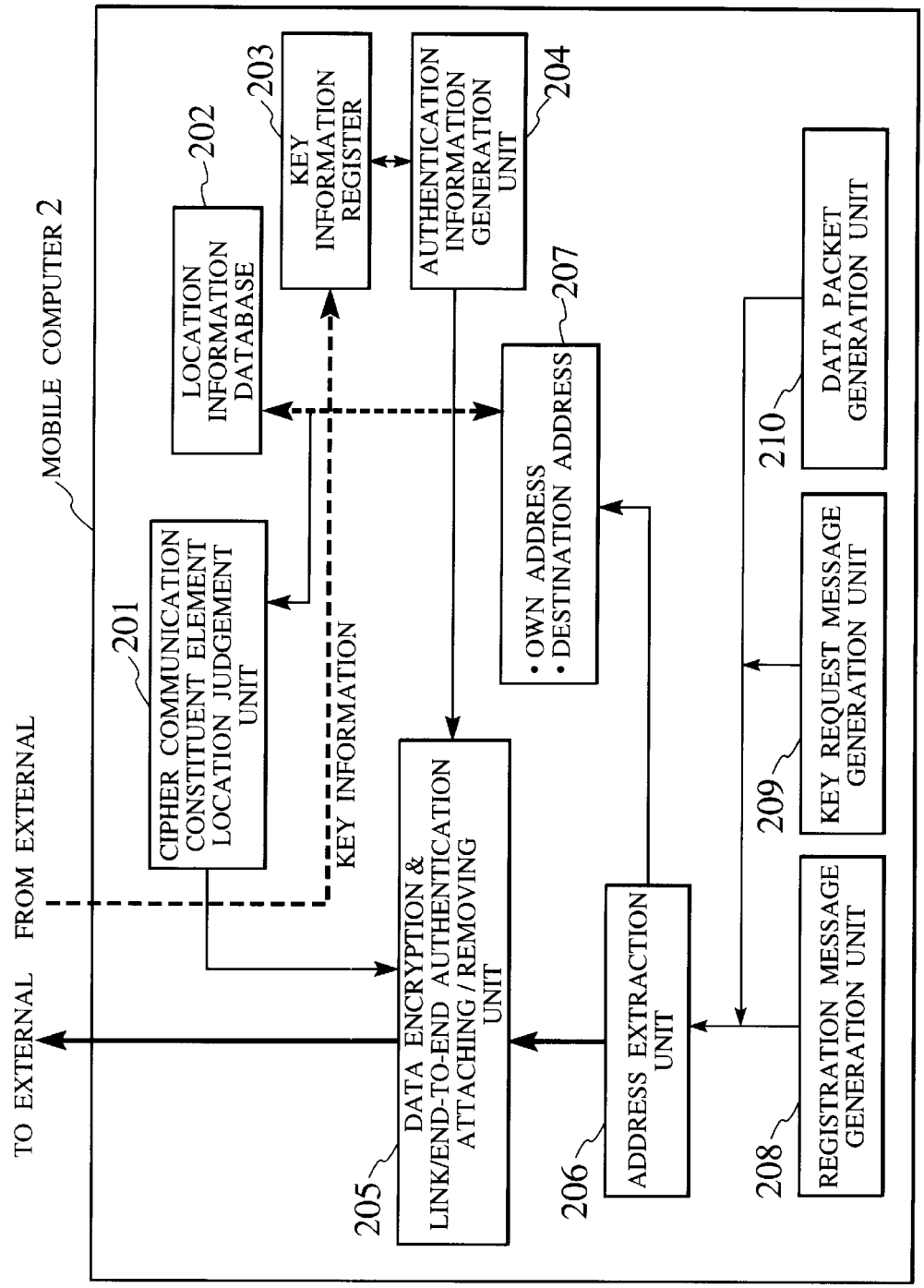
FIG. 44 is a schematic block diagram of a mobile computer according to one embodiment of the present invention.

Now, according to the mobile computing scheme of the present invention as described above, a mobile computer 2 can be realized in an exemplary configuration as shown in FIG. 44.

In FIG. 44, the mobile computer 2 comprises: a cipher communication constituent element location judgement unit 201; a location information database 202; a key information register 203 for registering a key information from the external; an authentication information generation unit 204 connected with the key information register 203; a data encryption and link/end-to-end authentication attaching/removing unit 205 connected with the cipher communication constituent element location judgement unit 201 and the authentication information generation unit 204; an address extraction unit 206 connected with the data encryption and link/end-to-end authentication attaching/removing unit 205 for extracting own and destination addresses 207 which are to be used as a key for searching through the location information database 202, where the searched location information is to be given to the cipher communication constituent element location judgement unit 201; a registration message generation unit 208 connected with the the address extraction unit 206; a key request message generation unit 209 connected with the address extraction unit 206; and a data packet generation unit 210 connected with the address extraction unit 206.

In this configuration of FIG. 44, the cipher communication constituent element location judgement unit 201 has a function for recognizing whether this mobile computer is located inside or outside of the home network of this mobile computer, as well as a function for recognizing whether or not there exists a packet processing device (gateway) which has a packet transmitted by at least one of this mobile computer and a correspondent computer of this mobile computer as an encryption and authentication processing target. Also, the data encryption and link/end-to-end authentication attaching/removing unit 205 has a function for carrying out a prescribed communication processing including an encryption and authentication processing of a packet to be transmitted from this mobile computer, according to recognition results obtained by the cipher communication constituent element location judgement unit 201.

Figure 45:
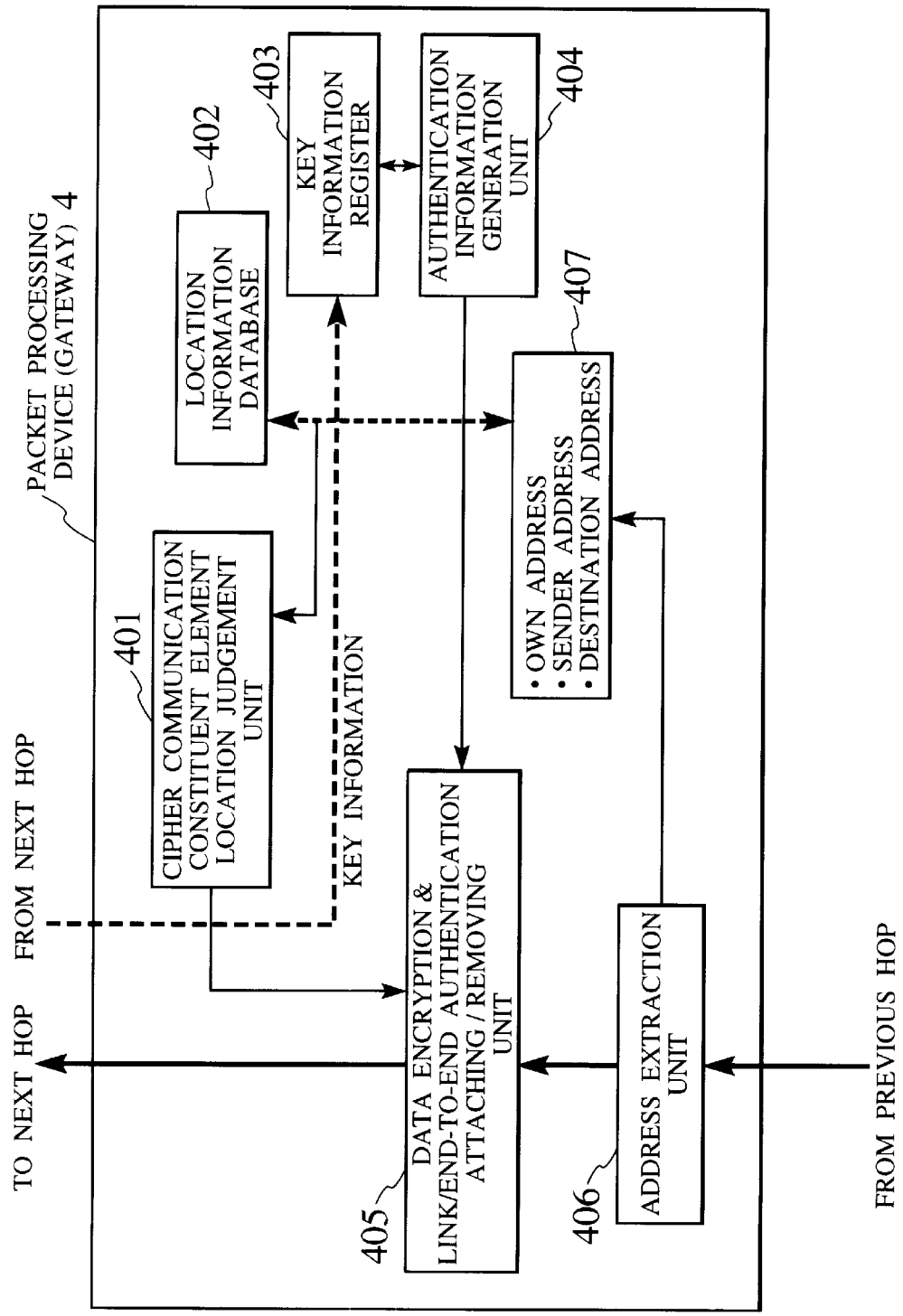
FIG. 45 is a schematic block diagram of a packet processing device according to one embodiment of the present invention.

On the other hand, a packet processing device (gateway) 4 can be realized in an exemplary configuration as shown in FIG. 45.

In FIG. 45, the packet processing device (gateway) 4 comprises: a cipher communication constituent element location judgement unit 401; a location information database 402; a key information register 403 for registering a key information from the external; an authentication information generation unit 404 connected with the key information register 403; a data encryption and link/end-to-end authentication attaching/removing unit 405 connected with the cipher communication constituent element location judgement unit 401 and the authentication information generation unit 404; an address extraction unit 406 connected with the data encryption and link/end-to-end authentication attaching/removing unit 405 for extracting own, sender and destination addresses 407 which are to be used as a key for searching through the location information database 402, where the searched location information is to be given to the cipher communication constituent element location judgement unit 401. Here, the addressextraction unit 406 can obtain the own address from a communication module of the gateway.

In this configuration of FIG. 45, the cipher communication constituent element location judgement unit 401 has a function for recognizing whether at least one of a source computer and a destination computer of a packet to be transferred is a moving mobile computer which is moving outside its home network, as well as a function for recognizing whether or not there exists a packet processing device (gateway) which has a packet transmitted by at least one of the source computer and the destination computer as an encryption and authentication processing target. Also, the data encryption and link/end-to-end authentication attaching/removing unit 405 has a function for carrying out a prescribed transfer processing including an encryption and authentication processing of a packet to be transferred between the source computer and the destination computer, according to recognition results obtained by the cipher communication constituent element location judgement unit 401.

As described, in the conventional mobile IP scheme, the routing control and the mobile computer location registration have been specified only under the assumption that each network node is assigned with a unique IP address and capable of exchanging control packets freely, but in contrast, according to the present invention, at a time of the actual operation, it is possible to account for the operation specification on the network operating policy regarding a kind of organization to which the visited network of the mobile computer belongs.

Also, according to the present invention, in a case of carrying out the encryption and authentication communication using an encryption device based on the IP security, the operation of each network constituent element can be largely changed according to locations of the mobile computer and its correspondent host. In particular, this location information recognition can be utilized effectively in order to carry out the route optimization of the mobile IP in conjunction with the encryption and authentication processing.

Also, because the mobile IP specification does not account for the network operating policy, when the mobile computer moves to a network of an external organization and transmits a registration message of the mobile IP destined to the home network, if a gateway of that external network freely allows the transmission of any packet destined outside the network, it is possible to carry out the operation exactly as specified by the mobile IP, but this scheme itself is not preferable from a viewpoint of the security in general, so that it is necessary for the mobile computer to recognize that it is located in the network of the external organization, and make the external access after the processing for establishing the own identification with respect to the gateway. In this regard, according to the present invention, the mobile computer can recognize its own current location and properly carry out the processing necessary in making the external access from a currently connected network.

Thus, according to the present invention, it is possible to realize an efficient system control accounting for the management policy of each network in actually operating the system, in a case where the mobile computer control according to the mobile IP and the packet encryption processing according to the IP security are applied in combination. Namely, according to the present invention, it is possible to realize a communication system in which the mobile computer control scheme and the packet encryption scheme are both applied without being dependent on a network configuration of a system as a whole.

Consequently, it becomes possible to provide a mobile computer and a communication control method which are capable of carrying out a proper packet transfer according to a current location of the mobile computer by accounting for the network operating policy.

Also, it becomes possible to provide a packet processing device and a communication control method which are capable of carrying out a proper communication control such as packet transfer, encryption and authentication processing, and route optimization, according to current locations of computers carrying out packet communications by accounting for the network operating policy.

It is to be noted that, the above embodiment has been described by assuming that the cipher communication is not supported for an external node in a form of a stationary computer, but it is possible to support the cipher communication if an external node in a form of a stationary computer has the encryption and authentication function. In such a case, a database for registering those external nodes in forms of stationary computers which have the encryption and authentication function can be provided in the network, and the processing similar to the above described P1-1 (a case of communication from a mobile computer moving as an external node to a stationary node located inside GW protected region) and P1-2 (a case of communication from a stationary node located inside GW protected region to a mobile computer moving as an external node) can be carried out when an external node in a form of a stationary computer is judged to be having the encryption and authentication function upon searching through this database.

It is also to be noted that, in the examples described above, when the passing of the packet is refused once from the gateway at the visited network, the packet is transmitted by attaching the authentication data after the prescribed procedure, but instead of that, it is also possible to register the mobile computer for which the authentication was successful as a management target in the management table of the gateway, so that the authentication can be omitted thereafter for this mobile computer. In this case, after the registration, the mobile computer can transmit the packet without attaching the authentication data.

It is also to be noted that, in the above embodiment, a number of gateways involved in the packet transfer is at most two, but in a case where another gateway GWe is to be involved in the packet transfer between the gateways GWa and GWb which have the computers as the processing targets, the gateway GWe may simply pass a packet in the format other than the encryption/link authentication format as it is whenever such a packet is received. Also, in a case of transferring a packet in the encryption/link authentication format, the link authentication may be carried out between the gateways GWa and GWe as well as between the gateways GWe and GWb.

It is also to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the mobile computer in the above described configuration of FIG. 44 and the packet processing device in the above described configuration of FIG. 45 can be conveniently implemented in forms of separate software packages.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that the above embodiment has been described for a communication system using the co-located care-of address mode, but the present invention is equally applicable to a communication system that assumes the existence of the foreign agent.

It is also to be noted that the present invention is equally applicable to any of the currently proposed mobile communication protocols, the cipher communication protocols, and the secret key exchange protocols.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A mobile computer for carrying out communications while moving within a communication system in which a plurality of networks are inter-connected, said plurality of networks including one network at which a packet processing device is provided, said packet processing device having a function for applying an encryption and authentication processing to a packet transmitted by a computer inside said one network toward another computer outside said one network, the mobile computer comprising:

a first recognition unit for recognizing whether said mobile computer is located inside a home network or outside the home network, the home network being one of said plurality of networks at which a mobile computer management device is provided, the mobile computer management device having a function for managing a mobile location information of said mobile computer and transferring a packet destined to said mobile computer to a current location of said mobile computer;

a second recognition unit for recognizing whether or not there exists a packet processing device which has a packet transmitted by at least one of said mobile computer and a correspondent computer of said mobile computer as an encryption and authentication processing target; and a communication unit for carrying out a prescribed communication processing including an encryption and authentication processing of a packet to be transmitted from said mobile computer, according to recognition results obtained by the first recognition unit and the second recognition unit.

2. The mobile computer of claim 1, wherein the prescribed communication processing includes a processing for transmitting a packet without encryption, a processing for transmitting a packet by encrypting a prescribed communication data and attaching an end-to-end authentication data for an authentication to be carried out between end nodes involved in a cipher communication, and a processing for transmitting a packet by encrypting the prescribed communication data and attaching the end-to-end authentication data and a link authentication data for an authentication to be carried out between said mobile computer and a next hop packet processing device.

3. The mobile computer of claim 1, wherein the prescribed communication processing includes a processing for transmitting a packet in an IP format, a processing for transmitting a packet in an encryption/end-to-end authentication format, and a processing for transmitting a packet in an encryption/link authentication format, according to a mobile IP scheme.

4. The mobile computer of claim 1, wherein when a received packet is encrypted and attached with an end-to-end authentication data for an authentication to be carried out between end nodes involved in a cipher communication, the communication unit inspects the end-to-end authentication data, and if an authenticity of the end-to-end authentication data is checked, the communication unit obtains an actual transfer data by decrypting a prescribed communication content of the received packet while removing the end-to-end authentication data.

5. The mobile computer of claim 1, wherein when the first recognition unit recognizes that said mobile computer is located outside the home network, the communication unit transmits a registration message including a current location information of said mobile computer after applying the encryption and authentication processing, toward said mobile computer management device, and when a passing refuse response is returned from one packet processing device on a packet transfer route in response to the registration message, the communication unit acquires an information on an authentication key of said one packet processing device and re-transmits the registration message by attaching an authentication code using said authentication key.

6. The mobile computer of claim 1, wherein when the first recognition unit recognizes that said mobile computer is located inside the home network, the communication unit transmits a registration message containing a current location information of said mobile computer without applying the encryption and authentication processing, toward said mobile computer management device in the home network.

7. The mobile computer of claim 1, wherein when the first recognition unit recognizes that said mobile computer is located inside the home network, the communication unit transmits a packet without applying the encryption and authentication processing, toward the correspondent computer.

8. The mobile computer of claim 1, wherein when the second recognition unit recognizes that there exists a packet processing device which has a packet transmitted by said mobile computer as well as a packet transmitted by the correspondent computer as the encryption and authentication processing target, the communication unit transmits a packet without applying the encryption and authentication processing, toward the correspondent computer.

9. The mobile computer of claim 1, wherein when the first recognition unit recognizes that said mobile computer is located outside the home network and the second recognition unit recognizes that there exists one packet processing device which has a packet transmitted by said mobile computer as the encryption and authentication processing target and there exists another packet processing device which has a packet transmitted by the correspondent computer as the encryption and authentication processing target, while it is ascertained that said one packet processing device allows to pass a packet transmitted by said mobile computer to outside without applying an authentication processing, the communication unit transmits a packet in which a prescribed communication content is encrypted and to which an end-to-end authentication data is attached, toward the correspondent computer.

10. The mobile computer of claim 1, wherein when the first recognition unit recognizes that said mobile computer is located outside the home network and the second recognition unit recognizes that there exists one packet processing device which has a packet transmitted by said mobile computer as the encryption and authentication processing target and there exists another packet processing device which has a packet transmitted by the correspondent computer as the encryption and authentication processing target, while it is ascertained that said one packet processing device does not allow to pass a packet transmitted by said mobile computer to outside without applying an authentication processing, the communication unit transmits a packet in which a prescribed communication content is encrypted and to which an end-to-end authentication data and a link authentication data are attached, toward the correspondent computer.

11. The mobile computer of claim 1, wherein when the first recognition unit recognizes that said mobile computer is located outside the home network and the second recognition unit recognizes that there is no packet processing device which has a packet transmitted by said mobile computer as the encryption and authentication processing target, the communication unit transmits a packet in which a prescribed communication content is encrypted and to which an end-to-end authentication data is attached, toward the correspondent computer.

12. The mobile computer of claim 1, wherein when the second recognition unit recognizes that there exists a packet processing device which has a packet transmitted by said mobile computer as the encryption and authentication processing target and there is no packet processing device which has a packet transmitted by the correspondent computer as the encryption and authentication processing target, the communication unit transmits a packet without applying the encryption and authentication processing, toward the correspondent computer.

13. The mobile computer of claim 1, wherein when the first recognition unit recognizes that said mobile computer is located inside the home network and the second recognition unit recognizes that there is no packet processing device which has a packet transmitted by said mobile computer as the encryption and authentication processing target, the communication unit carries out a direct plaintext communication with the correspondent computer.

14. The mobile computer of claim 1, wherein when the first recognition unit recognizes that said mobile computer is located outside the home network and the second recognition unit recognizes that there exists a packet processing device which has a packet transmitted by said mobile computer as the encryption and authentication processing target and there is no packet processing device which has a packet transmitted by the correspondent computer as the encryption and authentication processing target, the communication unit carries out a plaintext communication in which a packet destined to said mobile computer is routed by said mobile computer management device.

15. The mobile computer of claim 1, wherein when the first recognition unit recognizes that said mobile computer is located outside the home network and the second recognition unit recognizes that there exists a packet processing device which has a packet transmitted by said mobile computer as the encryption and authentication processing target and there is no packet processing device which has a packet transmitted by the correspondent computer as the encryption and authentication processing target, the communication unit carries out a direct plaintext communication using an address acquired at a visited site of said mobile computer.

16. The mobile computer of claim 1, wherein when the first recognition unit recognizes that said mobile computer is located outside the home network and the second recognition unit recognizes that there is no packet processing device which has a packet transmitted by said mobile computer as the encryption and authentication processing target and there is no packet processing device which has a packet transmitted by the correspondent computer as the encryption and authentication processing target, the communication unit transmits a packet in which a prescribed communication content is encrypted to the home network, so that a packet transfer device in the home network applies an address conversion and transfers said packet to the correspondent computer, and another packet transmitted from the correspondent computer is applied with the address conversion by said packet transfer device and routed by said mobile computer management device so as to be transferred to said mobile computer by encrypting a communication content of said another packet.

17. The mobile computer of claim 1, wherein when the first recognition unit recognizes that said mobile computer is located inside the home network and the second recognition unit recognizes that there exists one packet processing device which has a packet transmitted by said mobile computer as the encryption and authentication processing target and there exists another packet processing device which has a packet transmitted by the correspondent computer as the encryption and authentication processing target, the communication carries out a cipher communication with the correspondent computer by transmitting a packet to said one packet processing device, while the correspondent computer directly transmits an encrypted packet destined to said mobile computer.

18. The mobile computer of claim 1, wherein when the first recognition unit recognizes that said mobile computer is located outside the home network and the second recognition unit recognizes that there exists a packet processing device which has a packet transmitted by said mobile computer as well as a packet transmitted by the correspondent computer as the encryption and authentication processing target, the communication unit transmits a packet without applying the encryption and authentication processing, directly to the correspondent computer.

19. The mobile computer of claim 1, wherein when the first recognition unit recognizes that said mobile computer is located outside the home network and the second recognition unit recognizes that there is no packet processing device which has a packet transmitted by said mobile computer as the encryption and authentication processing target and there exists a packet processing device which has a packet transmitted by the correspondent computer as the encryption and authentication processing target, the communication unit transmits an encrypted packet with an authentication data attached thereto, to the correspondent computer.

20. The mobile computer of claim 1, wherein when the first recognition unit recognizes that said mobile computer is located outside the home network and the second recognition unit recognizes that there exists one packet processing device which has a packet transmitted by said mobile computer as the encryption and authentication processing target and there exists another packet processing device which has a packet transmitted by the correspondent computer as the encryption and authentication processing target, the communication unit transmits a packet in which a communication content is encrypted and to which an end-to-end authentication data for authentication between end nodes and a link authentication data for authentication between said mobile computer and a packet processing device in a visited network of said mobile computer are attached, to the correspondent computer.

21. A packet processing device to be provided in one network of a communication system in which a plurality of networks are inter-connected, said plurality of networks including a home network at which a mobile computer management device of a mobile computer for carrying out communications while moving within the communication system is provided, the mobile computer management device having a function for managing a mobile location information of said mobile computer and transferring a packet destined to said mobile computer to a current location of said mobile computer, said packet processing device having a function for applying an encryption and authentication processing to a packet transmitted by a computer inside said one network toward another computer outside said one network and comprising:

a first recognition unit for recognizing whether at least one of a source computer and a destination computer of a packet to be transferred is a moving mobile computer which is moving outside its home network;

a second recognition unit for recognizing whether or not there exists a packet processing device which has a packet transmitted by at least one of said source computer and said destination computer as an encryption and authentication processing target; and a transfer unit for carrying out a prescribed transfer processing including an encryption and authentication processing of a packet to be transferred between said source computer and said destination computer, according to recognition results obtained by the first recognition unit and the second recognition unit.

22. The packet processing device of claim 21, wherein the prescribed transfer processing includes a processing for receiving an input packet and transmitting an output packet in an identical packet format as the input packet or an output packet obtained by converting a packet format of the input packet into another packet format, the input packet being any one of a non-encrypted packet, a non-encrypted packet which is routed by said mobile computer management device, a packet in which a prescribed communication data is encrypted and to which an end-to-end authentication data for an authentication to be carried out between end nodes involved in a cipher communication is attached, and a packet in which the prescribed communication data is encrypted and the end-to-end authentication data and a link authentication data for an authentication to be carried out between said source computer and a next hop packet processing device are attached.

23. The packet processing device of claim 21, wherein the prescribed transfer processing includes a processing for transferring an input packet in an IP format, an input packet in a mobile IP format, an input packet in an encryption/end-to-end authentication format, or an input packet in an encryption/link authentication format, according to a mobile IP scheme.

24. The packet processing device of claim 21, wherein the transfer unit judges whether a route optimization is possible or not according to the recognition results, and when it is judged that said packet processing device contributes to the route optimization, the transfer unit carries out a control for the route optimization according to the recognition results.

25. The packet processing device of claim 21, wherein when the first recognition unit recognizes that at least one of said source computer and said destination computer is the moving mobile computer, and the second recognition unit recognizes that said packet processing device has a packet transmitted by said moving mobile computer as an encryption and authentication processing target, if a first type packet with no link authentication data destined to said packet processing device attached thereto is received from said moving mobile computer, the transfer unit returns a passing refuse message to said moving mobile computer;

if a second type packet with a first type link authentication data destined to said packet processing device attached thereto is received from said moving mobile computer, the transfer unit inspects said first type link authentication data, and if an authenticity of said first type link authentication data is checked, the transfer unit converts said first type link authentication data into a second type link authentication data for a next hop and transfers said second type packet with said second type link authentication data;

if a response message destined to said moving mobile computer is received, the transfer unit inspects the first type link authentication data destined to said packet processing device, and if an authenticity of said first type link authentication data is checked, the transfer unit transfers said response message to said moving mobile computer by removing said first type link authentication data; and when said packet processing device is located in the home network and if said response message is received from said mobile computer management device, the transfer unit transfers said response message toward said moving mobile computer by encrypting a prescribed communication content and attaching an end-to-end authentication data and said second type link authentication data.

26. The packet processing device of claim 21, wherein when the first recognition unit recognizes that neither one of said source computer and said destination computer is the moving mobile computer, and the second recognition unit recognizes that there exists one packet processing device which has a packet transmitted by said source computer as an encryption and authentication processing target and there exists another packet processing device which has a packet transmitted by said destination computer as an encryption and authentication processing target, if a non-encrypted packet arrives, the transfer unit transfers said non-encrypted packet by encrypting a prescribed communication content and attaching an end-to-end authentication data; and if a packet in which the prescribed communication content is encrypted and to which the end-to-end authentication data is attached arrives, the transfer unit inspects the end-to-end authentication data, and if an authenticity of the end-to-end authentication data is checked, the transfer unit transfers said packet by removing the end-to-end authentication data and decrypting the prescribed communication content.

27. The packet processing device of claim 21, wherein when the first recognition unit recognizes that one computer of said source computer and said destination computer is the moving mobile computer, and the second recognition unit recognizes that there exists a packet processing device which has a packet transmitted by said one computer as an encryption and authentication processing target, and the first recognition unit and the second recognition unit recognize that another computer of said source computer and said destination computer is not simultaneously a computer which is not a moving mobile computer and a computer for which there is no packet processing device which has a packet transmitted by said computer as an encryption and authentication processing target, the transfer unit carries out said prescribed transfer processing at least according to a packet format of an input packet to be transferred.

28. The packet processing device of claim 27, wherein:

when a non-encrypted packet arrives, the transfer unit transfers said non-encrypted packet by encrypting a prescribed communication content and attaching an end-to-end authentication data; and when a packet in which the prescribed communication content is encrypted and to which the end-to-end authentication data is attached arrives, the transfer unit inspects the end-to-end authentication data, and if an authenticity of the end-to-end authentication data is checked, the transfer unit transfers said packet by removing the end-to-end authentication data and decrypting the prescribed communication content.

29. The packet processing device of claim 27, wherein:

when a first type packet which has said moving mobile computer as a source, which is the encryption and authentication processing target of said packet processing device, in which a prescribed communication content is encrypted and to which an end-to-end authentication data is attached arrives, the transfer unit transfers said first type packet by attaching a first type link authentication data for a next hop; and when a second type packet which has said moving mobile computer as a source, in which the prescribed communication content is encrypted and to which the end-to-end authentication data and a second type link authentication data for said packet processing device are attached arrives, the transfer unit inspects said second type link authentication data, and if an authenticity of said second type link authentication data is checked, the transfer unit transfers said second type packet by replacing said second type link authentication data with said first type link authentication data.

30. The packet processing device of claim 27, wherein:

when a packet which has said moving mobile computer as a destination, which is the encryption and authentication processing target of said packet processing device, in which a prescribed communication content is encrypted and to which an end-to-end authentication data and a link authentication data for said packet processing device are attached arrives, the transfer unit inspects said link authentication data, and if an authenticity of said link authentication data is checked, the transfer unit transfers said packet by removing said link authentication data.

31. The packet processing device of claim 27, wherein:

when a packet which has a computer which is not said moving mobile computer as a destination, which is the encryption and authentication processing target of said packet processing device, in which a prescribed communication content is encrypted and to which an end-to-end authentication data for said packet processing device and a link authentication data for said packet processing device are attached arrives, the transfer unit inspects each of said end-to-end authentication data and said link authentication data, and if an authenticity of said end-to-end authentication data and an authenticity of said link authentication data are checked, the transfer unit transfers said packet by removing said end-to-end authentication data and said link authentication data and decrypting the prescribed communication content.

32. The packet processing device of claim 27, wherein when a packet which has said another computer as a destination and said one computer as a source and which is indicated as having been relayed by said mobile computer management device, and the first recognition unit recognizes that said another computer is a moving mobile computer, if the second recognition unit recognizes that there exists a packet processing device which has a packet transmitted by said another computer as an encryption and authentication processing target, the transfer unit transfers said packet by encrypting a prescribed communication content and attaching an end-to-end authentication data for said another computer and a link authentication data for a next hop node; and if the second recognition unit recognizes that there is no packet processing device which has a packet transmitted by said another computer as an encryption and authentication processing target, the transfer unit transfers said packet by encrypting the prescribed communication content and attaching the end-to-end authentication data for said another computer.

33. The packet processing device of claim 21, wherein when a route optimization is requested and it is judged that said packet processing device contributes to the route optimization according to the recognition results, the transfer unit carries out a control for the route optimization according to the recognition results.

34. The packet processing device of claim 21, wherein when the first recognition unit and the second recognition unit recognize that said mobile computer is located outside the home network and a correspondent stationary node of said mobile computer is located inside the home network, and that there exists a packet processing device which has a packet transmitted by said mobile computer as an encryption and authentication processing target and there exists a packet processing device which has a packet transmitted by said correspondent stationary node as an encryption and authentication processing target, if a first type packet transmitted by said mobile computer at a previous hop in which a prescribed content is encrypted and to which an end-to-end authentication data and a first type link authentication data for the previous hop and said packet processing device are attached arrives, the transfer unit inspects said first type link authentication data, and if an authenticity of said first type link authentication data is checked, the transfer unit transfers said first type packet by replacing said first type link authentication data with a second type link authentication data for a next hop;

if a second type packet for which said mobile computer is a next hop, in which the prescribed communication content is encrypted and to which the end-to-end authentication data and a third type link authentication data are attached arrives, the transfer unit inspects said third type link authentication data, and if an authenticity of said third type link authentication data is checked, the transfer unit transfers said second type packet by removing said third type link authentication data;

if a third type packet other than the second type packet in which the prescribed communication content is encrypted and to which the end-to-end authentication data and the third type link authentication data are attached arrives, the transfer unit inspects each of the end-to-end authentication data and the third type link authentication data, and if an authenticity of the end-to-end authentication data and an authenticity of the third type link authentication data are checked, the transfer unit transfers said third type packet by removing the end-to-end authentication data and the third type link authentication data and decrypting the prescribed communication content; and if a fourth type packet which is not encrypted and routed by said mobile computer management device arrives, the transfer unit transfers said fourth type packet by encrypting the prescribed communication content and attaching the end-to-end authentication data and the second type link authentication data.

35. The packet processing device of claim 21, wherein when the first recognition unit and the second recognition unit recognize that said mobile computer is located outside the home network and a correspondent stationary node of said mobile computer is located in an identical network as said mobile computer, and that there exists a packet processing device which has a packet transmitted by said mobile computer as an encryption and authentication processing target and there exists a packet processing device which has a packet transmitted by said correspondent stationary node as an encryption and authentication processing target, if a first type packet which is not encrypted arrives, the transfer unit transfers said first type packet by encrypting a prescribed communication content and attaching an end-to-end authentication data;

if a second type packet in which the prescribed communication content is encrypted and to which the end-to-end authentication data is attached arrives, the transfer unit inspects the end-to-end authentication data, and if an authenticity of the end-to-end authentication data is checked, the transfer unit transfers said second type packet by removing the end-to-end authentication data and decrypting the prescribed communication content;

if a third type packet which is not encrypted and routed by said mobile computer management device arrives, the transfer unit transfers the third type packet by encrypting the prescribed communication content and attaching the end-to-end authentication data and a first type link authentication data for a next hop; and if a fourth type packet for which said mobile computer is a next hop, in which the prescribed communication content is encrypted and to which the end-to-end authentication data and a second type link authentication data are attached arrives, the transfer unit inspects said second type link authentication data, and if an authenticity of said second type link authentication data is checked, the transfer unit transfers said fourth type packet by removing said second type link authentication data.

36. The packet processing device of claim 21, wherein when the first recognition unit and the second recognition unit recognize that said mobile computer is located outside the home network and a correspondent stationary node of said mobile computer is located in an identical network as said mobile computer, and that there exists a packet processing device which has a packet transmitted by said mobile computer as an encryption and authentication processing target and there exists a packet processing device which has a packet transmitted by said correspondent stationary node as an encryption and authentication processing target, and also an optimization of a data transfer route for said mobile computer is requested and the second recognition unit recognizes that said packet processing device has a packet transmitted by said correspondent stationary node as an encryption and authentication processing target, if a non-encrypted packet from the correspondent stationary node arrives, the transfer unit converts said non-encrypted packet into a converted packet in an identical format as a packet which is routed by said mobile computer management device, and transfers the converted packet to said mobile computer.

37. The packet processing device of claim 21, wherein when the first recognition unit and the second recognition unit recognize that said mobile computer is located outside the home network and a correspondent stationary node of said mobile computer is located in another network which is neither the home network nor a network at which said mobile computer is located, and that there exists a packet processing device which has a packet transmitted by said mobile computer as an encryption and authentication processing target and there exists a packet processing device which has a packet transmitted by said correspondent stationary node as an encryption and authentication processing target, if a first type packet which is not encrypted arrives, the transfer unit transfers said first type packet by encrypting a prescribed communication content and attaching an end-to-end authentication data;

if a second type packet in which the prescribed communication content is encrypted and to which the end-to-end authentication data is attached arrives, the transfer unit inspects the end-to-end authentication data, and if an authenticity of the end-to-end authentication data is checked, the transfer unit transfers said second type packet by removing the end-to-end authentication data and decrypting the prescribed communication content;

if a third type packet transmitted by said mobile computer at a previous hop in which the prescribed content is encrypted and to which the end-to-end authentication data and a first type link authentication data for the previous hop and said packet processing device are attached arrives, the transfer unit inspects said first type link authentication data, and if an authenticity of said first type link authentication data is checked, the transfer unit transfers said third type packet by replacing said first type link authentication data with a second type link authentication data for a next hop;

if a fourth type packet for which said mobile computer is a next hop, in which the prescribed communication content is encrypted and to which the end-to-end authentication data and a third type link authentication data are attached arrives, the transfer unit inspects said third type link authentication data, and if an authenticity of said third type link authentication data is checked, the transfer unit transfers said fourth type packet by removing said third type link authentication data;

if a fifth type packet other than the fourth type packet in which the prescribed communication content is encrypted and to which the end-to-end authentication data and the third type link authentication data are attached arrives, the transfer unit inspects each of the end-to-end authentication data and the third type link authentication data, and if an authenticity of the end-to-end authentication data and an authenticity of the third type link authentication data are checked, the transfer unit transfers said fifth type packet by removing the end-to-end authentication data and the third type link authentication data and decrypting the prescribed communication content; and if a sixth type packet which is not encrypted and routed by said mobile computer management device arrives, the transfer unit transfers said sixth type packet by encrypting the prescribed communication content and attaching the end-to-end authentication data and the second type link authentication data.

38. The packet processing device of claim 21, wherein when the first recognition unit and the second recognition unit recognize that said mobile computer is located outside the home network and a correspondent stationary node of said mobile computer is located in another network which is neither the home network nor a network at which said mobile computer is located, and that there exists a packet processing device which has a packet transmitted by said mobile computer as an encryption and authentication processing target and there exists a packet processing device which has a packet transmitted by said correspondent stationary node as an encryption and authentication processing target, and also an optimization of a data transfer route for said mobile computer is requested and the second recognition unit recognizes that said packet processing device has a packet transmitted by said mobile computer as an encryption and authentication processing target, if a first type packet transmitted by said mobile computer at a previous hop in which a prescribed content is encrypted and to which an end-to-end authentication data and a first type link authentication data for the previous hop and said packet processing device are attached arrives, the transfer unit inspects said first type link authentication data, and if an authenticity of said first type link authentication data is checked, the transfer unit transfers said third type packet by replacing said first type link authentication data with a second type link authentication data for a next hop;

if a second type packet for which said mobile computer is a next hop, in which the prescribed communication content is encrypted and to which the end-to-end authentication data and a third type link authentication data are attached arrives, the transfer unit inspects said third type link authentication data, and if an authenticity of said third type link authentication data is checked, the transfer unit transfers said fourth type packet by removing said third type link authentication data;

if the second recognition unit recognizes that said packet processing device has a packet transmitted by said correspondent stationary node as an encryption and authentication processing target, and a third type packet for which said correspondent stationary node is a next hop, in which the prescribed communication content is encrypted and to which the end-to-end authentication data and the third type link authentication data are attached arrives, the transfer unit inspects each of the end-to-end authentication data and the third type link authentication data, and if an authenticity of the end-to-end authentication data and an authenticity of the third type link authentication data are checked, the transfer unit transfers said third type packet by removing the end-to-end authentication data and the third type link authentication data and decrypting the prescribed communication content; and if a fourth type packet transmitted by said correspondent stationary node at a previous hop which is not encrypted arrives, the transfer unit transfers said fourth type packet to said mobile computer by encrypting the prescribed communication content and attaching the end-to-end authentication data and the third type link authentication data.

39. The packet processing device of claim 21, wherein when the first recognition unit and the second recognition unit recognize that said mobile computer is located outside the home network and a correspondent stationary node of said mobile computer is located in an identical network as said mobile computer, and that there is no packet processing device which has a packet transmitted by said mobile computer as an encryption and authentication processing target and there exists a packet processing device which has a packet transmitted by said correspondent stationary node as an encryption and authentication processing target, if a first type packet in which a prescribed communication content is encrypted and to which an end-to-end authentication data is attached arrives, the transfer unit inspects the end-to-end authentication data, and if an authenticity of the end-to-end authentication data is checked, the transfer unit transfers said first type packet by removing the end-to-end authentication data and decrypting the prescribed communication content; and if a second type packet which is not encrypted and routed by said mobile computer management device arrives, the transfer unit transfers said second type packet by encrypting the prescribed communication content and attaching the end-to-end authentication data.

40. The packet processing device of claim 21, wherein when the first recognition unit and the second recognition unit recognize that said mobile computer is located outside the home network and a correspondent stationary node of said mobile computer is located outside the home network, and that there is no packet processing device which has a packet transmitted by said mobile computer as an encryption and authentication processing target and there exists a packet processing device which has a packet transmitted by said correspondent stationary node as an encryption and authentication processing target, if a first type packet which is not encrypted arrives, the transfer unit transfers said first type packet by encrypting a prescribed communication content and attaching an end-to-end authentication data;

if a second type packet in which the prescribed communication content is encrypted and to which the end-to-end authentication data is attached arrives, the transfer unit inspects the end-to-end authentication data, and if an authenticity of the end-to-end authentication data is checked, the transfer unit transfers said second type packet by removing the end-to-end authentication data and decrypting the prescribed communication content; and if a third type packet which is not encrypted and routed by said mobile computer management device arrives, the transfer unit transfers said third type packet by encrypting the prescribed communication content and attaching the end-to-end authentication data.

41. The packet processing device of claim 21, wherein when the first recognition unit and the second recognition unit recognize that said mobile computer is located outside the home network and a correspondent stationary node of said mobile computer is located outside the home network, and that there is no packet processing device which has a packet transmitted by said mobile computer as an encryption and authentication processing target and there exists a packet processing device which has a packet transmitted by said correspondent stationary node as an encryption and authentication processing target, and also an optimization of a data transfer route for said mobile computer is requested and the second recognition unit recognizes that said packet processing device has a packet transmitted by said correspondent stationary node as an encryption and authentication processing target, if a first type packet which is not encrypted arrives, the transfer unit transfers said first type packet by encrypting a prescribed communication content and attaching an end-to-end authentication data;

if a second type packet transmitted by said correspondent stationary node at a previous hop, in which the prescribed communication content is encrypted and to which the end-to-end authentication data is attached arrives, the transfer unit inspects the end-to-end authentication data, and if an authenticity of the end-to-end authentication data is checked, the transfer unit transfers said second type packet to said mobile computer by removing the end-to-end authentication data and decrypting the prescribed communication content.

42. A communication control method at a mobile computer for carrying out communications while moving within a communication system in which a plurality of networks are inter-connected, said plurality of networks including one network at which a packet processing device is provided, said packet processing device having a function for applying an encryption and authentication processing to a packet transmitted by a computer inside said one network toward another computer outside said one network, the method comprising the steps of:

(a) recognizing whether said mobile computer is located inside a home network or outside the home network, the home network being one of said plurality of networks at which a mobile computer management device is provided, the mobile computer management device having a function for managing a mobile location information of said mobile computer and transferring a packet destined to said mobile computer to a current location of said mobile computer;

(b) recognizing whether or not there exists a packet processing device which has a packet transmitted by at least one of said mobile computer and a correspondent computer of said mobile computer as an encryption and authentication processing target; and (c) carrying out a prescribed communication processing including an encryption and authentication processing of a packet to be transmitted from said mobile computer, according to recognition results obtained by the step (a) and the step (b).

43. A communication control method at a packet processing device to be provided in one network of a communication system in which a plurality of networks are inter-connected, said plurality of networks including a home network at which a mobile computer management device of a mobile computer for carrying out communications while moving within the communication system is provided, the mobile computer management device having a function for managing a mobile location information of said mobile computer and transferring a packet destined to said mobile computer to a current location of said mobile computer, said packet processing device having a function for applying an encryption and authentication processing to a packet transmitted by a computer inside said one network toward another computer outside said one network, the method comprising comprising the steps of:

(a) recognizing whether at least one of a source computer and a destination computer of a packet to be transferred is a moving mobile computer which is moving outside its home network;

(b) recognizing whether or not there exists a packet processing device which has a packet transmitted by at least one of said source computer and said destination computer as an encryption and authentication processing target; and (c) carrying out a prescribed transfer processing including an encryption and authentication processing of a packet to be transferred between said source computer and said destination computer, according to recognition results obtained by the step (a) and the step (b).

44. An article of manufacture, comprising:

a computer usable medium having computer readable program code means embodied therein for causing a computer to function as a mobile computer for carrying out communications while moving within a communication system in which a plurality of networks are inter-connected, said plurality of networks including one network at which a packet processing device is provided, said packet processing device having a function for applying an encryption and authentication processing to a packet transmitted by a computer inside said one network toward another computer outside said one network, the computer readable program code means including:

first computer readable program code means for causing said computer to recognize whether said mobile computer is located inside a home network or outside the home network, the home network being one of said plurality of networks at which a mobile computer management device is provided, the mobile computer management device having a function for managing a mobile location information of said mobile computer and transferring a packet destined to said mobile computer to a current location of said mobile computer;

second computer readable program code means for causing said computer to recognize whether or not there exists a packet processing device which has a packet transmitted by at least one of said mobile computer and a correspondent computer of said mobile computer as an encryption and authentication processing target; and third computer readable program code means for causing said computer to carry out a prescribed communication processing including an encryption and authentication processing of a packet to be transmitted from said mobile computer, according to recognition results obtained by the first computer readable program code means and the second computer readable program code means.

45. An article of manufacture, comprising:

a computer usable medium having computer readable program code means embodied therein for causing a computer to function as a packet processing device to be provided in one network of a communication system in which a plurality of networks are inter-connected, said plurality of networks including a home network at which a mobile computer management device of a mobile computer for carrying out communications while moving within the communication system is provided, the mobile computer management device having a function for managing a mobile location information of said mobile computer and transferring a packet destined to said mobile computer to a current location of said mobile computer, said packet processing device having a function for applying an encryption and authentication processing to a packet transmitted by a computer inside said one network toward another computer outside said one network, the computer readable program code means including:

first computer readable program code means for causing said computer to recognize whether at least one of a source computer and a destination computer of a packet to be transferred is a moving mobile computer which is moving outside its home network;

second computer readable program code means for causing said computer to recognize whether or not there exists a packet processing device which has a packet transmitted by at least one of said source computer and said destination computer as an encryption and authentication processing target; and third computer readable program code means for causing said computer to carry out a prescribed transfer processing including an encryption and authentication processing of a packet to be transferred between said source computer and said destination computer, according to recognition results obtained by the first computer readable program code means and the second computer readable program code means.

* * * * *